US011610371B2

United States Patent
Powderly et al.

(10) Patent No.: US 11,610,371 B2
(45) Date of Patent: Mar. 21, 2023

(54) KEYBOARDS FOR VIRTUAL, AUGMENTED, AND MIXED REALITY DISPLAY SYSTEMS

(71) Applicant: Magic Leap, Inc., Plantation, FL (US)

(72) Inventors: James M. Powderly, Fort Lauderdale, FL (US); Savannah Niles, Fort Lauderdale, FL (US); Haney Awad, Fort Lauderdale, FL (US); William Wheeler, Los Angeles, CA (US); Nari Choi, Davie, FL (US); Timothy Michael Stutts, Oakland Park, FL (US); Josh Anon, Los Angeles, CA (US); Jeffrey Scott Sommers, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/984,208

(22) Filed: May 18, 2018

(65) Prior Publication Data
US 2018/0350150 A1    Dec. 6, 2018

Related U.S. Application Data

(60) Provisional application No. 62/644,597, filed on Mar. 19, 2018, provisional application No. 62/509,648, (Continued)

(51) Int. Cl.
*G06T 19/00* (2011.01)
*G06F 3/04815* (2022.01)
(Continued)

(52) U.S. Cl.
CPC .......... *G06T 19/006* (2013.01); *G02B 27/017* (2013.01); *G06F 3/01* (2013.01);
(Continued)

(58) Field of Classification Search
CPC ....... G06T 19/006; G06T 7/70; G06F 3/0213; G06F 3/044; G06F 3/04815;
(Continued)

(56) References Cited

U.S. PATENT DOCUMENTS

| 5,466,078 A | 11/1995 | Szmanda et al. |
| 6,388,657 B1 * | 5/2002 | Natoli ................. G06F 3/014 345/156 |

(Continued)

FOREIGN PATENT DOCUMENTS

| CN | 107656687 B | * 4/2020 | ........... G06F 3/0416 |
| CN | 114616535 A | * 6/2022 | ......... G02B 27/0093 |

(Continued)

OTHER PUBLICATIONS

Invitation to Pay Additional Fees, re PCT Application No. PCT/US2018/33536, dated Jul. 18, 2018.

(Continued)

*Primary Examiner* — Chante E Harrison
(74) *Attorney, Agent, or Firm* — Tobias Intellectual Property Law, PLLC

(57) ABSTRACT

User interfaces for virtual reality, augmented reality, and mixed reality display systems are disclosed. The user interfaces may be virtual or physical keyboards. Techniques are described for displaying, configuring, and/or interacting with the user interfaces.

24 Claims, 39 Drawing Sheets

Related U.S. Application Data filed on May 22, 2017, provisional application No. 62/508,974, filed on May 19, 2017.

(51) Int. Cl.
| | |
|---|---|
| *G06T 7/70* | (2017.01) |
| *G02B 27/01* | (2006.01) |
| *G06F 3/02* | (2006.01) |
| *G06F 3/01* | (2006.01) |
| *G06V 10/40* | (2022.01) |
| *G06V 20/20* | (2022.01) |
| *G06V 40/20* | (2022.01) |
| *G06F 18/24* | (2023.01) |
| *G06V 10/764* | (2022.01) |

(52) U.S. Cl.
CPC ........ *G06F 3/0213* (2013.01); *G06F 3/04815* (2013.01); *G06F 18/24* (2023.01); *G06T 7/70* (2017.01); *G06V 10/40* (2022.01); *G06V 10/764* (2022.01); *G06V 20/20* (2022.01); *G06V 40/20* (2022.01); *G02B 2027/0138* (2013.01)

(58) Field of Classification Search
CPC .......... G06F 3/0219; G06F 3/01; G06F 3/011; G06F 3/0238; G06F 3/0426; G06F 3/04886; G02B 2027/0138; G02B 27/017; G06K 9/46; G06K 9/00671; G06K 9/00335; G06K 9/04; G06V 10/40; G06V 20/20

See application file for complete search history.

(56) References Cited

U.S. PATENT DOCUMENTS

| | | | |
|---|---|---|---|
| 6,850,221 B1 | 2/2005 | Tickle | |
| D514,570 S | 2/2006 | Ohta | |
| 9,081,426 B2 | 7/2015 | Armstrong | |
| 9,215,293 B2 | 12/2015 | Miller | |
| D752,529 S | 3/2016 | Loretan et al. | |
| 9,329,678 B2* | 5/2016 | Krauss | G06F 3/011 |
| 9,348,143 B2 | 5/2016 | Gao et al. | |
| D759,657 S | 7/2016 | Kujawski et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 10,237,509 B1* | 3/2019 | Kim | G06F 1/163 |
| 2006/0028436 A1 | 2/2006 | Armstrong | |
| 2007/0081123 A1 | 4/2007 | Lewis | |
| 2010/0265182 A1 | 10/2010 | Ball et al. | |
| 2011/0254865 A1* | 10/2011 | Yee | G06F 3/04886 345/661 |
| 2012/0113008 A1* | 5/2012 | Makinen | G06F 3/04883 345/168 |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0002367 A1 | 1/2014 | Glückstad et al. | |
| 2014/0035819 A1* | 2/2014 | Griffin | G06F 3/0238 345/168 |
| 2014/0071539 A1 | 3/2014 | Gao | |
| 2014/0078176 A1* | 3/2014 | Kim | G06F 3/011 345/633 |
| 2014/0115520 A1* | 4/2014 | Itani | G06F 21/34 715/773 |
| 2014/0177023 A1 | 6/2014 | Gao et al. | |
| 2014/0192055 A1 | 7/2014 | Kim | |
| 2014/0205138 A1* | 7/2014 | Ansell | G06K 9/00201 382/103 |
| 2014/0218468 A1 | 8/2014 | Gao et al. | |
| 2014/0267420 A1 | 9/2014 | Schowengerdt | |
| 2014/0306866 A1 | 10/2014 | Miller et al. | |
| 2015/0016777 A1 | 1/2015 | Abovitz et al. | |
| 2015/0088547 A1* | 3/2015 | Balram | G06F 19/3418 705/3 |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1* | 10/2015 | Miller | G06F 3/011 345/419 |
| 2015/0309263 A2 | 10/2015 | Abovitz et al. | |
| 2015/0309316 A1* | 10/2015 | Osterhout | G06F 3/0346 345/8 |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0306958 A1* | 10/2016 | Dow | G06F 21/36 |
| 2017/0052701 A1 | 2/2017 | Rosenfeld et al. | |
| 2017/0123492 A1* | 5/2017 | Marggraff | H04N 5/247 |
| 2017/0262045 A1* | 9/2017 | Rouvinez | G06T 19/006 |
| 2017/0307889 A1* | 10/2017 | Newman | G02B 27/017 |
| 2018/0157820 A1* | 6/2018 | Adams | G06K 9/00892 |
| 2018/0158053 A1* | 6/2018 | Adams | G06F 3/011 |
| 2018/0173323 A1* | 6/2018 | Harvey | G06F 3/014 |
| 2018/0181194 A1* | 6/2018 | Harvey | G06T 19/006 |
| 2018/0197336 A1* | 7/2018 | Rochford | G06T 19/006 |
| 2018/0218859 A1* | 8/2018 | Ligtenberg | H01L 41/09 |
| 2019/0094981 A1* | 3/2019 | Bradski | G06F 3/017 |
| 2019/0146578 A1* | 5/2019 | Ikuta | G06F 3/04815 345/8 |
| 2019/0206093 A1* | 7/2019 | Chen | G06F 3/1423 |

FOREIGN PATENT DOCUMENTS

| | | | | |
|---|---|---|---|---|
| JP | 2011191811 A | * | 9/2011 | ........ G06F 3/0236 |
| JP | 2012-524356 A | | 10/2012 | |
| JP | 2014-241169 A | | 12/2014 | |
| KR | 1997-0045578 U | | 7/1997 | |
| KR | 2014-0090022 | | 7/2014 | |
| KR | 10-2014-0179354 | | 10/2015 | |
| KR | 2015-0110285 A | | 10/2015 | |
| WO | WO 2010/123736 | | 10/2010 | |
| WO | WO 2018/213801 | | 11/2018 | |

OTHER PUBLICATIONS

International Search Report and Written Opinion, re PCT Application No. PCT/US2018/33536, dated Sep. 24, 2018.

International Preliminary Report on Patentability, re PCT Application No. PCT/US2018/33536, dated Nov. 19, 2020.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

(56) References Cited

OTHER PUBLICATIONS

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Lee, et al., "ARKB: 3D vision-based Augmented Reality Keyboard*," ICAT 2003, Dec. 3, 2003.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

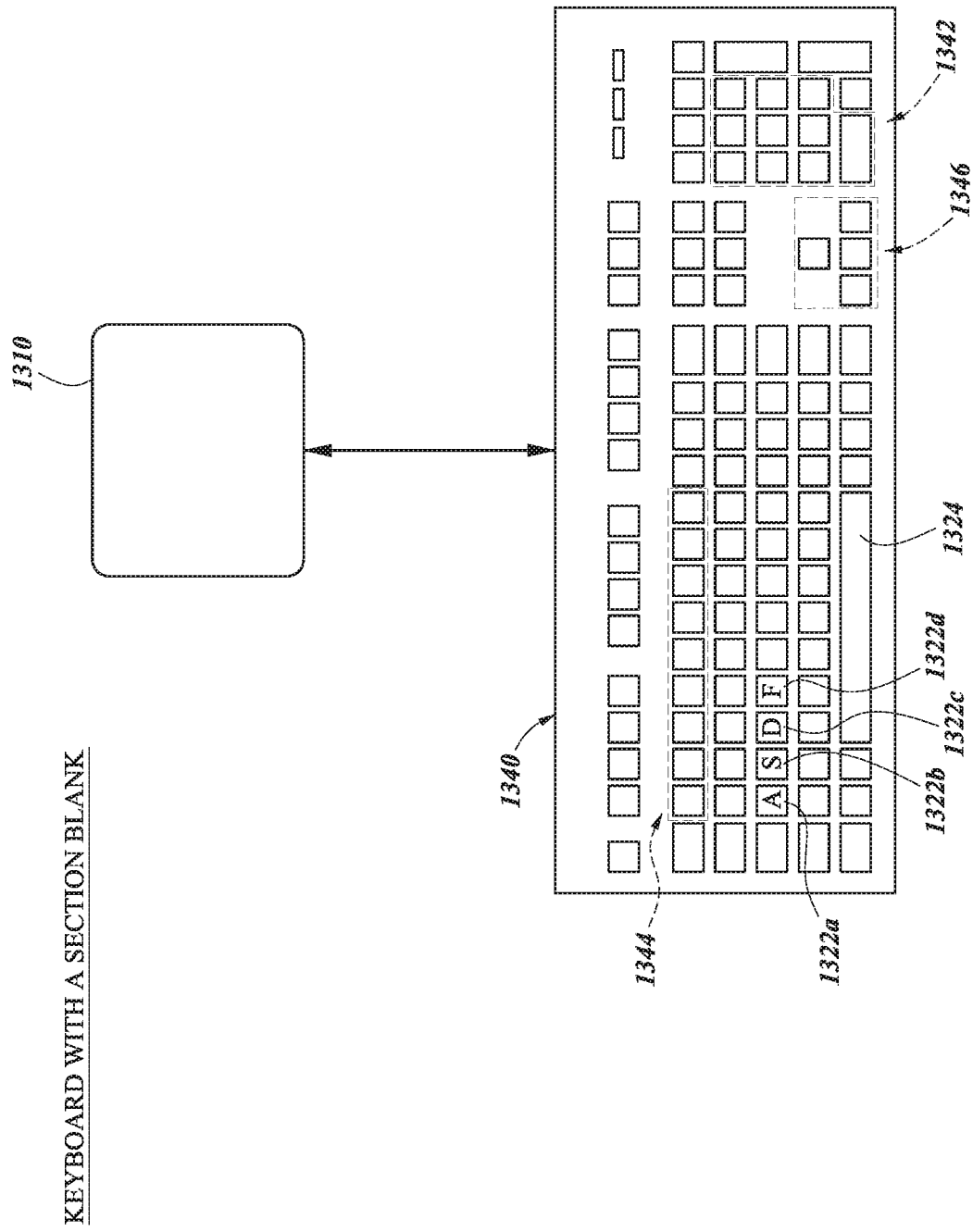

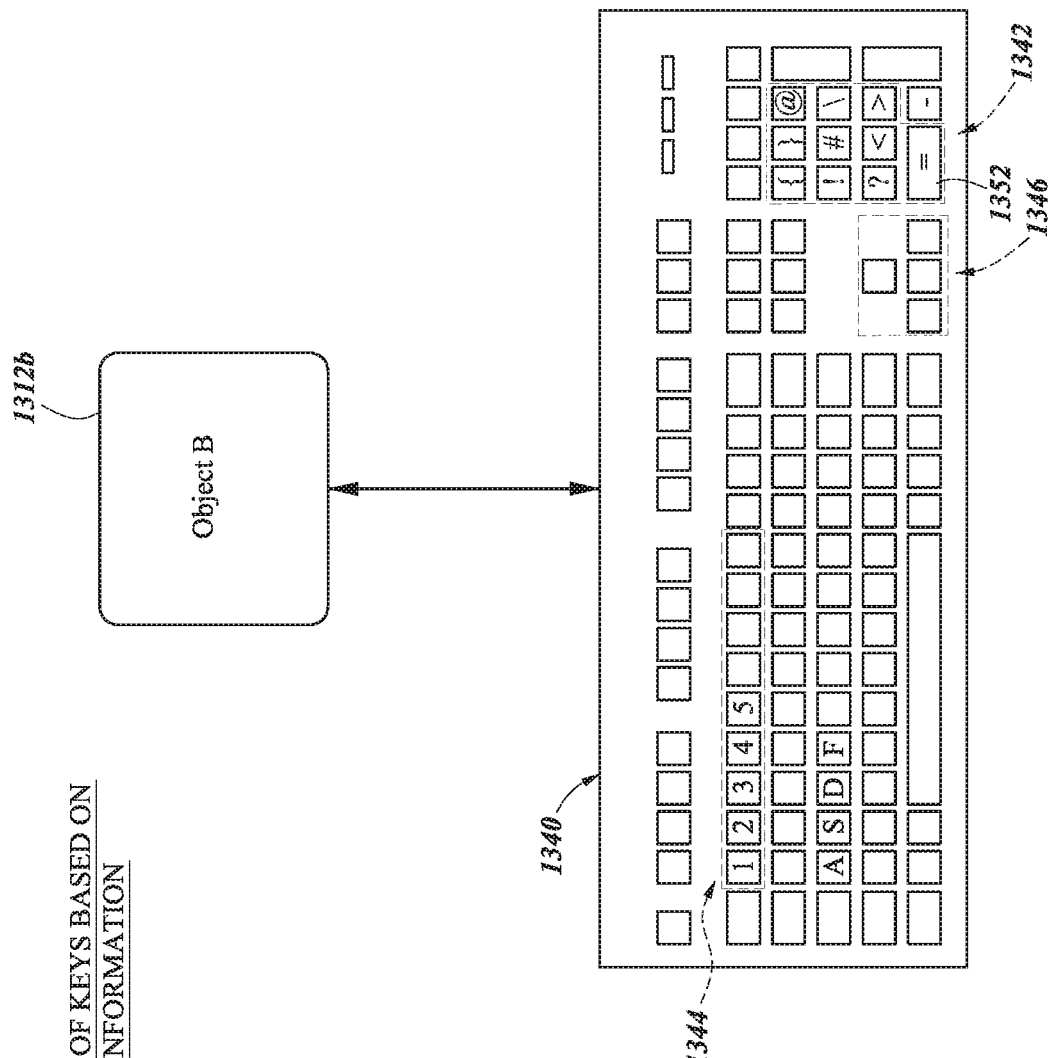

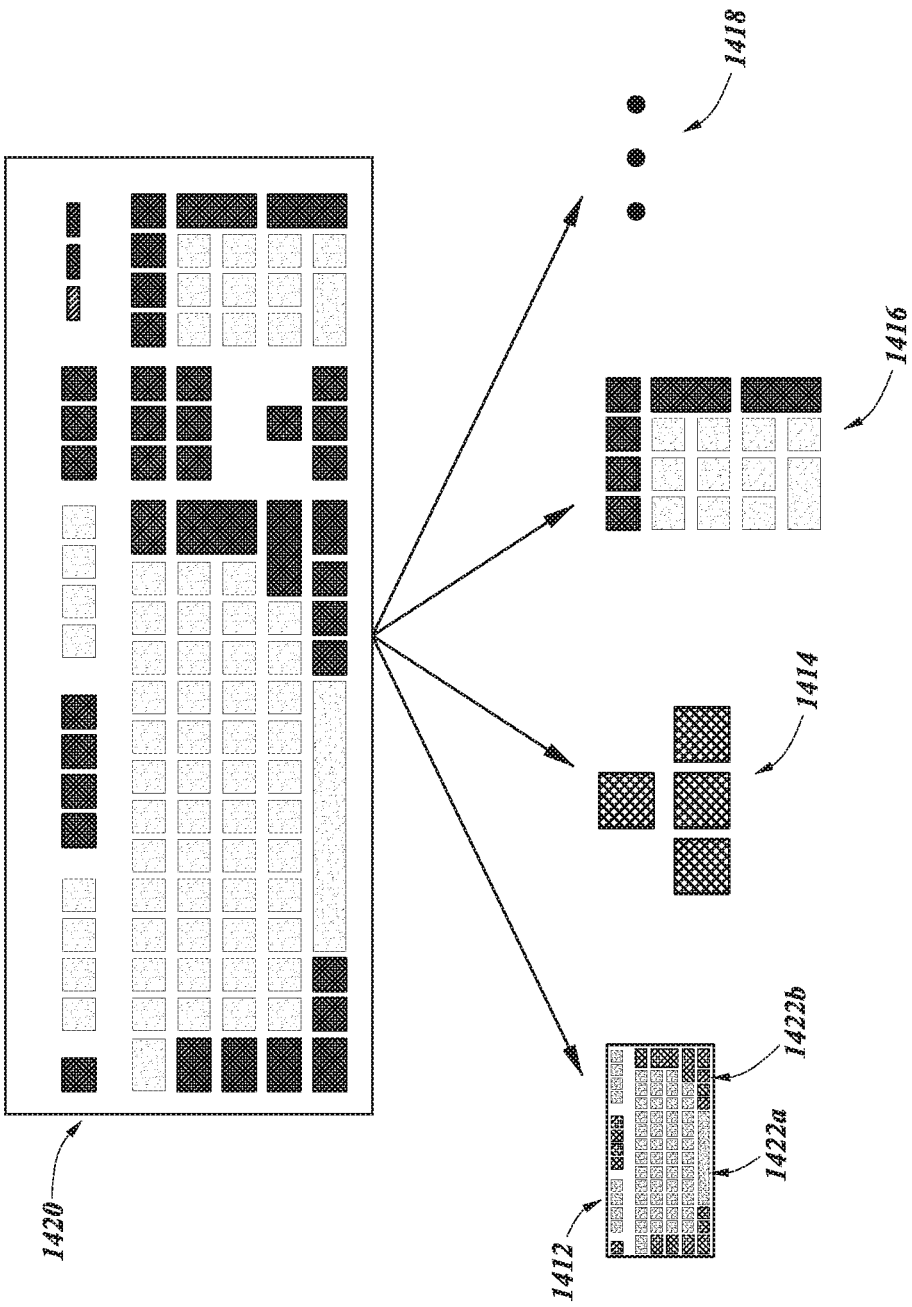

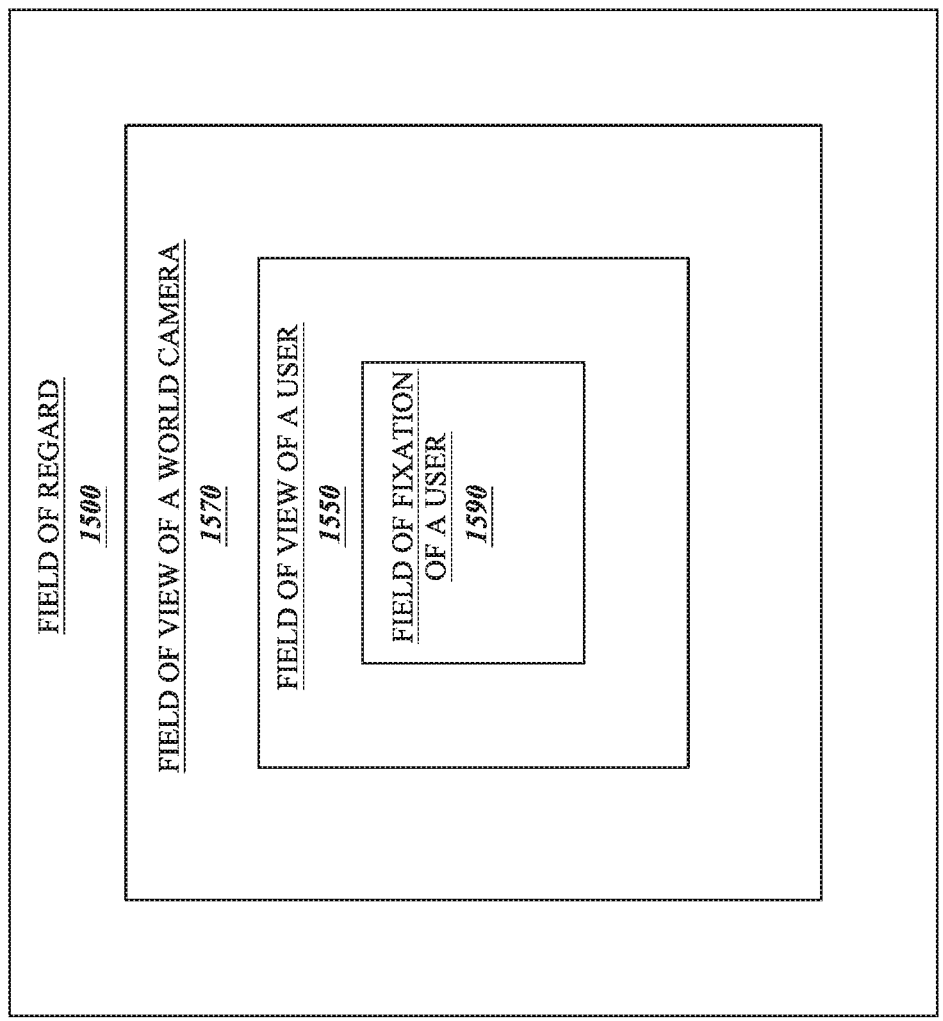

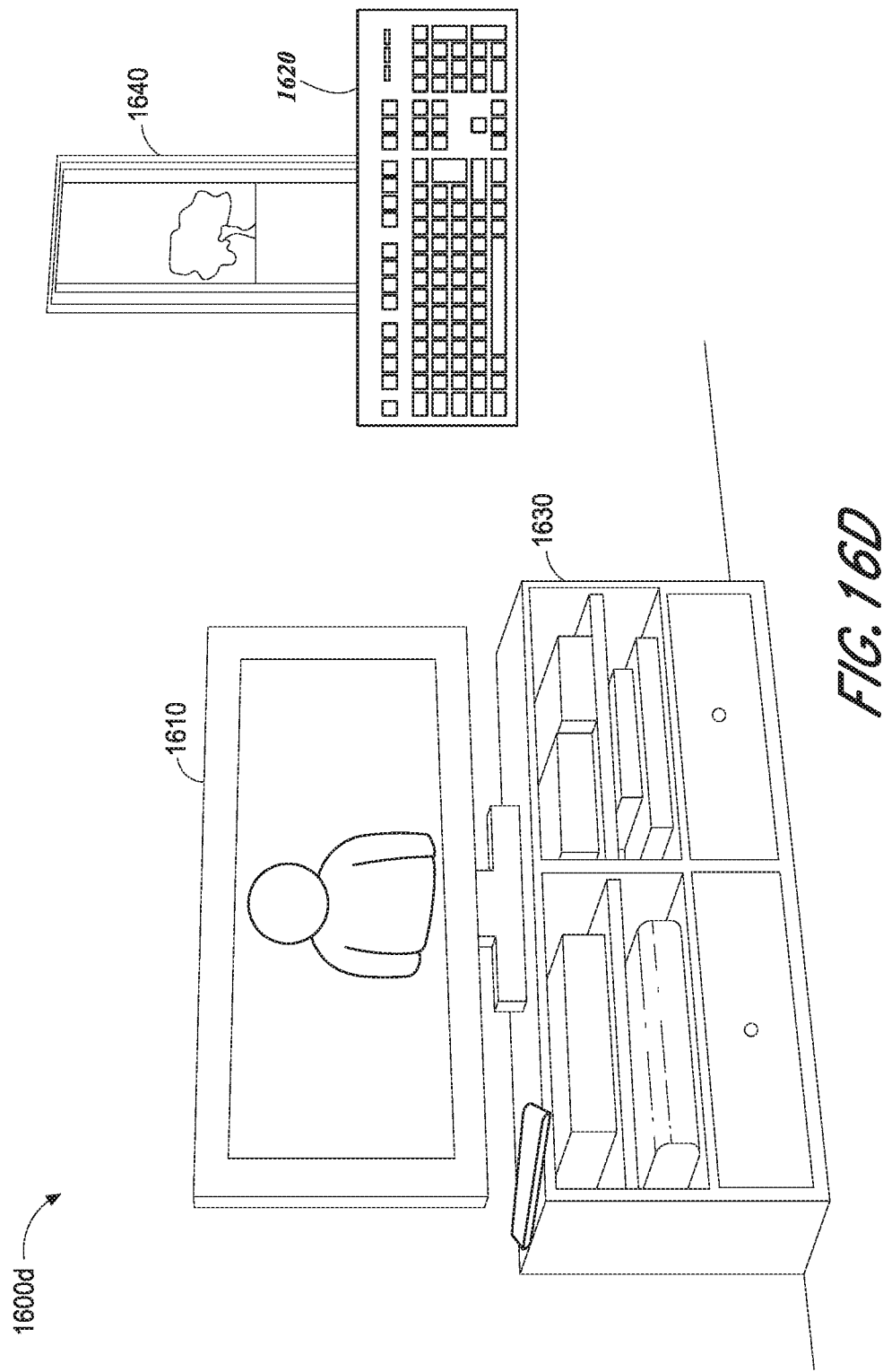

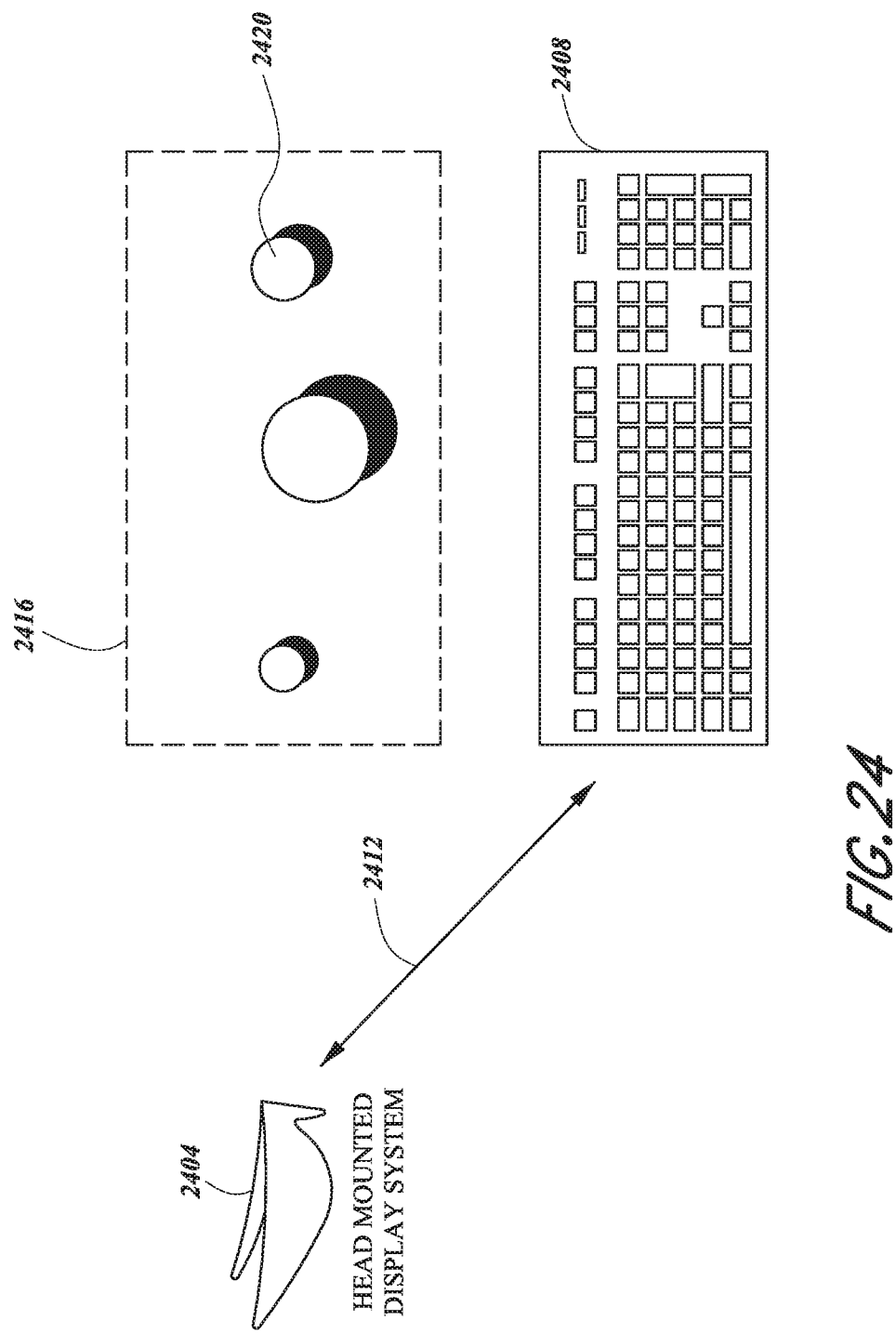

```
                    ┌─────────────────────────────────┐
                    │   Receive a first image of physical │──── 2504
                    │    environment of a user            │
                    └─────────────────────────────────┘
                                    │
                                    ▼
                    ┌─────────────────────────────────┐
                    │  Determine a first location/orientation of a │
                    │  physical keyboard in the environment of the │──── 2508
                    │       user using the first image             │
                    └─────────────────────────────────┘
                                    │
                                    ▼
                    ┌─────────────────────────────────┐
                    │ Determine a first rendering location/orientation of a │
                    │ virtual monitor based at least in part on the first   │──── 2512
                    │ location/orientation of the physical keyboard         │
                    └─────────────────────────────────┘
                                    │
                                    ▼
                    ┌─────────────────────────────────┐
                    │ Determine a size of the virtual monitor based at least │
                    │ in part on the first rendering location/orientation and │──── 2516
                    │      a size preference of the virtual monitor          │
                    └─────────────────────────────────┘
                                    │
                                    ▼
                    ┌─────────────────────────────────┐
                    │ Instruct a display system to render the virtual │
                    │ monitor with the determined size/orientation at │──── 2520
                    │        the first rendering location             │
                    └─────────────────────────────────┘
```

Receive an indication of an actuation of a first key of the physical keyboard — *2704*

Instruct the display system to render a first indicium corresponding to the first key as appearing in a virtual monitor at a first location of the first character — *2708*

Receive an indication that a second key of the physical keyboard has been pressed — *2712*

Determine a second location of a second indicium corresponding to the second key based at least in part on the first location of the first character — *2716*

Instruct the display system to render the second indicium corresponding to the second key as appearing in the virtual monitor at the second location of the second character — *2720*

*FIG. 27*

KEYBOARDS FOR VIRTUAL, AUGMENTED, AND MIXED REALITY DISPLAY SYSTEMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to U.S. Provisional Application No. 62/508,974, filed May 19, 2017, and to U.S. Provisional Application No. 62/509,648, filed May 22, 2017, and to U.S. Provisional Application No. 62/644,597, filed Mar. 19, 2018, each of which is entitled "KEYBOARD FOR VIRTUAL, AUGMENTED, AND MIXED REALITY DISPLAY SYSTEMS," and each of which is hereby incorporated by reference herein in its entirety.

BACKGROUND

Field

The present disclosure relates to virtual reality and augmented reality imaging and visualization systems, and more particularly to keyboards which may be associated with virtual reality and augmented reality imaging and visualization systems.

Description of the Related Art

Modern computing and display technologies have facilitated the development of systems for so called "virtual reality," "augmented reality," or "mixed reality" experiences, wherein digitally reproduced images are presented to a user in a manner such that they may be perceived as being real. A virtual reality, or "VR," scenario typically involves presentation of digital or virtual image information without transparency to other actual real-world visual input. An augmented reality, or "AR," scenario typically involves presentation of digital or virtual image information as an augmentation to visualization of the actual world around the user. A mixed reality, or "MR," scenario is a type of AR scenario which relates to merging real and virtual worlds to produce new environments where physical and virtual objects co-exist and interact in real time.

Systems and methods disclosed herein address various challenges related to VR, AR and MR technology.

BRIEF DESCRIPTION OF THE DRAWINGS

FIGS. 13A, 13B, and 13C illustrate examples of dynamically configuring a physical keyboard.

FIG. 14 illustrates an example of a reconfigurable physical keyboard.

FIG. 15A schematically illustrates an example of a field of regard (FOR), a field of view (FOV) of a world camera, a field of view of a user, and a field of fixation of a user.

FIGS. 16A-16D illustrate example features and user interactions with a virtual keyboard.

FIG. 24 schematically illustrates an example interaction between an AR/MR head mounted display (HMD) system, a companion physical keyboard, and a virtual monitor shown on a display of the HMD system.

FIG. 25 illustrates an example process of determining a location of a virtual monitor based at least in part of the location of a physical keyboard.

FIG. 27 illustrates an example process of rendering the input received by the physical keyboard using the virtual monitor in FIG. 27.

Figure 1:
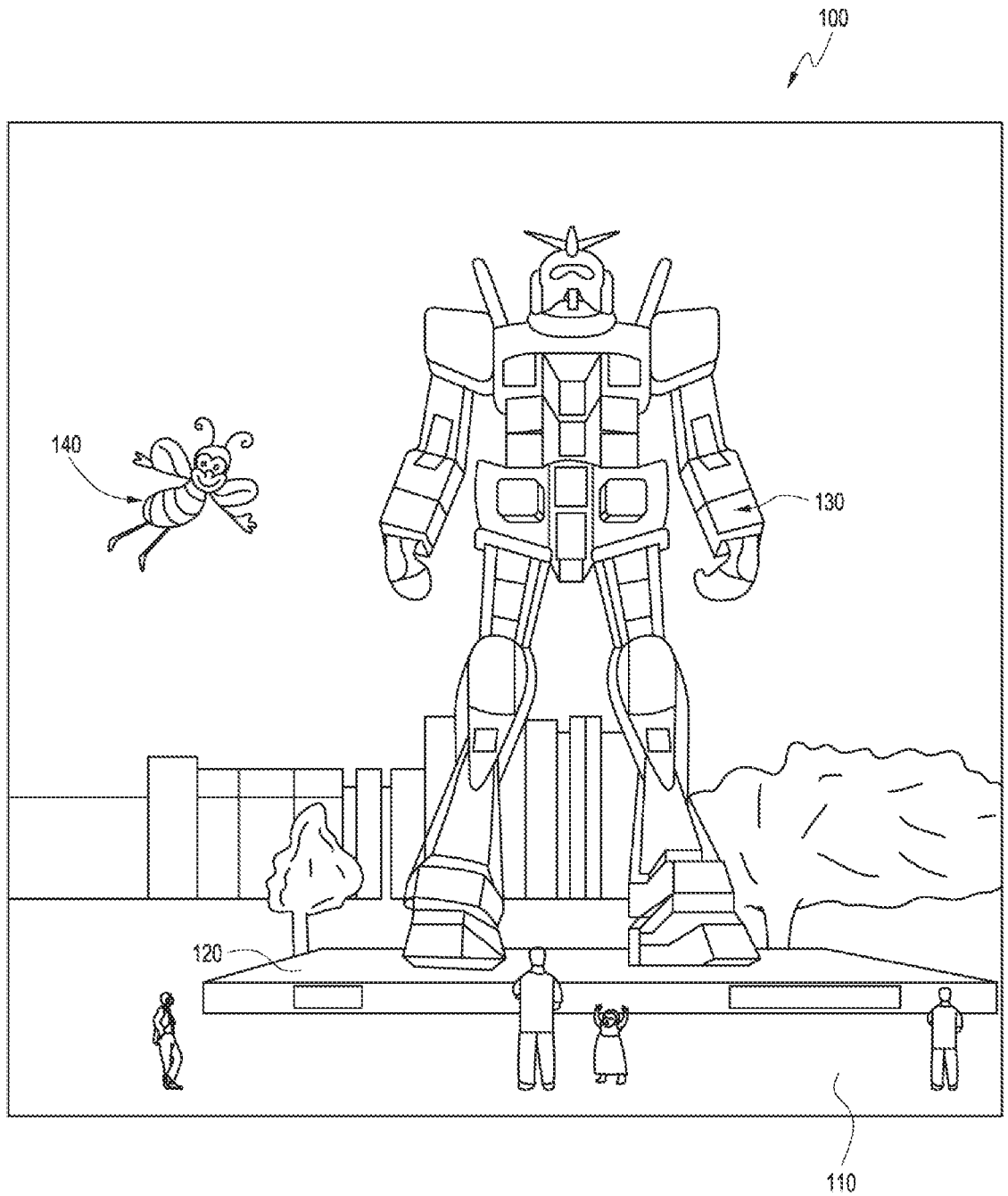
FIG. 1 depicts an illustration of an AR/MR scenario with certain virtual reality objects and certain physical objects, as viewed by a user.

Throughout the drawings, reference numbers may be re-used to indicate correspondence between referenced elements. The drawings are provided to illustrate example embodiments described herein and are not intended to limit the scope of the disclosure. Additionally, the figures in the present disclosure are for illustration purposes and are not to scale.

SUMMARY

In some examples, a system comprises: a display system configured to present virtual content in a physical environment of a user; an outward-facing imaging system configured to image the physical environment of the user; a hardware processor in communication with the display system and the outward-facing imaging system, the hardware processor programmed to: analyze an image of the physical environment acquired by the outward-facing imaging system; recognize a physical keyboard having a plurality of keys based on an analysis of the image; determine contextual information associated with the physical keyboard; determine a specification for the physical keyboard based at least in part on the contextual information; dynamically configure functions of at least a portion of the physical keyboard based at least in part on the specification; determine a rendering location of a virtual key label based at least in part on the specification; and instruct the display system to render the virtual key label at the determined rendering location.

In some examples, a system comprises: a display configured to present virtual reality, augmented reality, or mixed reality content to a user; a physical keyboard comprising: one or more keys configured to receive input from the user; and one or more sensors configured to produce an output indicative of a location of one or more of the user's hands or fingers relative to the physical keyboard; one or more hardware processors; and one or more computer storage media storing instructions that, when executed by the system, cause the system to perform operations comprising: determining a location of the one or more hands or fingers relative to the physical keyboard based on the output of the one or more sensors; and causing the display to present a first image representation of the physical keyboard and a second image representation of the placement of one or more of the user's hands or fingers, wherein a location of the second image representation relative to the first image representation is indicative of the location of the one or more hands or fingers relative to the physical keyboard.

In some examples, a head mounted display (HMD) comprises: a frame; projection optics supported by the frame and configured to project an image to an eye of a user; and a sensor to detect an interaction with an input device operably connected with the HMD; a non-transitory data storage configured to store instructions; at least one hardware processor operably coupled to the non-transitory data storage and configured by the instructions to: receive a signal from the sensor indicative of the user interaction; determine a type of the user interaction based on the signal; and transmit a haptic feedback signal to the input device, wherein the haptic feedback signal comprises one or more parameters for generating a haptic response communicable to the user through the input device.

In some examples, a system comprises: a display system configured to present a virtual monitor to a user; an outward-facing imaging system configured to image a physical environment of the user; a hardware processor in communication with the display system and the outward-facing imaging system, the hardware processor programmed to: receive a first image of the physical environment acquired by the outward-facing imaging system; determine a first location of a physical keyboard in the environment of the user using the first image; determine a first rendering location of the virtual monitor based at least in part on the first location of the physical keyboard; determine a size of the virtual monitor based at least in part on the first rendering location and a size preference of the virtual monitor, wherein the virtual monitor is configured for a user interface function; and instruct the display system to render the virtual monitor with the size determined at the first rendering location.

In some examples, a system comprises: a virtual reality, augmented reality, or mixed reality display capable of displaying data at multiple depths, a hardware processor configured to: display at least a portion of image data associated with a first application at a first depth; and display at least a portion of image data associated with a second application at a second depth, wherein the first and second applications are related to one another, and wherein the second depth is selected to be a fixed distance from the first depth.

DETAILED DESCRIPTION

A wearable VR/AR/MR system can be configured to present 2D or 3D virtual images to a user. The images may be still images, frames of a video, or a video, or combinations of the same or the like. The wearable system can include a wearable device that can present a VR, AR, or MR environment for user interaction. The wearable VR/AR/MR system can be a head-mounted device (HMD).

FIG. 1 depicts an illustration of an MR or AR scenario with virtual objects and physical objects, as viewed by a user. The user of AR/MR technology sees the scene 100 which is depicted in FIG. 1 and which includes a real-world park-like setting 110 featuring people, trees, buildings in the background, and a platform 120. In addition to these real-world items, the user of the AR/MR technology also perceives a virtual robot statue 130 standing upon the real-world platform 120, and a virtual cartoon-like avatar character 140 flying by which seems to be a personification of a bumble bee, even though these elements do not exist in the real world.

In order for the 3D display to produce a simulated sensation of apparent depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of apparent depth.

VR, AR, and MR experiences can be provided by display systems having displays in which images corresponding to a plurality of depth planes are provided to a viewer. The images may be different for each depth plane (e.g., provide slightly different presentations of a scene or object) and may be differently focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
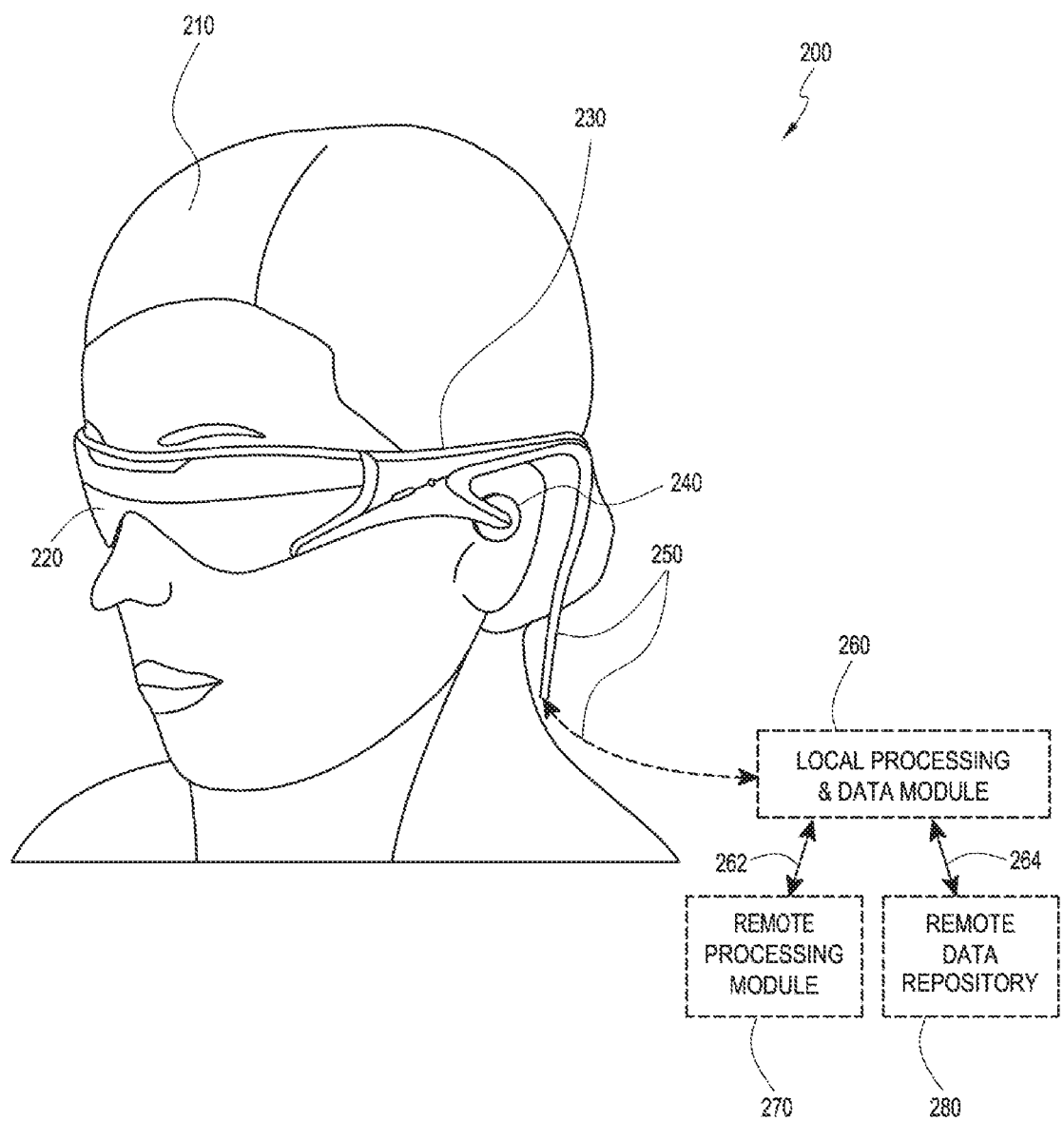
FIG. 2 schematically illustrates an example of a wearable VR/AR/MR system.

FIG. 2 illustrates an example of wearable VR/AR/MR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to the user. The display 220 can be a head mounted display (HMD) that is worn on the head of the user. In some embodiments, a speaker 240 is coupled to the frame 230 and positioned adjacent to the ear canal of the user (another speaker, not shown, can be positioned adjacent to the other ear canal of the user to provide for stereo/shapeable sound control).

The wearable system 200 can include an outward-facing imaging system 464 (shown in FIG. 4) which observes the world in the environment around the user. The wearable system 200 can also include an inward-facing imaging system 462 (shown in FIG. 4) which can be used to track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, for example, the pupil diameters or orientations of the eyes, eye movements, or the line of sight of the user 210.

As an example, the wearable system 200 can use the outward-facing imaging system 464 or the inward-facing imaging system 462 to acquire images of a pose of the user or gestures, etc. The images may be still images, frames of a video, or a video, or a combination of the same or the like.

The display 220 can be operatively coupled, such as by a wired lead or wireless connectivity 250, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may include a hardware processor, as well as digital memory, such as non-volatile memory (e.g., flash memory), both of which may be utilized to assist in the processing, caching, and storage of data. The data may include data that is a) captured from sensors (which may be, for example, operatively coupled to the frame 230 or otherwise attached to the user 210), such as image capture devices (e.g., cameras in the inward-facing imaging system or the outward-facing imaging system), microphones, inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may include one or more processors configured to analyze and process data and/or image information. In some embodiments, the remote data repository 280 may be a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
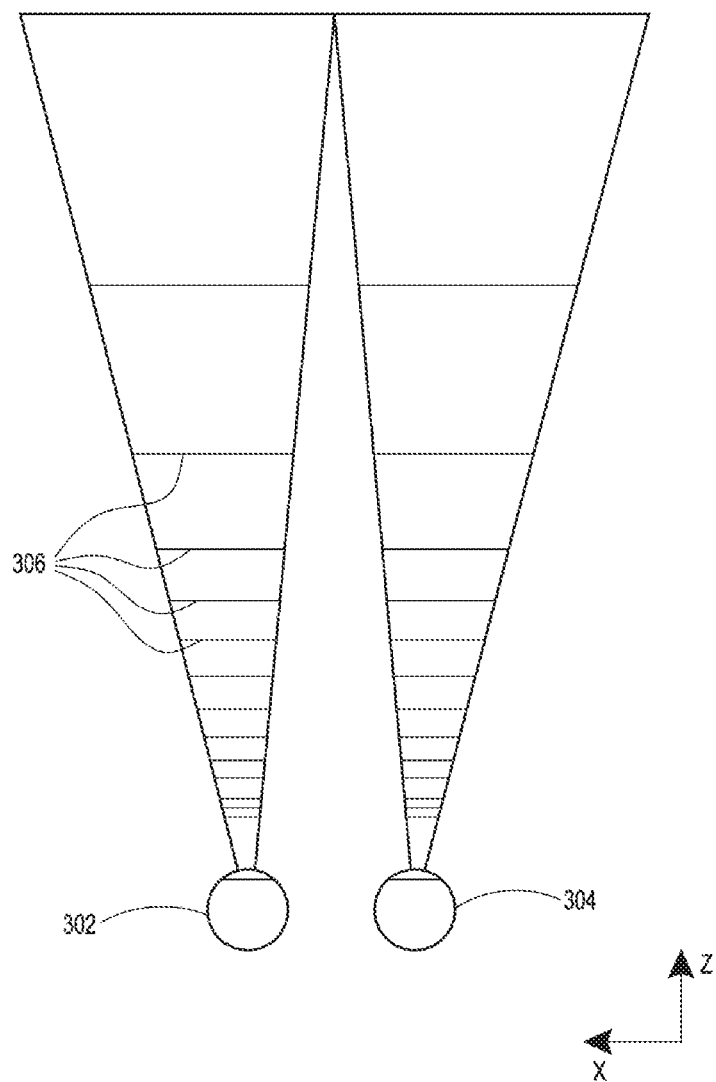
FIG. 3 schematically illustrates aspects of an approach for simulating three-dimensional imagery using multiple depth planes.

FIG. 3 illustrates aspects of an approach for simulating three-dimensional imagery using multiple depth planes. With reference to FIG. 3, objects at various distances on the z-axis from the eyes 302 and 304 are brought into focus using different degrees of accommodation. The eyes 302 and 304 assume particular states of accommodation to bring into focus objects at different distances along the z-axis. Consequently, a particular state of accommodation may be said to be associated with a particular one of the depth planes 306, which has an associated focal distance, such that objects or parts of objects in a particular depth plane are in focus when the eye is in the state of accommodation for that depth plane. In some embodiments, three-dimensional imagery may be simulated by providing different presentations of an image for each of the eyes 302 and 304, and also by providing different presentations of the image corresponding to each of the depth planes. While the respective fields of view of the eyes 302 and 304 are shown as being separate for clarity of illustration, they may overlap as distance along the z-axis increases. In addition, while the contours of a depth plane (the locus of points which are in focus with the eye in a particular accommodated state) are shown as being flat for the ease of illustration, they may be curved in physical space. The human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
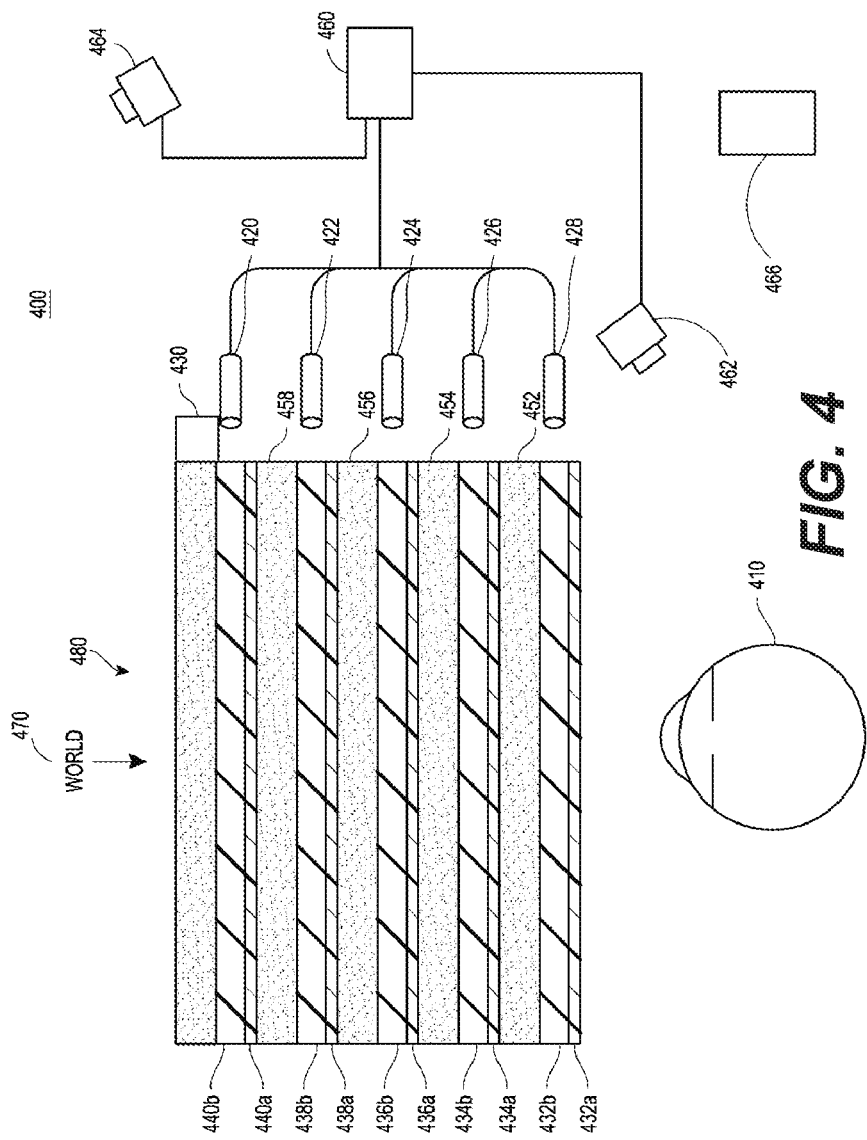
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, for example, pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), and may have major front and back surfaces with edges extending between those major front and back surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as out-coupled light, and light extracting optical elements may also be referred to as out-coupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the back major surfaces of the waveguides 440b, 438b, 436b, 434b, 432b for ease of description and drawing clarity, in some embodiments, the light extracting optical elements 440a, 438a, 436a, 434a, 432a may be disposed at the front or back major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. The first lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffractive optical element (also referred to herein as a "DOE"). In some embodiments, the DOE has a relatively low diffraction efficiency so that only a portion of the light of the beam is deflected away toward the eye 410 with each interaction with the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between an "on" state in which they actively diffract, and an "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 may be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system

400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
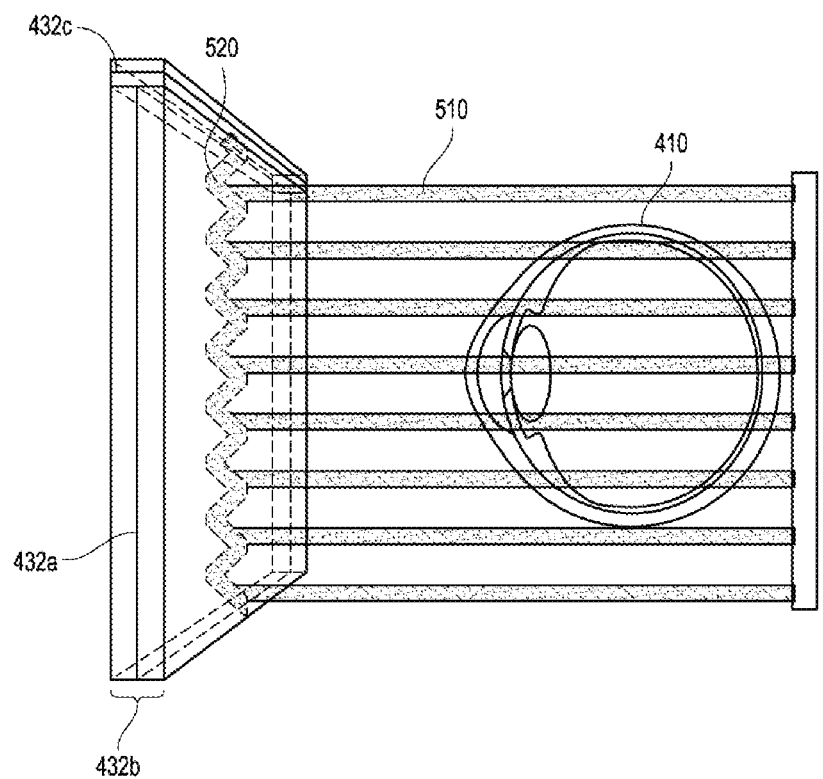
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that out-couple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to bring a closer distance into focus on the retina and would be interpreted by the brain as light from a distance closer to the eye 410 than optical infinity.

Figure 6:
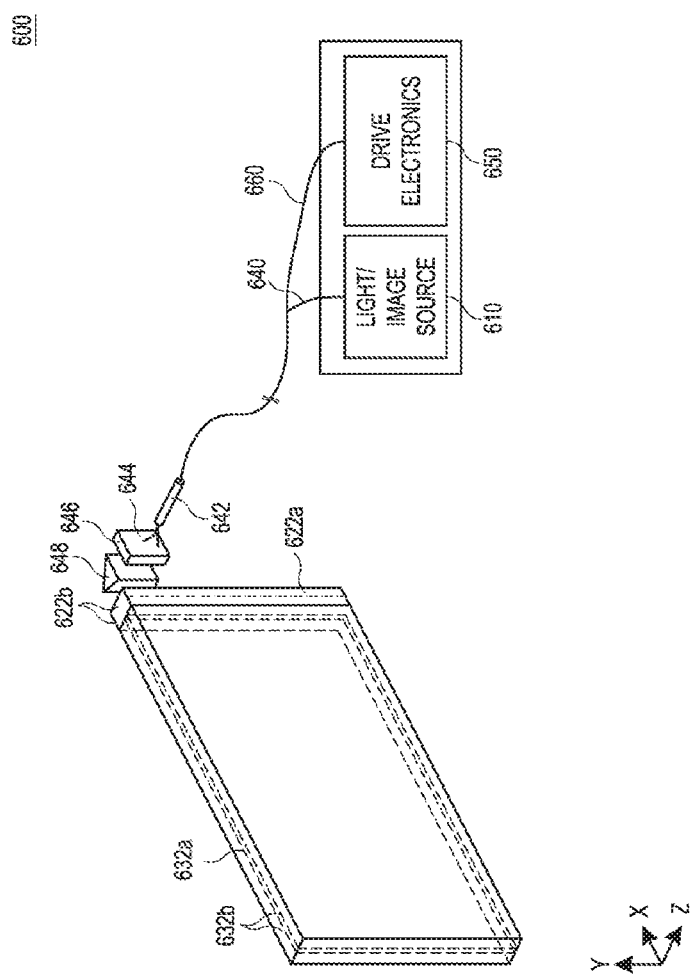
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem. The optical system can be used to generate a multi-focal volumetric image or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (e.g., the vertical y-axis shown in FIG. 6) and to expand the light's effective exit pupil along the first axis. The distribution waveguide apparatus may, for example, include a distribution planar waveguide 622b and at least one DOE 622a associated with the distribution planar waveguide 622b. The distribution planar waveguide 622b may be similar or identical in at least some respects to the primary planar waveguide 632b, but with a different orientation. Likewise, at least one DOE 622a may be similar or identical in at least some respects to the DOE 632a. For example, the distribution planar waveguide 622b or DOE 622a may be made of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil-expanded light may be optically coupled from the distribution waveguide apparatus into the one or more primary planar waveguides 632b. The primary planar waveguide 632b can relay light along a second axis, preferably orthogonal to first axis (e.g., the horizontal x-axis shown in FIG. 6). Notably, the second axis can be a non-orthogonal axis to the first axis. The primary planar waveguide 632b expands the light's effective exit pupil along that second axis. For example, the distribution planar waveguide 622b can relay and expand light along the vertical y-axis, and pass that light to the primary planar waveguide 632b which can relay and expand light along the horizontal x-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon the diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area-filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view shown in FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple out-coupled sets, the exit pupil of the light can be expanded vertically by the DOE 4 in the distribution planar waveguide 622b. This vertically-expanded light coupled out of distribution planar waveguide 622b can enter the edge of the primary planar waveguide 632b.

Light entering the primary waveguide 632b can propagate horizontally (relative to the view shown in FIG. 6) along the primary waveguide 632b via total internal reflection (TIR). As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate the feel of a physical object which a virtual object represents, or may replicate the feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate may not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable VR/AR/MR system may employ various mapping related techniques in order to achieve high depth of field in the rendered light fields. In mapping out the virtual world, it is advantageous to know features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
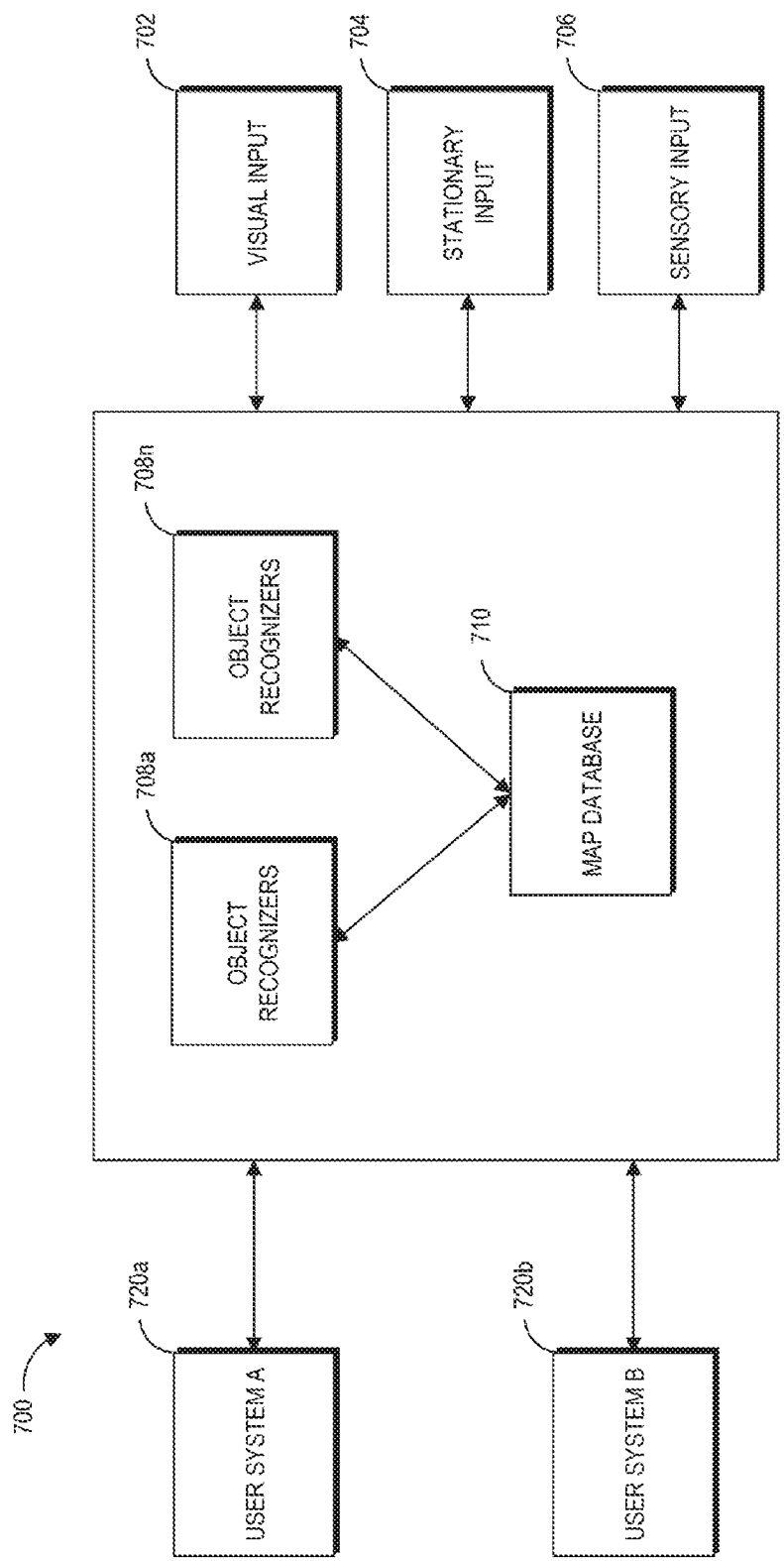
FIG. 7 is a block diagram of an example of a wearable VR/AR/MR system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, other objects in the user's environment, etc. One or more object recognizers may be specialized for object with certain characteristics. For example, the object recognizer 708a may be used to recognize faces, while another object recognizer may be used recognize totems.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition, object pose estimation, learning, indexing, motion estimation, or image restoration, etc. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
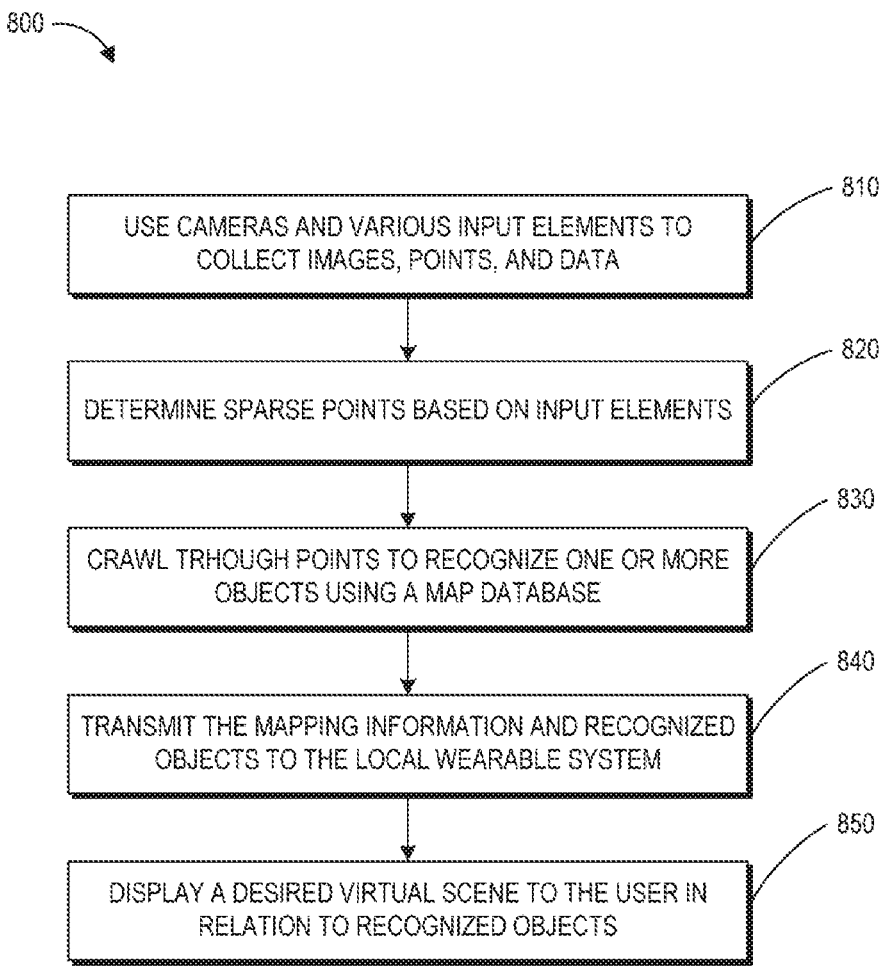
FIG. 8 is a process flow diagram of an example method of rendering virtual content in relation to recognized objects.

FIG. 8 is a process flow diagram of an example method 800 of rendering virtual content in relation to recognized objects. The method 800 describes how a virtual scene may be represented to a user of the wearable system. The user may be geographically remote from the scene. For example, the user may be New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. At block 820, the system may determine sparse points based on this information. The sparse points may be used in determining pose data (e.g., head pose, eye pose, body pose, or hand gestures) that can be used in displaying and understanding the orientation and position of various objects in the user's surroundings. At block 830, the object recognizers 708a-708n may crawl through these collected points and recognize one or more objects using a map database. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
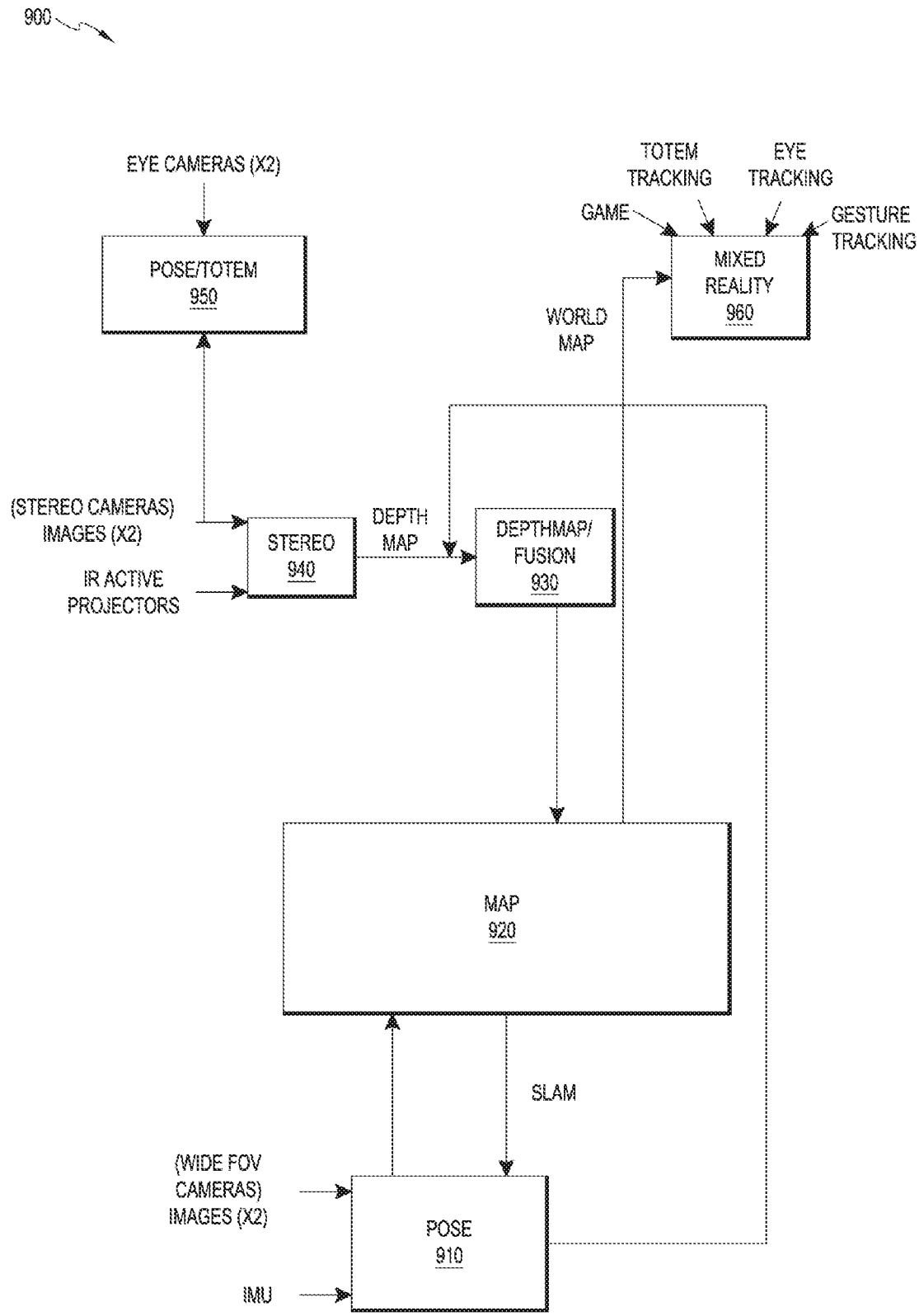
FIG. 9 is a block diagram of another example of a wearable VR/AR/MR system.

FIG. 9 is a block diagram of another example of a wearable VR/AR/MR system. In this example, the wearable system 900 includes a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may include images, data from sensors (such as inertial measurement units, which generally comprise accelerometer and gyroscope components) and surface information pertinent to objects in the real or virtual environment.

A sparse point representation may be the output of a simultaneous localization and mapping (SLAM or V-SLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun, may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
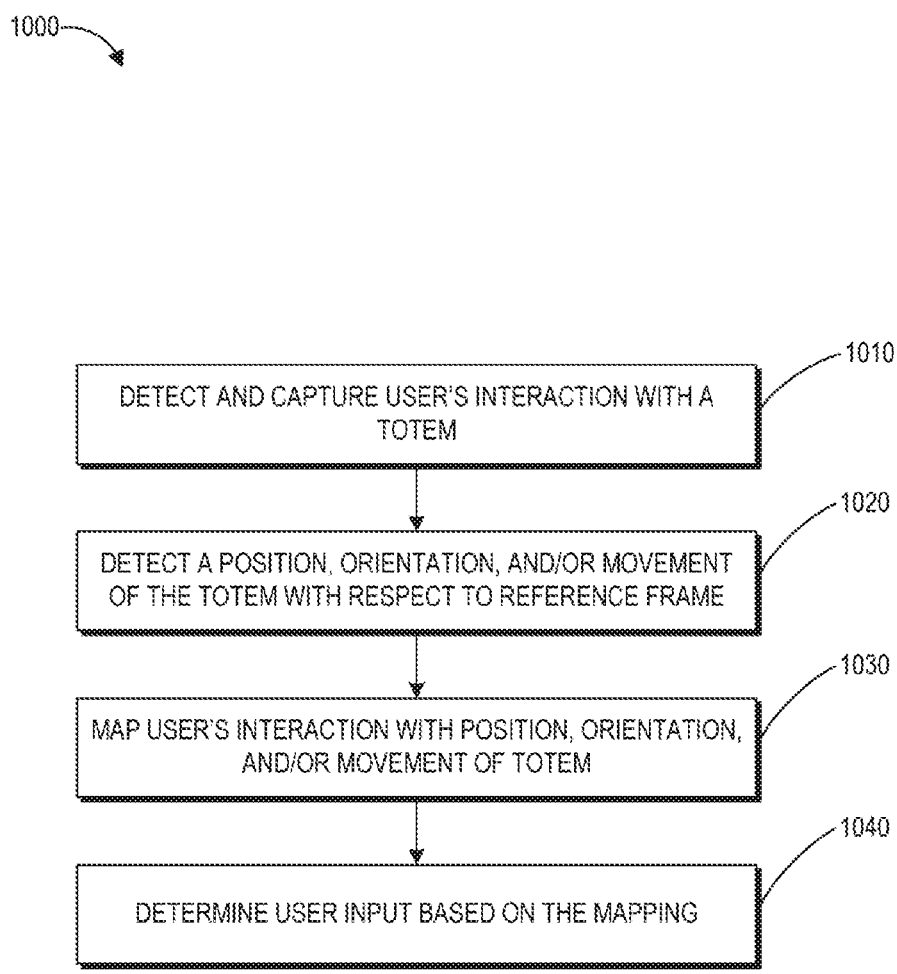
FIG. 10 is a process flow diagram of an example method for determining user input to a wearable VR/AR/MR system.

FIG. 10 is a process flow diagram of an example method 1000 for determining user input to a wearable VR/AR/MR system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward facing system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, and/or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray casting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
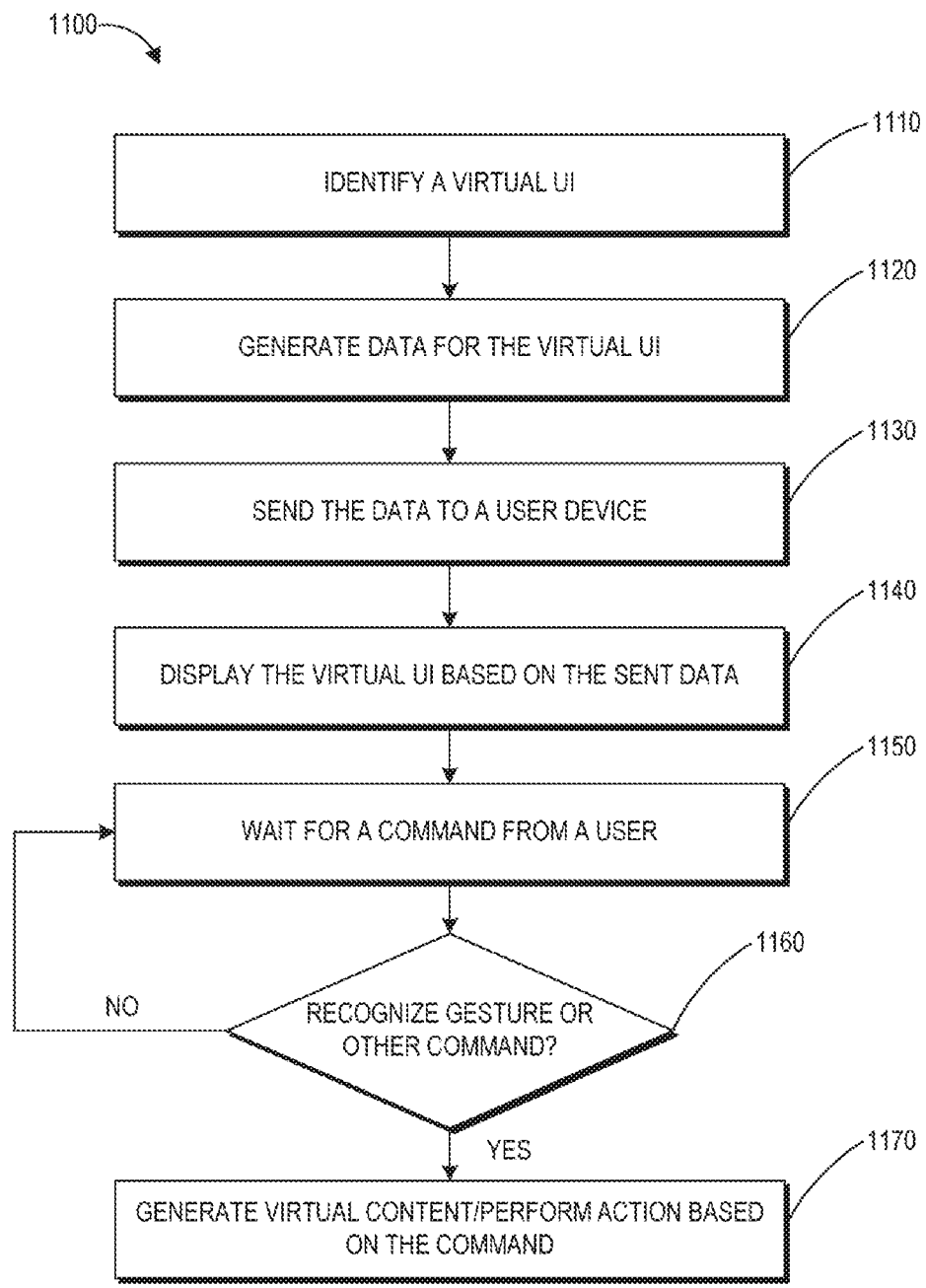
FIG. 11 is a process flow diagram of an example method for interacting with a virtual user interface.

FIG. 11 is a process flow diagram of an example of a method 1100 for interacting with a virtual user interface. The method 1100 may be performed by the wearable system described herein.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body. The wearable system may then wait for the command (a gesture, a head or eye movement, input from a user input device, etc.), and if it is recognized (block 1160), virtual content associated with the command may be displayed to the user (block 1170). As an example, the wearable system may wait for user's hand gestures before mixing multiple steam tracks.

Additional examples of wearable systems, UIs, and user experiences (UX) are described in U.S. Patent Publication No. 2015/0016777, which is incorporated by reference herein in its entirety.

Example Interactions with Various User Input Devices and Modes

Figure 12:
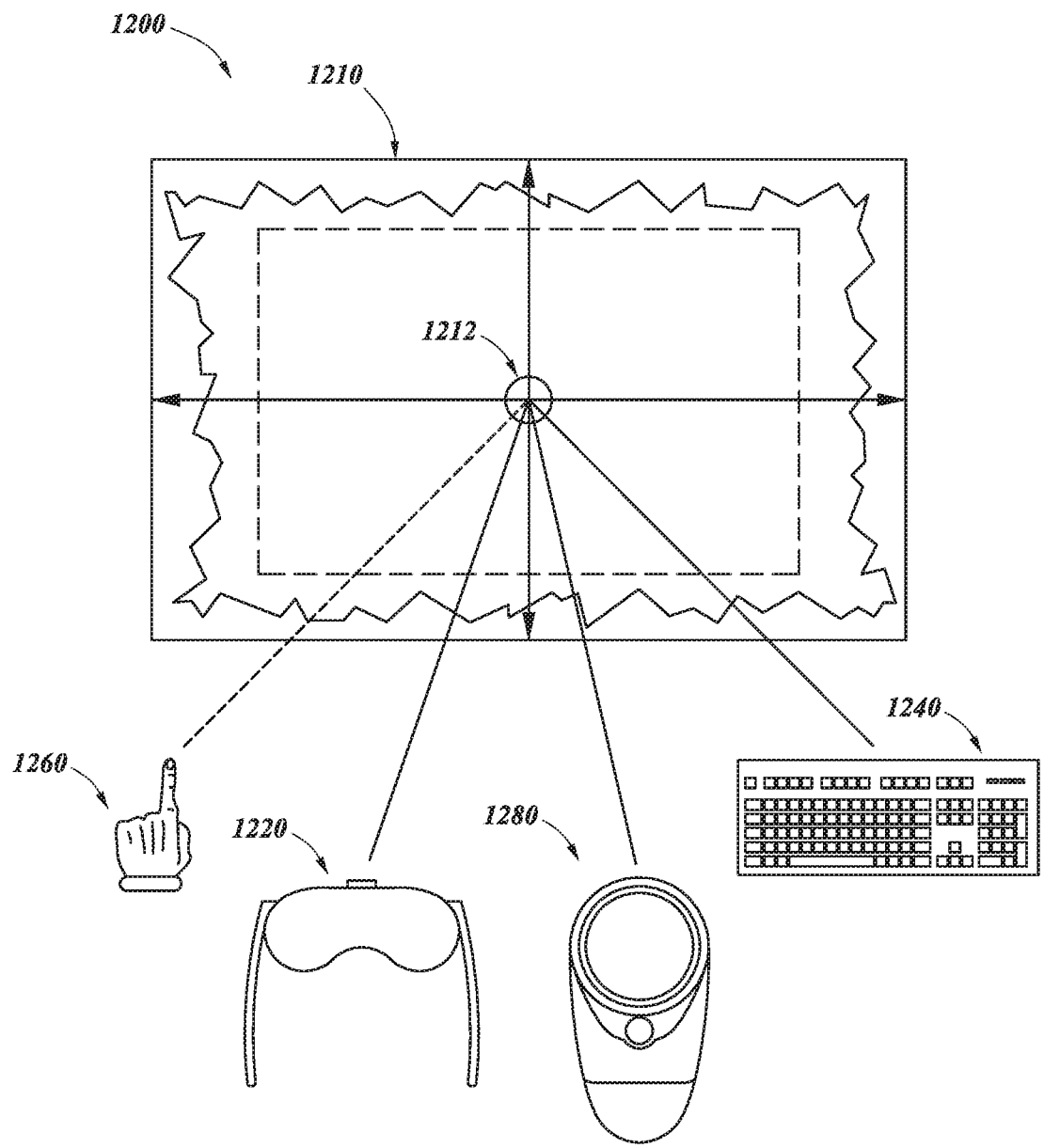
FIG. 12 schematically illustrates examples of interacting with an object using various input modes.

As described with reference to FIGS. 4 and 9, a user can interact with an object in the user's environment using input devices and modes, such as a user input device 466, a voice command, or a pose (e.g., a head pose, an eye gaze, or a hand gesture). FIG. 12 schematically illustrates examples of interacting with an object using various input devices and modes, such as a hand gesture 1260, a touchpad 1280, and a keyboard 1240.

In FIG. 12, a user wearable HMD 1220 can perceive an object 1212 in the user's FOV 1210. The HMD 1220 can be part of the wearable system 200 described with reference to FIG. 2. The object 1212 can be a physical object or a virtual object. The physical object can include an object that is located physically in a user's real surrounding environment. For example, in a living room environment, the physical objects could include a chair, a sofa, a wall, etc. The virtual objects can be superimposed virtually onto the user's real environment or can be objects within a user's virtual environment. The virtual objects may include operating system objects such as, for example, a recycle bin for deleted files, a terminal for inputting commands, a file manager for accessing files or directories, an icon, a menu, an application for audio or video streaming, a notification from an operating system, and so on. The virtual objects may also include objects in an application such as, for example, avatars, in-game objects, graphics or images, etc. Some virtual objects can be both an operating system object and an object in an application. In some embodiments, the wearable system can add virtual elements to the existing physical objects. For example, the wearable system may add a virtual menu associated with a television in the room, where the virtual menu may give the user the option to turn on or change the channels of the television using the wearable system.

A virtual object may be a three-dimensional (3D), two-dimensional (2D), or one-dimensional (1D) object. For example, a virtual object may be a 3D coffee mug (which may represent, for example, a virtual control for a physical coffee maker). The virtual object may also be a 2D graphical representation of a clock (displaying current time to the user). In some implementations, one or more virtual objects may be displayed within (or associated with) another virtual object.

The objects in the user's FOR can be part of a world map as described with reference to FIG. 9. Data associated with objects (e.g. location, semantic information, properties, etc.) can be stored in a variety of data structures such as, for example, arrays, lists, trees, hashes, graphs, and so on. The index of each stored object, wherein applicable, may be determined, for example, by the location of the object. For example, the data structure may index the objects by a single coordinate such as the object's distance from a fiducial position (e.g., how far to the left or right of the fiducial position, how far from the top or bottom of the fiducial position, or how far depth-wise from the fiducial position). The fiducial position may be determined based on the user's position (such as the position of the user's head). The fiducial position may also be determined based on the position of a virtual or physical object (such as a target object) in the user's environment. This way, the 3D space in the user's environment may be collapsed into a 2D user interface where the virtual objects are arranged in accordance with the object's distance from the fiducial position.

The wearable system may keep track of the objects in the FOR as well as the objects in the FOV. For example, the local processing & data module 260 can communicate with the remote processing module 270 and remote data repository 280 to retrieve virtual objects in the user's FOR. The local processing & data module 260 can store the virtual objects, for example, in a buffer or a temporary storage. The local processing & data module 260 can determine a user's FOV using the techniques descried herein. The local processing & data module 260 can access the stored virtual object to identify and render a subset of the virtual objects that are in the user's FOV. When the user's pose changes, the local processing & data module 260 can update the user's FOV and accordingly render the another set of virtual objects corresponding to the user's current FOV.

As described herein, the HMD 1220 can recognize and track the user's hand gesture via one or more object recognizers 708. For example, the HMD can acquire an image of the user's hand gesture using the outward-facing imaging system 464. The object recognizer 708 can analyze the images to identify a hand gesture. In certain embodiments, the user's hand gesture may be tracked by a camera external to the HMD. For example, the camera may include a stationary camera such as, a room camera (which is positioned in a user's environment), a camera that is coupled (wired or wirelessly) to a user input device 466 (e.g., such as a totem or a keyboard), or a camera on another computing device (such as, e.g., a webcam coupled to a personal computer).

The HMD 1220 can also support user interactions with a user input device 466. By way of an example, in FIG. 12, a user can actuate the touchpad 1280 and the keyboard 1240 in FIG. 12 to interact with the object 1212. In certain embodiments, a combination of input devices and modes may be used by a user to interact with the object 1212. For example, a user can open a virtual menu associated with the object 1212 by actuating a key on the keyboard 1240 and move the virtual menu using the hand gesture 1260.

Examples of Pairing a User Input Device with an HMD

The user input device 466 (e.g., the touchpad 1280 or the keyboard 1240) can be coupled to the HMD 1220 via wired or wireless channels (such as, e.g., via Bluetooth or a radio frequency (RF) receiver). The user input device 466 can be paired, or establish a communication connection, with the HMD 1220 wirelessly using, for example, Bluetooth or an RF protocol, or via a wired connection such as, for example, a USB connection. The pairing process may be initiated by the user input device 466 or by the HMD 1220. Where the pairing process is initiated by the HMD, the HMD 1220 can use a variety of techniques to identify a target user input device in the user's environment. For example, the HMD 1220 can query the target user input device directly. This is possible where the device is capable of identifying itself, for example, by RF wireless protocols such as Wi-Fi or Bluetooth, according to a protocol that can support such a query.

The HMD 1220 can also identify the target user input device via visual cues. For example, the HMD 1220 may use the outward-facing imaging system 464 to acquire an image of the target user input device and identify the type of target user input device using the object recognizer 708. The object recognizer 708 can implement, for example, computer vision algorithms such as feature keypoint methods (e.g. SIFT) combined with a Bag of Words type search, or through the application of an artificial neural network (e.g. "Alex-net"). The HMD may identify the target user input device in a hierarchical fashion. For example, the HMD can run a first algorithm to identify that an object is a physical keyboard. The HMD can then run a second algorithm to identify the features of the keyboard, such as the layout of the keyboard or the manufacture/model of the keyboard.

The HMD 1220 can also identify the target user input device based on user input (via poses). For example, the user may identify a keyboard for pairing by pointing his finger at the keyboard. The HMD 1220 can perform a ray casting from the tip of the user's finger and select the keyboard because it intersects with the ray.

As another example, the target input device may include an optically-readable unique label such as a bar code, QR code, LED pattern, etc. The HMD may include an optical sensor (e.g., a world camera) for scanning or imaging the label and extracting information from the label. The extracted information may include device identifiers such as manufacturer, type of the device, etc. The label may be stuck to or imprinted onto the target device. For example, a keyboard 1240 may have a sticker or placard explicitly indicating the make, model, serial number, etc. of the keyboard 1240. As another example, the keyboard's 1240 brand may be imprinted on a surface of the keyboard 1240.

In some embodiments, once the HMD 1220 pairs with a user input device (e.g., the keyboard 1240 or the touchpad 1280), the HMD may access information related to the functionality of the user input device (e.g., by receiving such information from the user input device itself, by downloading from a remote source via a network, by accessing locally stored data, etc.) and set a configuration setting based on the functionality of the user input device. For example, if the HMD 1220 recognizes that the keyboard 1240 is a foreign language keyboard, then the HMD 1220 could change its system language setting (e.g., English, Spanish, Chinese, etc.) to match that of the keyboard 1240.

In addition, in some embodiments, once the HMD 1220 pairs or otherwise detects interaction with a user input device (e.g., the keyboard 1240, the touchpad 1280, or any other totem), the HMD may create or modify a computer data structure in which user inputs or actions received from, or performed using, that particular user input device are tagged, labeled, or otherwise associated with the corresponding HMD with which the user input device was interacting when those inputs were made. The data structure can be shared between (or otherwise made accessible to) multiple HMD devices, such that the data structure may include information relating user inputs from one or more user input devices with one or more HMD devices. In some cases, the data structure may associate user inputs/actions from a single user input device with multiple HMD devices, user inputs/actions from multiple user input devices with a single HMD device, and/or user inputs/actions from multiple user input devices with multiple HMD devices. This information can then be used to create or modify a computer file or virtual object, perform an action, etc. In some cases, the information which associates each user input/action with a respective HMD can be used to indicate the identity of the person who performed the input or action.

For example, users of different HMD devices may alternately use a single keyboard 1240 to enter text, formatting changes, etc. into a text document. The data structure can be used to store those keyboard inputs which were made when the keyboard 1240 was interacting with a first HMD, as well as those user inputs which were made when the keyboard 1240 was interacting with a second HMD. This information can then be used to modify the text document. For example, the respective inputs made while paired to the first and second HMD devices can be used to mark up the text (e.g., with different colors, fonts, formatting, etc.) to show the text, formatting, etc. which was entered or made by the user of the first HMD as compared to those which were entered or made by the user of the second HMD when the second HMD was paired with the keyboard 1240. In other embodiments, the information from the data structure which stores the user inputs/actions together with the corresponding HMD can be used to perform other actions, as well. For example, actions performed in a game or application by a user of a first totem can be detected and differentiated from actions performed by a second user of the same totem. As just discussed, this can be accomplished on the basis of each HMD recognizing the totem with which a user of the HMD is interacting, and then adding to the data structure those actions or inputs which were made while the user was interacting with that totem.

Overview of Example Keyboards

The keyboard 1240 shown in FIG. 12 may be a virtual keyboard rendered by the HMD 1220 or a physical keyboard. In certain implementations, the keyboard 1240 can control multiple devices. For example, the keyboard 1240 can be used to input word descriptions into a desktop computer while the same keyboard 1240 can also be used to input information for interaction with the HMD 1220.

The user can actuate the keyboard 1240 using various hand gestures, such as a touch gesture, a tap gesture, a press gesture, and so on. Different hand gestures may be associated with different input functions. For example, a touch gesture may cause a number, a symbol, or a character to be entered into the HMD 1220 while a press gesture may cause a command prompt to be opened by the HMD 1220. In certain embodiments, not all keys will recognize the same types of hand gestures. For example, the keyboard 1240 can include a touch region that is configured to recognize a touch gesture but not a press gesture. As another example, a keyboard 1240 can include a key that does not support a touch gesture.

The HMD 1220 can detect an actuation of the keyboard using gesture recognitions. For example, the HMD 1220 can track a movement of a user's finger by analyzing (e.g., using the object recognizer 708) images acquired from the outward-facing imaging system 464 or from an external camera. Additionally or alternatively, the HMD 1220 can perform a ray casting based on the user's eye gaze to identify a key that intersects with the user's direction of gaze. The HMD 1220 can accordingly perform an operation (e.g., input a symbol or character, or execute a command, associated with the key) once the key is identified from ray casting. In some embodiments, a predetermined dwell period during which the user looks at the key may be required before considering the key to be "actuated" by the user's eye gaze.

The gesture recognition and ray casting techniques for actuating the keyboard can be applied to a physical keyboard and a virtual keyboard. As a result, the user may not need to touch the physical keyboard or press the physical keyboard in order to actuate a key.

A keyboard 1240 can be associated with one or more specifications. The specifications may include layout of keys and corresponding key functions, touch surfaces, or other controls. As described with reference to FIGS. 13A-13C, the specification of the keyboard 1240 may be dynamically configurable. For example, the keyboard 1240 may be a blank physical keyboard (e.g., the keys of the physical keyboard may not have and/or be labeled with permanently assigned functions, such as permanently assigned characters, numbers, symbols, etc.). The HMD can render one or more virtual keys, with a corresponding dynamically assigned function, onto the keys of the blank physical keyboard. The configuration may change from one to another when, for example, a user switches from one application to another. For example, the HMD 1220 can render a QWERTY layout for a word processing application where a user types with 10 fingers. However, if a user interacts with a web based application which is preferable for two thumb typing, the HMD 1220 can render a KALQ layout onto the blank physical keyboard.

The specification of a virtual keyboard can also be dynamically reconfigurable. For example, a virtual keyboard may be an emulation of a physical keyboard. For example, a wearable system can identify the physical keyboard using the various techniques described herein. The wearable system can further access the specification of the physical keyboard using computer vision techniques or by accessing a database to retrieve the specification. For example, the wearable system may communicate with the manufacturer of the physical keyboard to receive the specification of the physical keyboard. In certain implementations, the specifications may also include the actual codes (e.g., the ASCII codes for characters, numbers, symbols, etc.) to be emulated for each key. As another example, a virtual keyboard may render the keys "A", "D", "W", "S" for one game application while rendering the up, down, left, and right arrow keys for a different game application.

As further described herein, one or more keys on the keyboard 1240 may be touch sensitive. For example, where the keyboard 1240 is a physical keyboard, the space bar on the keyboard may include a touch surface (configured to receive an actuation of the key by the user), a touch sensor which can detect a user's gesture, and a PCB board which can communicate the signal received from a touch sensor to the HMD 1220. Where the keyboard 1240 is a virtual keyboard, the HMD 1220 can detect a touch gesture or a swipe gesture on one or more keys for actuation of the one or more keys.

The keyboard 1240 can include multiple interactive regions. One interactive region can be associated with certain types of user interactions. For example, one interactive region (such as the number pad region of a QWERTY keyboard) can support a touch gesture, a swipe gesture, a tap, and a press gesture, while another interactive region (e.g., the letter region) can only support the press gesture.

Although the examples techniques are described with reference to a keyboard, similar techniques can also be applied to other types of user input device 466. For example, the specification of a totem may also be dynamically configurable. For example, a key on a totem may be associated with a left arrow in a game application while be assigned to a number key in a math-related application.

Examples of a Dynamically Reconfigurable Physical Keyboard

As described with reference to FIG. 12, a physical keyboard may include one or more blank keys which do not have a label (e.g., the keys of the physical keyboard may not have and/or be labeled with permanently assigned functions, such as permanently assigned characters, numbers, symbols, etc.). The wearable system can dynamically reconfigure the specification for at least a portion of the physical keyboard. As described with reference to FIG. 12, the wearable system can recognize a keyboard or keys in a keyboard by communicating with the keyboard or using visual cues. For example, the wearable system can retrieve the layout of the keys in the keyboard by receiving a device identifier from the keyboard and accessing a stored layout by communicating with the remote data repository 280 or a computing device (such as, e.g., a computing device associated with the manufacturer of the keyboard). Additionally or alternatively the wearable system can use an object recognizer 708 to recognize a keyboard as well as the number and location of the keys on the keyboard.

Figure 13B:
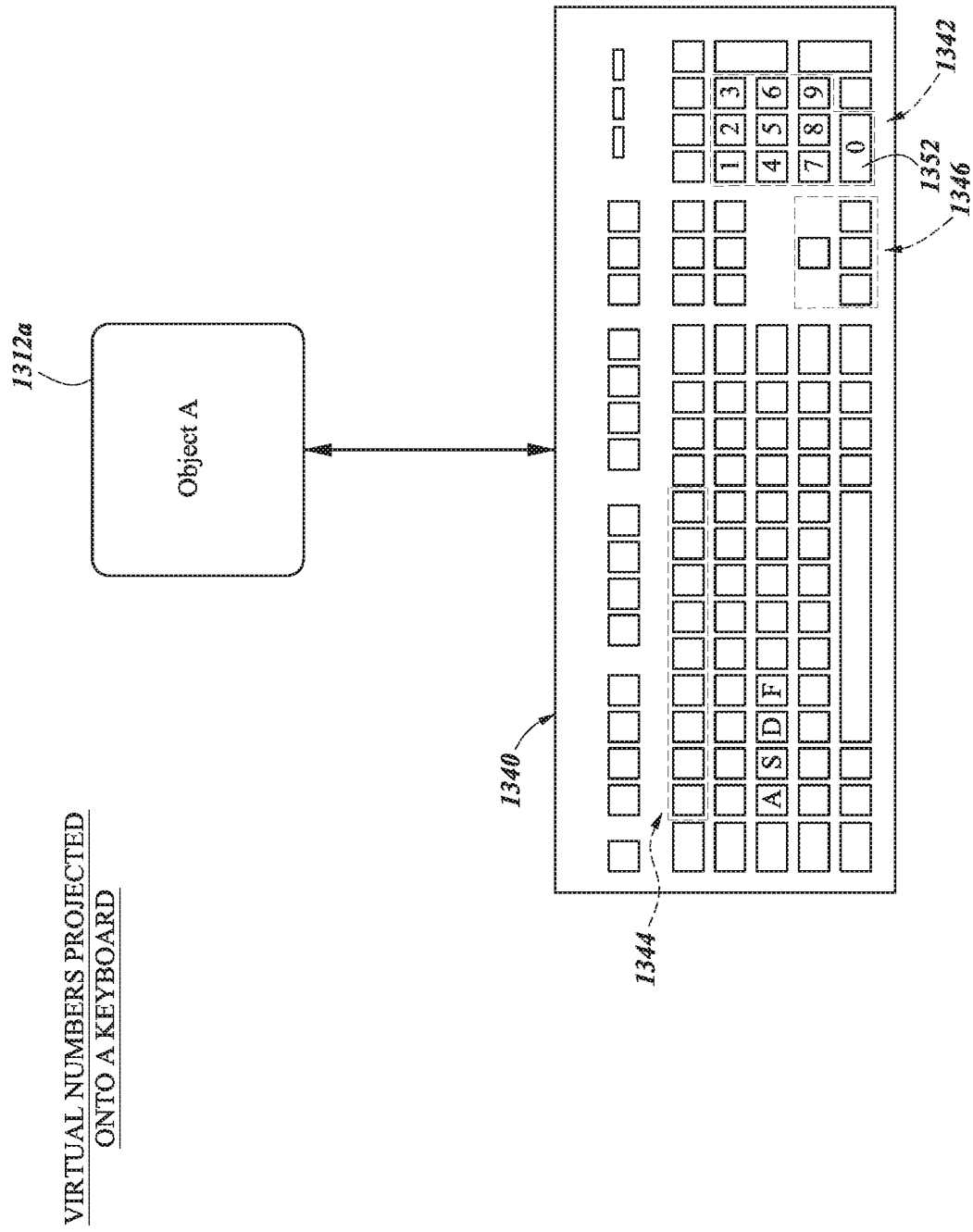

FIGS. 13A-13C illustrate examples of dynamically configuring a specification of a physical keyboard. The configured specification may be used to render virtual key labels over a keyboard. In these figures, a user can perceive a virtual user interface 1310 and a physical keyboard 1340 is shown via an AR/MR scene presented by the HMD 1210. The physical keyboard 1340 may be an embodiment of the keyboard 1240. A portion of the physical keyboard 1340 may include physical labels. As an example, the keys 1322*a*, 1322*b*, 1322*c*, and 1322*d* are labeled as A, S, D, F. As a result, when the key 1322*a* is actuated, the keyboard 1340 may send a signal indicating that a letter A is entered into the system. For example, the signal of the key 1322*a* being pressed may cause a wearable system to identify an ASCII value associated with the key 1322*a*. The wearable system can automatically translate the ASCII value to the letter A for user interface interactions (e.g., when a user inputs a sentence).

Certain portions of the physical keyboard, such as the portions 1342 and 1344 may be blank, meaning that the blank physical keys may not have and/or be labeled with permanently assigned functions, such as permanently assigned characters, numbers, symbols, etc. The HMD 1210 can present virtual key labels based on contextual information.

The contextual information may be associated with the physical keyboard, such as, for example, the position or orientation of the physical keyboard, the existing layout, the types of actuations (e.g., a touch, a swipe, etc.) supported by the physical keyboard, the size of the keyboard, the number and location of the blank keys, etc. For example, the layout for section 1342 is suitable for numbers. As a result, the HMD 1210 can render numbers 0-9 as virtual image data superimposed onto the physical keys (as AR image data) in the section 1342 as shown in FIG. 13B. The wearable system can recognize the section 1342 and its layout using various computer vision algorithms described with reference to FIG. 7. For example, the wearable system can acquire an image which illustrates the shape of the surface associated with the sections 1342. In this example, the surface associated with the section 1342 can include 10 square shaped bumps and 1 rectangular bump. The object recognizer 708 can match this surface shape with a layout of 10 square shaped keys and one rectangular shaped key. In certain embodiments, the physical keyboard may have one or more keys pre-labeled.

As a result, the wearable system can recognize that an object is a keyboard by detecting the labels of the keyboard (e.g., a sequence of a letter string "QWERTY" in an image). As another example, the spacebar (illustrated as the key 1324) may have a touch sensitive surface. As a result, the HMD may render a sliding bar on the key 1324 and the user can hold and move the sliding bar from one end to another end to perform a user interface operation, such as, for example, opening/closing an application or moving a virtual object in the same direction as the movement of the sliding bar. As yet another example, a user may move the physical keyboard, such as, for example, from a living room to an end desk in the bedroom. As a result of the movement, the wearable system can re-determine the position of the physical keyboard and update the rendering locations of the virtual key labels accordingly. The wearable system can track the location of the physical keyboard using the object recognizer 708. For example, the wearable system can acquire images of the physical keyboard and use object recognizer 708 to parse the images to identify the physical keyboard. In certain embodiments, the wearable system can use a template to match the positions of the keys in the physical keyboard. The template may track the shape of the physical keyboard's surface. While parsing the images, the object recognizer 708 can attempt to align the template with the physical keyboard in the image. Once the alignment is successful, the object recognizer 708 can determine the location of each key based on the template. Furthermore, the user may change the location or orientation of the keyboard while typing (e.g., to achieve a more comfortable position, etc.). The wearable system can also detect such changes in orientation of the keyboard and adjust the rendering locations of the virtual keys accordingly.

The contextual information may also be associated with the characteristics of the user's environment or an application being executed by the HMD, such as, for example, the layout, location, size of the objects in the user's environment, the type or interactive features of an object that a user is currently interacting with, the lighting condition of the user's environment (e.g., for adjusting the illuminations of the keys) and so on. For example, the key 1324 may include a sliding bar if the objects in the user's environment are located relatively far away from each other. By sliding on the key 1324, a user can more quickly move a virtual object to another location. However, if the objects in the user's environment are more densely together, the wearable system may not render the sliding bar. Rather, the user may need to rely on arrow keys in the section 1346 to move a virtual object. By using the arrow keys, the user can move the virtual object in a more refined fashion and can avoid collision of the virtual object with another object. As another example, the user may want to use a keyboard while interacting with an appropriately enabled physical refrigerator in the user's kitchen. In this example, the user can use the keyboard to program the refrigerator (e.g., such as the temperature of the refrigerator). The wearable system can detect the user's eye gaze direction and use ray casting technique to identify the refrigerator. The wearable system can further determine that the user intends to program the refrigerator when the user actuates the keyboard (e.g., by detecting a press on the key 1324 for an extended period of time) or when the user shows a certain gesture. As a result, the wearable system can render various controls specific to the fridge on the keyboard 1340. For example, the wearable system can render a number of preset temperatures, such as, for example, 0, −10, or 4 degree Celsius, on keys in section 1342 while rendering an up arrow and a down arrow in the section 1346 for the user to further adjust the temperatures.

FIGS. 13B and 13C illustrate an example of dynamically reconfiguring the keyboard 1340 based on the type and interactive features of an object. A user can perceive a virtual object A 1312a via the HMD 1210. The virtual object A 1312a may be rendered in a 3D environment of the user. The virtual object A 1312a may include a math application. As a result, the HMD 1210 can render the numbers 0-9 onto section 1342 of the keyboard 1340. In some situations, the math application may include both accounting features and mathematical features. The HMD 1210 can render the specification as shown in FIG. 13B if the user uses the accounting features. However, if the user switches to the mathematical features, the HMD may 1210 render additional keys that are specific to the mathematical features. For example, the HMD may render symbols associated with mathematical operators in the keyboard section 1344. If the user is interacting with the virtual object B 1312b rather than the virtual object A 1312a, the wearable system can adjust the specification of the keyboard 1340 to the one as shown in FIG. 13C. The specification in FIG. 13C includes symbols in the section 1342 and the numbers are rendered in the section 1344 rather than in the section 1342 (as shown in FIG. 13B). This may be because the virtual object B 1312b is associated with a word processing application rather than a math related application.

The contextual information may further be based on the user's characteristics, such as, for example, the user's demographic information, the user's preference, or the user's past interactions. For example, the wearable system can determine the user's native tongue and superimpose key labels on the keyboard 1340 in accordance with a specification that is designed for the user's native language. As another example, the wearable system can identify a few frequently used Emojis based on the user's past typing behavior and render the Emojis in the section 1342 of the keyboard 1340 for the user to access. As yet another example, the wearable system may determine that AZERTY layout is preferred over QWERTY layout for a user by receiving a selection of the AZERTY layout as the default layout from the user or by observing the user's past interactions with the wearable system (e.g., user often selects an AZERTY layout rather than a QWERTY layout). As a result, the wearable system can render AZERTY layout on the keyboard 1340 rather than the QWERTY layout.

In various embodiments, the contextual information can include characteristics of an HMD, such as, for example, optical characteristics of the display 220. For example, the user's AR/MR FOV as perceived through the display 220 may be smaller than the size of the physical keyboard. As a result, the user may not be able to perceive the whole keyboard 1340 while the user is interacting with the HMD. To solve this problem, the wearable system can dynamically move the positions of the keys based on the user's eye gaze and head pose. For example, while a game that a user is playing may require four directional keys (up, down, right, and left), the wearable system can initially render the four directional keys in the section 1346. However, if the user turns left, the user's FOV may accordingly be updated. To ensure that the four direction keys are still in the user's FOV (e.g., by maintaining the relative positions between the four direction keys and the user's FOV), the HMD can move the rendering locations of the 4 directional keys leftward on the keyboard 1340 accordingly. As a result of this movement, the 4 directional keys are no longer rendered on the keys in the section 1346.

The HMD can use a variety of techniques to render key labels onto the physical keyboard 1340. The HMD can render a key value (e.g., a letter "B" or an "$" sign) on the physical key of the keyboard via a pixel stick of the key value. The pixel stick can cause an image or a pixel to "stick" with a location in the 3D space or with an object (e.g., a key). As another example, the wearable system can overlay a virtual keyboard which matches the physical characteristics of the physical keyboard (e.g., the size, locations of the keys, etc.) to be on top of the physical keyboard. In various embodiments, the wearable system may render virtual key labels to a portion of the keyboard 1340. For example, the wearable system can render virtual key labels into the section 1342 but not the other sections of the keyboard 1340. Where some of the other sections of the keyboard 1340 is pre-labeled (with physical labels), the user can see through the display 220 and interact with these pre-labeled keys based on the functions indicated by the physical labels.

In certain embodiments, the wearable system can render virtual key labels onto the keys that already have the physical labels. The virtual key labels may be rendered at a location that does not occlude the physical labels. For example, a user may use both English and Hebrew when interacting with the HMD. The keyboard 1340 may be pre-labeled with English characters. However, when a user switches the input mode to Hebrew, the wearable system can render Hebrew characters onto the keys of the keyboard. A Hebrew character may be rendered close to the English character on a certain key. The position of the Hebrew character may not occlude the English character. As a result, the user can perceive both the English character (e.g., due to the physical label) and the Hebrew character (e.g., due to the virtual label). In some implementations, the virtual key labels may occlude the physical label. For example, the brightness of the virtual key labels may be greater than the light in the user's environment. As a result, the user may not be able to perceive the physical label when a virtual key label is rendered over the physical label.

In addition to or in alternative to the rendering locations of virtual key labels, the wearable system can also dynamically update the function of a key in accordance with the specification. With references to FIGS. 13B and 13C, when the key 1352 is initially assigned to be 0, the wearable system can translate a signal indicating an actuation of the key 1352 to ASCII value associated with 0. The wearable system can accordingly perform an operation in accordance with an input value of 0. However, in FIG. 13C, the key 1352 is assigned to an equal sign. As a result, the wearable system can translate a signal indicating an actuation of the key 1352 to ASCII value associated with "=". The wearable system can accordingly perform an operation (e.g., a mathematic operation) in accordance with this input.

Although the example keyboard 1340 in FIGS. 13A-13C includes keys that have physical labels, in certain embodiments, the keyboard 1340 can be entirely blank and the wearable system can render virtual key labels onto the physical keyboard based on the contextual information. Further, in various embodiments, more than one contextual factor may be used to determine the specification of the physical keyboard. For example, the wearable system can consider the user's preference in addition to the application that a user is currently interacting with in order to determine which layout should be rendered onto the physical keyboard 1340. Although these examples are described with reference to a physical keyboard, similar techniques and contextual information can also be used to dynamically reconfigure a virtual keyboard. For example, the wearable system can dynamically update a keyboard template (having certain virtual keys) to various virtual key values based on the contextual information described with reference to FIGS. 13A-13C.

In addition to dynamically reconfiguring the assigned functions of the keys of a physical keyboard, the keyboard 1340 can include haptic transducers or other mechanical or electrical elements which can be used to dynamically change the "feel" of one or more keys of the physical keyboard. One or more such elements can be provided per key. Any characteristic that relates to the way a key feels or responds to a user when actuated can be changed by these elements. For example, the resistance, weight, travel, etc. of a key can all be changed. Changes in the actuation characteristics of any key can be performed in response to a change in the specification of the keyboard. For example, the actuation characteristics of the keys can be changed to offer a more piano-like feel if the HMD is executing an AR piano application. Or the actuation characteristics can be changed to be typewriter-like if the HMD is executing an AR typing application.

Example Sections and Interactive Regions of a Keyboard

In certain embodiments, a physical keyboard can be reconfigurable such that the keyboard can be assembled from multiple sections. The keyboard can also be taken apart into the multiple sections. Advantageously, in some embodiments, a reconfigurable keyboard can allow a user to easily change the size and shape of the keyboard.

FIG. 14 illustrates an example of a reconfigurable physical keyboard 1420. The reconfigurable physical keyboard 1420 may be an example embodiment of the keyboard 1240 shown in FIG. 12. The physical keyboard 1420 can be separated into sections such as 1412, 1414, and 1416, and other sections 1418. For example, while a user is playing a game, a user may use the section 1414 rather than the whole keyboard 1420. By detaching the section 1414 from the keyboard 1420, the user doesn't have to carry the whole keyboard around 1420 while interacting with the HMD 1210. As another example, the user can piece the section 1412 and the section 1416 together to create a new keyboard. The user can further attach other sections to the new keyboard to customize the layout of the keys in the new keyboard. For example, the user may want the keys in the section 1414 to be larger than that in the section 1420. As a result, the user may replace the section 1414 with another section which provides bigger keys than the ones in the section 1414. The other section may be physical attached to the keyboard 1420 so that the user can have a customized keyboard with bigger keys that are in the original section 1414 of the keyboard 1420. Each section can include mechanical and/or electrical connectors to mate with other sections and/or to establish electrical communication between sections.

The individual sections can be divided based on mechanical characteristics of the keyboard or keys, the functions or potential commands associated with the keys. For example, in some embodiments, the spacebar key may be in a section by itself. The user can attach multiple space bar keys in a sequential manner to create a keyboard which resembles piano keys. As a result, the user can use the assembled keyboard when the HMD presents a virtual piano for a user to play. As another example, a section of keys may be rectangular in shape which can reduce the likelihood of assembling multiple sections in to a shape that may be inconvenient for a user to move.

As described with reference to FIG. 12, a keyboard may be divided into multiple interactive regions where each interactive region may support similar user interactions or perform similar functions. The interactive regions may or may not coincide with the sections of the keyboard. For example, the keyboard can include one interactive region to coincide with the section 1414 and another interactive region to coincide with the section 1416. The interactive region coinciding with the section 1414 may be designed for moving the objects (e.g., up/down/left/right), while the interactive region coinciding with the section 1416 may perform functions such as numerical manipulations. The section 1412, however, can have two interactive regions, where one interactive region 1422b is illustrated in a darker shade than the other interactive region 1422a. The keys in the interactive region 1422a may include capacitive touch sensors and as a result, can detect a touch gesture. The keys in the interactive region 1422b, however, may not be equipped with capacitive touch sensors and therefore they may not recognize touch gestures. As another example, the user can assemble the section 1412 and the section 1416 into a new keyboard. The new keyboard may be considered as one interactive region even though the keyboard has multiple sections.

As described with reference to FIGS. 13A-13C, the keys may have pre-printed physical label or may be blank. The user can assemble a keyboard with all keys blank, or with all keys having pre-printed physical labels and permanently assigned functions, or only have a portion of the keyboard pre-printed (e.g. one section is blank, while the other section has pre-printed labels). The HMD can configure an assembled keyboard using similar techniques described with reference to FIGS. 13A-13C. For example, the HMD can recognize how many keys and the position of the keys in the assembled keyboard using the object recognizer 708. Once the HMD determines the physical layout of the assembled keyboard, the HMD can determine whether one or more keys are blank (e.g., because the image of the keys do not have labels on them) and what functions/virtual labels will be assigned to blank keys.

Although the examples in FIG. 14 are described with reference to a physical keyboard, similar techniques can also be applied on a virtual keyboard. For example, a user can use hand gesture and arm movements to assemble or disassemble a virtual keyboard. The sections in the physical keyboard may correspond to defined template of the virtual keyboard.

Example User Experiences with a Keyboard

As described with reference to FIG. 12, the keyboard 1240 can interact with objects in the user's FOV and FOR. FIG. 15A schematically illustrates an example of a field of regard (FOR), a field of view (FOV) of a world camera, a field of view of a user, and a field of fixation of a user.

As described with reference to FIG. 4, the FOR 1500 comprises a portion of the environment around the user that is capable of being perceived by the user via the wearable system. The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle.

The field of view of a world camera 1570 can include a portion of the user's FOR that is currently observed by an outward-facing imaging system 464. With reference to FIG. 4, the field of view of a world camera 1570 may include the world 470 that is observed by the wearable system 400 at a given time. The size of the FOV of the world camera 1270 may depend on the optical characteristics of the outward-facing imaging system 464. For example, the outward-facing imaging system 464 can include a wide angle camera that can image a 190 degree space around the user. In certain implementations, the FOV of the world camera 1570 may be larger than or equal to a natural FOV of a user's eyes.

The FOV of a user 1550 can comprise the portion of the FOR 1500 that a user perceives at a given time. The FOV of the user 1550 can depend on the size or optical characteristics of the display of a wearable device. For example, an AR display may include optics that only provides AR functionality when the user looks through a particular portion of the display. The FOV 1550 may correspond to the solid angle that is perceivable by the user when looking through an AR display such as, for example, the stacked waveguide assembly 480 (FIG. 4) or the planar waveguide 600 (FIG. 6). In certain embodiments, the FOV of a user 1550 may be smaller than the natural FOV of the user's eyes.

The wearable system can also determine a user's field of fixation 1590. The field of fixation 1590 can include a portion of the FOV 1550 at which the user's eyes can fixate (e.g., maintain visual gaze at that portion). The field of fixation 1590 can be smaller than the FOV 1550 of a user, for example, the field of fixation may be a few degrees to about 5 degrees across. As a result, even though the user can perceive some virtual objects in the FOV 1550 that are not in the field of fixation 1590 but which are in a peripheral field of view of the user.

Examples UI Interactions with a Physical Keyboard

Figure 15B:
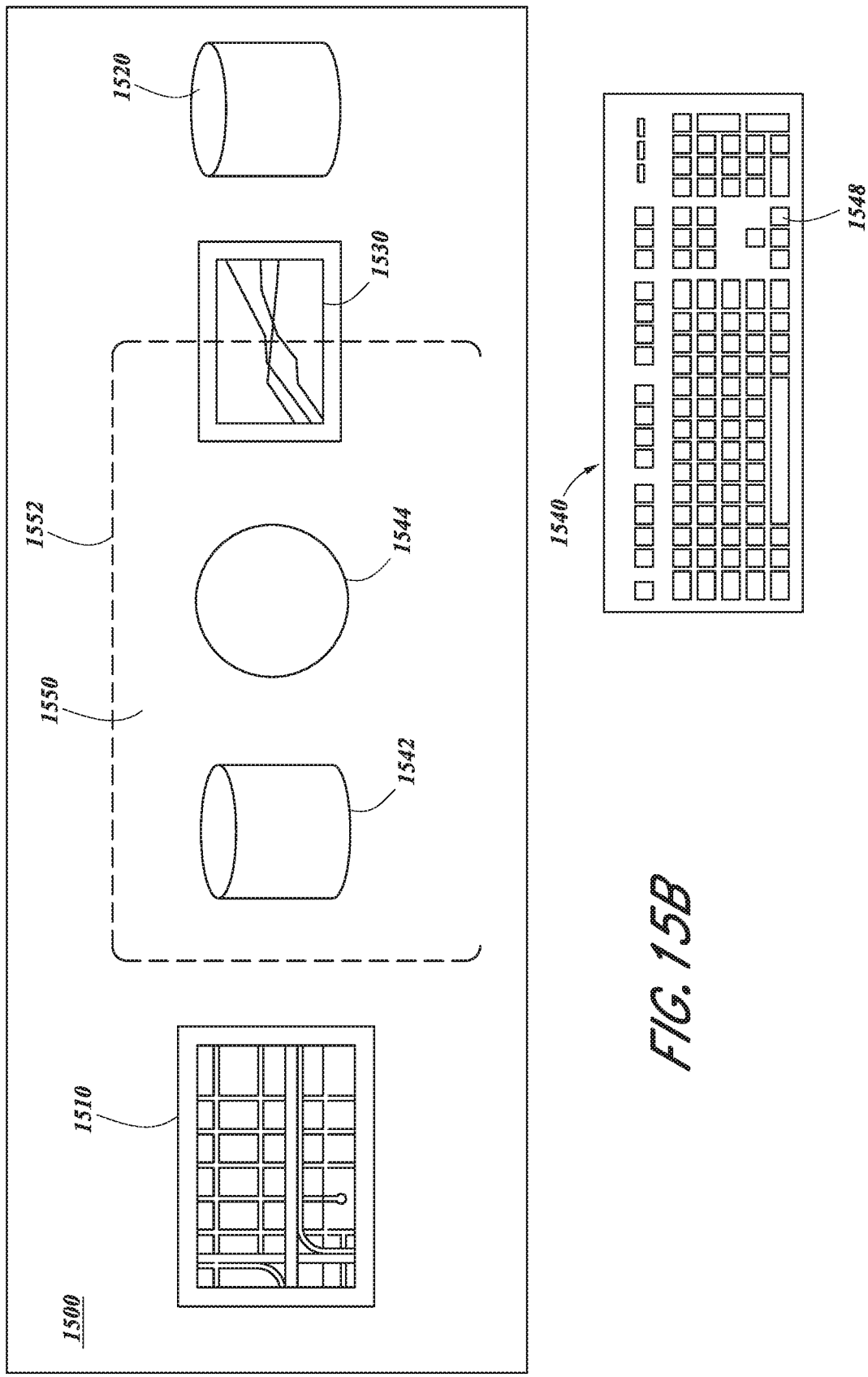
FIG. 15B illustrates an example of interacting with virtual objects in the user's FOR and FOV using a physical keyboard.

FIG. 15B illustrates an example of interacting with virtual objects in the user's FOR 1500 and FOV 1550 using a physical keyboard 1540. In FIG. 15B, the FOV 1550 is schematically illustrated by dashed line 1552. The user of the wearable system can perceive multiple objects in the FOV 1550, such as the virtual object 1542, the virtual object 1544, and a portion of the virtual object 1530. The user may not be able to directly see the virtual objects 1510 and 1520 because they are in the FOR 1500 but not in the FOV 1550.

A user can actuate the keyboard 1540 to move virtual objects in and out of the FOV 1550. For example, a user may press the key 1548 to move objects rightward. In this example, the virtual map 1510 is initially outside the user's FOV 1550. If the key 1548 is touched, the virtual map 1510 may move into the user's FOV 1550, and, for example, the virtual object 1230 may move outside the user's FOV 1550.

As described with reference to FIGS. 13A-13C, the keyboard 1540 may be a keyboard with blank keys and the wearable system can assign the blank keys to a certain function and a virtual label corresponding to the function. In some embodiments, if FOV 1550 changes due to a change in the user's pose (e.g. head pose or eye gaze), the wearable system can dynamically update the rendering location of the virtual label and can reassign the function to a new key so that the user can still actuate the keyboard 1540 to perform the same function.

Figure 15C:
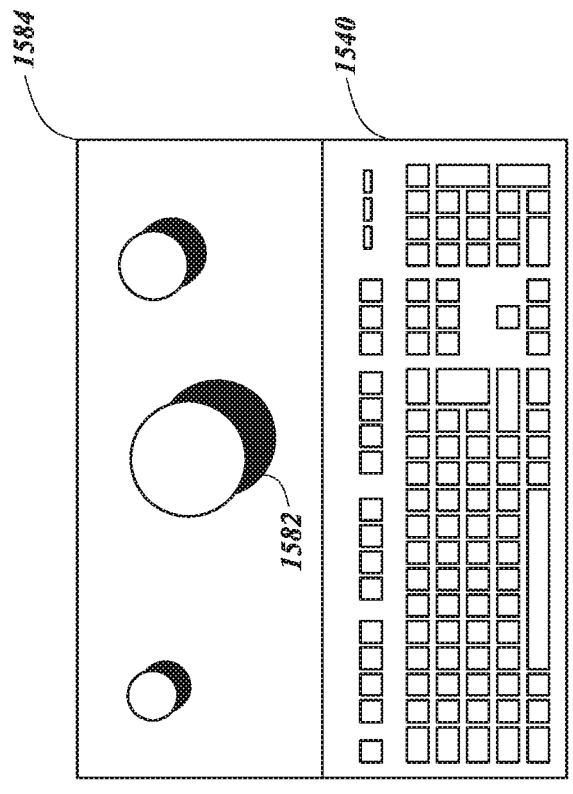
FIG. 15C illustrates an example of presenting a virtual screen associated with a physical keyboard.

FIG. 15C illustrates an example of presenting a virtual screen associated with a physical keyboard. The physical keyboard can include a blank physical screen which attaches to, extends from, or is otherwise integrated with the physical keyboard. Such a physical screen can serve as a location for rendering a virtual screen with one or more virtual keys or other interactive features. The wearable system can present a virtual screen associated with a physical keyboard. The actuation of the physical keyboard may cause a user interface operation to be performed on the virtual screen. For example, the wearable system can present a virtual screen 1584 to appear near the keyboard 1540. When a user presses on the keyboard 1540, the user may move or change the size of the virtual object 1582 on the virtual screen 1584. In certain embodiments, the virtual screen 1584 can render an image of the keyboard 1540. When a user actuates a key on the keyboard 1540, the wearable system can provide a visual focus indicator to a corresponding key on the virtual screen 1584. The visual focus indicator can include a halo (substantially surrounding or near the corresponding virtual key), a color, a perceived size or depth change (e.g., causing the corresponding virtual key to appear closer and/or larger), or other visual effects which draw the user's attention. Advantageously, in some embodiment, by presenting a virtual screen 1584 corresponding to the physical keyboard 1540, the user does not need to look down in order to know which key he is pressing. This can reduce user fatigue when the user interacts with an HMD.

In certain implementations, the size of the virtual key label rendered on the physical keyboard 1540 may change based on the user's head pose. For example, the physical keyboard 1540 may be presented on a table. The virtual key label may be enlarged to help the user to see which key the user is pressing when the IMU of the HMD detects that a user is looking down at the physical keyboard 1540. This size change is not limited to situations where the physical keyboard 1540 has a corresponding virtual screen. The size change can also be implemented, for example, when the user is interacting with objects in the FOV and FOR as shown in FIG. 15B.

The wearable system can update the rendering location or set the virtual screen to become visible/invisible based on the contextual information described herein. For example, the wearable system can display the virtual screen 1584 if the keyboard 1540 is in the user's FOV. If a user's pose changes and the keyboard 1540 is no longer in the user's FOV, the wearable system can hide the virtual screen 1584. The virtual screen 1584 may be associated with various visual effects. For example, the wearable system can present an animation of rolling down the virtual screen 1584 when the virtual screen 1584 is set to visible. The wearable system can also present a rolling up animation when the virtual screen 1584 is set to invisible.

As described herein a physical keyboard can be used to interact with virtual objects or physical objects. Where the interactions are with the physical objects, the wearable system can detect an actuation of the physical keyboard (e.g., via signals from the capacitive sensor of the physical keyboard) and communicate a corresponding command to the physical object (e.g., a refrigerator, a television, or a coffeemaker, etc.) to cause the physical object to perform an action (e.g., to turn on/off, to change temperature, to change channel/volume, etc.).

Example UI Interactions with a Virtual Keyboard

In various embodiments, the wearable system can generate a virtual keyboard which can be used for interactions with physical or virtual objects in the user's environment. The virtual keyboard may be rendered with superimposed AR image data on a surface, such as, for example, a table or a wall, or be rendered in the user's 3D environment (e.g., rendered in front of a user without colliding with a surface).

As described herein, the virtual keyboard is also dynamically configurable based on the contextual information. In one example, the wearable system can determine a specification of a virtual keyboard based on the object that a user is currently interacting with and can render a virtual keyboard in the user's environment based on the specification. For example, the wearable system can determine the most frequently used keys that are used for interaction with the object and can render a virtual keyboard to include the most frequently used keys. If the user wants to use keys that are not the frequently used keys, the user may actuate the virtual keyboard or change his pose to cause the wearable system to bring up additional keys that were not previously rendered on the virtual keyboard. As another example, if an application is a math based application, the wearable system can render a virtual number pad. If the application involves a foreign language (e.g., a language learning application or a messenger application), the wearable system can render a virtual keyboard where the keys are customized to the foreign language.

As another example, the virtual keyboard may be an emulation of a physical keyboard in the user's environment. As described with reference to FIG. 12, after the wearable system recognizes the physical keyboard, the wearable system can access the specification of the physical keyboard, for example, from the remote data repository 280. The wearable system can render a corresponding virtual keyboard in the user's environment. As a result, the user does not have to carry the physical keyboard around in order to interact with objects in the user's environment.

In some situations, where the physical keyboard is reconfigurable, the wearable system also updates the virtual keyboard accordingly when the wearable system detects an update of the physical keyboard's configuration. For example, the user may initially interact with a physical keyboard A. The wearable system can accordingly render a virtual keyboard in accordance with the specification of the physical keyboard A. However, the user may assemble a new physical keyboard by physically attaching the keyboard A with the keyboard B so that the new physical keyboard can have two sections, one section corresponding to the physical keyboard A while the other section corresponds to the physical keyboard B. The wearable system can detect that a new keyboard is assembled based on the keyboard A and the keyboard B based on images acquired by the outward-facing imaging system 464 or by a camera external to an HMD. For example, the wearable system can track the movement of the physical keyboards A and B as the user assembles them together. The wearable system may also analyze the image of the physical keyboard to identify the specification of the physical keyboard based on the visual cues (such as, for example, the layout of the keys, the labels on the keys of the physical keyboard, etc.). The wearable system can identify the specification by combining the specifications for the physical keyboards A and B. The wearable system can also access a data store to retrieve the specification based on the visual cues of the specification. The wearable system can update the virtual keyboard and render the virtual keyboard in accordance with the specification of the new physical keyboard. The updated virtual keyboard may have the layout and functions of the new physical keyboard.

In some embodiments, a user can switch between a physical keyboard and a virtual keyboard based on a change in the user's pose or based on an actuation of a user input device. For example, if a user presses a key on the physical keyboard, then the wearable system can change the input mode from a virtual keyboard to the physical keyboard. As another example, a user can use a hand gesture (e.g., waiving his or her hand twice) to cause the HMD to present a virtual keyboard for a user to interact.

The wearable system can also automatically perform the switch. The automatic switch may be based on the user's pose (e.g., gesture, head pose, eye gaze, etc.). For example, the wearable system can present a virtual keyboard for a user interaction. As the user moves his or her body and head around, the wearable system may detect and recognize a physical keyboard in the user's FOV. The wearable system can cause the virtual keyboard to be rendered onto the physical keyboard and dynamically configure the functions of the physical keyboard to include the functions of the virtual keyboard. The user can accordingly interact with the wearable system using the physical keyboard. In some situations, the wearable system may render a portion of the virtual keyboard onto the physical keyboard. For example, the physical keyboard may be a number pad. However, the virtual keyboard can also include other keys that are not numbers (such as, for example, letters). As a result, the wearable system may render virtual labels for the numbers onto the number pad but not render the rest of the virtual keys onto the number pad. If the number pad has been pre-labeled, the wearable system may hide the number keys in the virtual keyboard but allow a user to enter the numbers via the number pad.

FIGS. 16A-16D illustrate examples features and user interactions with a virtual keyboard. The user's environment may be associated with multiple virtual keyboards. For example, an object may be interacted with using a QWERTY keyboard or a Dvorak keyboard. As another example, there may be multiple physical keyboards in the user's environment which can cause the wearable system to create multiple corresponding virtual keyboards. As yet another example, the objects in the user's environment may be associated with different virtual keyboard. The television 1610 may be associated with a virtual keyboard having a layout similar to a remote controller while the virtual avatar 1624 may be associated with a virtual keyboard having a touchable region.

The user can select a virtual keyboard using poses or by actuating a user input device. For example, a user can select the virtual keyboard by staring at the virtual keyboard for a certain time period (e.g., 5, 10, 15 seconds, etc.). The user can also use a totem to point at an object (e.g., the television 1610 or the avatar 1624), which can cause the wearable system to present a virtual keyboard associated with the object. In some embodiments, the wearable system can cause multiple virtual keyboards to be rendered in the user's environment. The user can select one or more virtual keyboards by using a grab gesture. The user can also remove the other virtual keyboards using a throw-away gesture.

Figure 16A:
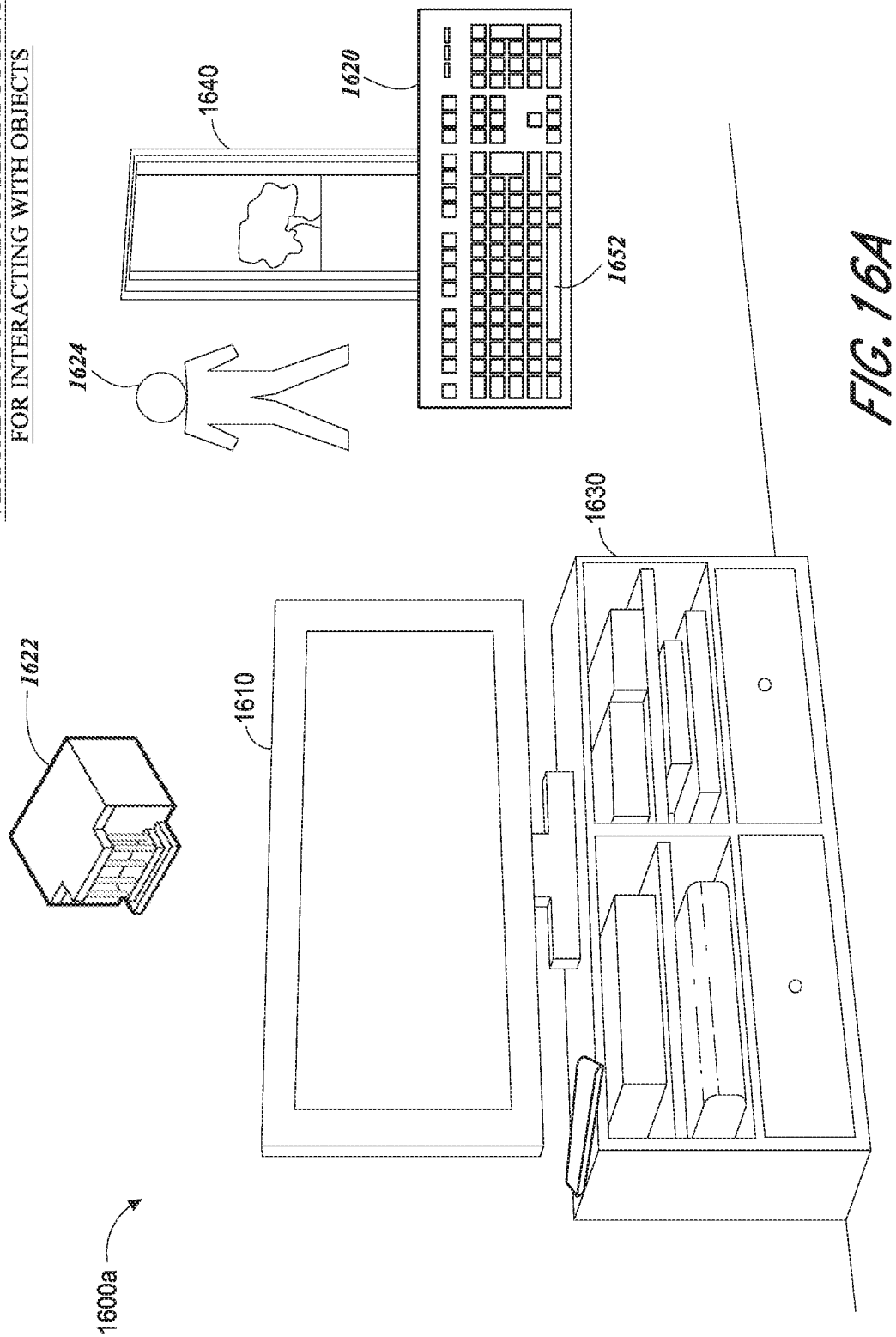

FIG. 16A illustrates an example of an environment as perceived by a user of an HMD. The example environment 1600a includes a living room of a user's home. The environment 1600a has physical objects such as a television (TV) 5110, a TV stand 1630, and a window 5140 and virtual objects such as a virtual building 1622 and a virtual avatar 1624.

Figure 16B:
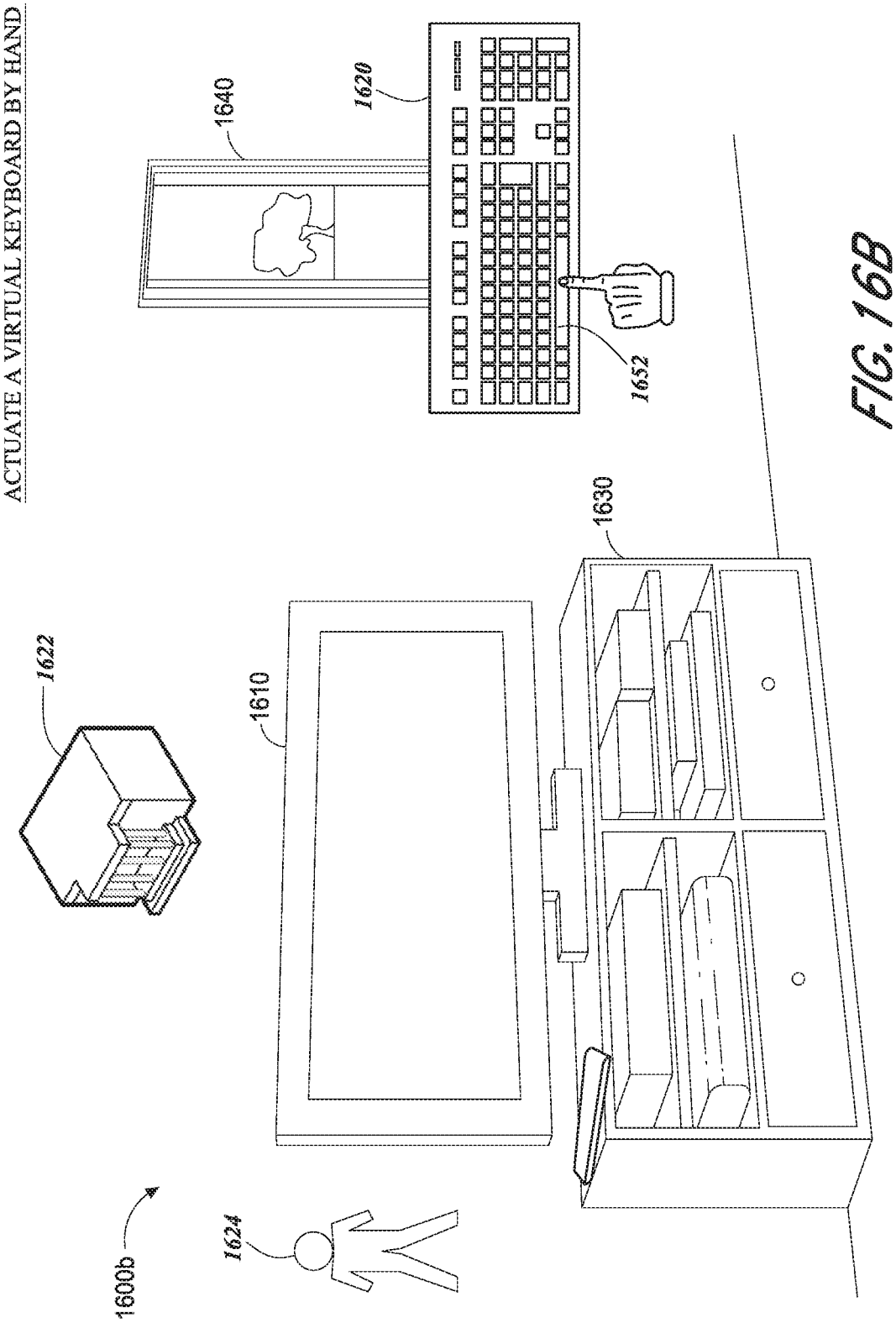

While the user is wearing the HMD, the user can perceive the physical objects and interact with the physical objects with a virtual keyboard. For example, the user may watch the TV 1610 while wearing the HMD. The virtual keyboard 1620 may serve as a remote to control the TV (see e.g., shown in FIG. 16D). For example, the user can actuate a virtual space bar key 1652 (as shown in FIG. 16B) to turn the TV 1610 on/off. The user can also actuate the directional keys (e.g., keys labeled with up/down/left/right arrows) to change the channel or volume of the TV 1610.

The user can also actuate the virtual keyboard 1620 to interact with a virtual object. With reference to FIGS. 16A and 16B, the user can use the key labeled "−" to reduce the size of the virtual avatar 1624 (e.g., from the size shown in FIG. 16A to the size shown in FIG. 16B). The user can also swipe leftward on the spacebar key 1652 to move the virtual avatar 1624 from the position shown in FIG. 16A to the position shown in FIG. 16B.

In the example environments 1600*a* and 1600*b*, the virtual key board 1620 is rendered to occlude a portion of the window 1640. In some embodiments, the virtual keyboard may be transparent such that the user can see through window 1640 through the virtual keyboard 1620.

The rendering location of the virtual keyboard may be dependent on contextual information. For example, if a user is interacting with the TV 1610, the keyboard 1620 may be rendered near the TV 1610. The keyboard 1620 may also be rendered within the user arm's reach (e.g., within a distance of 0.3-1.5 m from the user). In some situations, the specification of the virtual keyboard may depend on the rendering location. For example, if a virtual keyboard is far from the user, the size of the keys or the virtual keyboard (as a whole) may increase. However, if the virtual keyboard is within the user's arm's reach, the size of the keys or the virtual keyboard may not be changed. Advantageously, in some embodiments, by dynamically adjusting the size of the keys/virtual keyboard based on the distance, the wearable system can reduce user fatigue and increase the accuracy of user interaction with the virtual keyboard. This is because it is difficult to pinpoint a small key when it is located at a distance unless a user keeps his arm at a very precise position.

As another example of adjusting the rendering location based on the contextual information, the wearable system may adjust the rendering location based on the user's movement. For example, the virtual keyboard 1620 can move together with the user's head movement. As a result, the virtual keyboard 1620 can remain in the user's FOV regardless of the user's head movement.

As described with reference to FIGS. 13A-14, in some embodiments, the wearable system can dynamically update the specification of the virtual keyboard 1620 based on the contextual information. For example, the wearable system may dynamically show or remove a section of the virtual keyboard 1620 or one or more keys of the virtual keyboard 1620 based on the contextual information. For example, while a user is watching the TV 1610, the wearable system may present the direction keys in the virtual keyboard 1620 for volume and channel adjustment while hiding the rest of the keys.

For example, as shown in FIG. 16D, the wearable system can provide a transition effect of the virtual keyboard 1620 when the virtual keyboard 1620 is removed. The removal may be in response to a triggering event, such as an extended period of inactivity, or a user's hand gesture. The wearable system can gradually increase the transparency of the virtual keyboard 1620 once the wearable system determines that the triggering event is met.

Figure 16C:
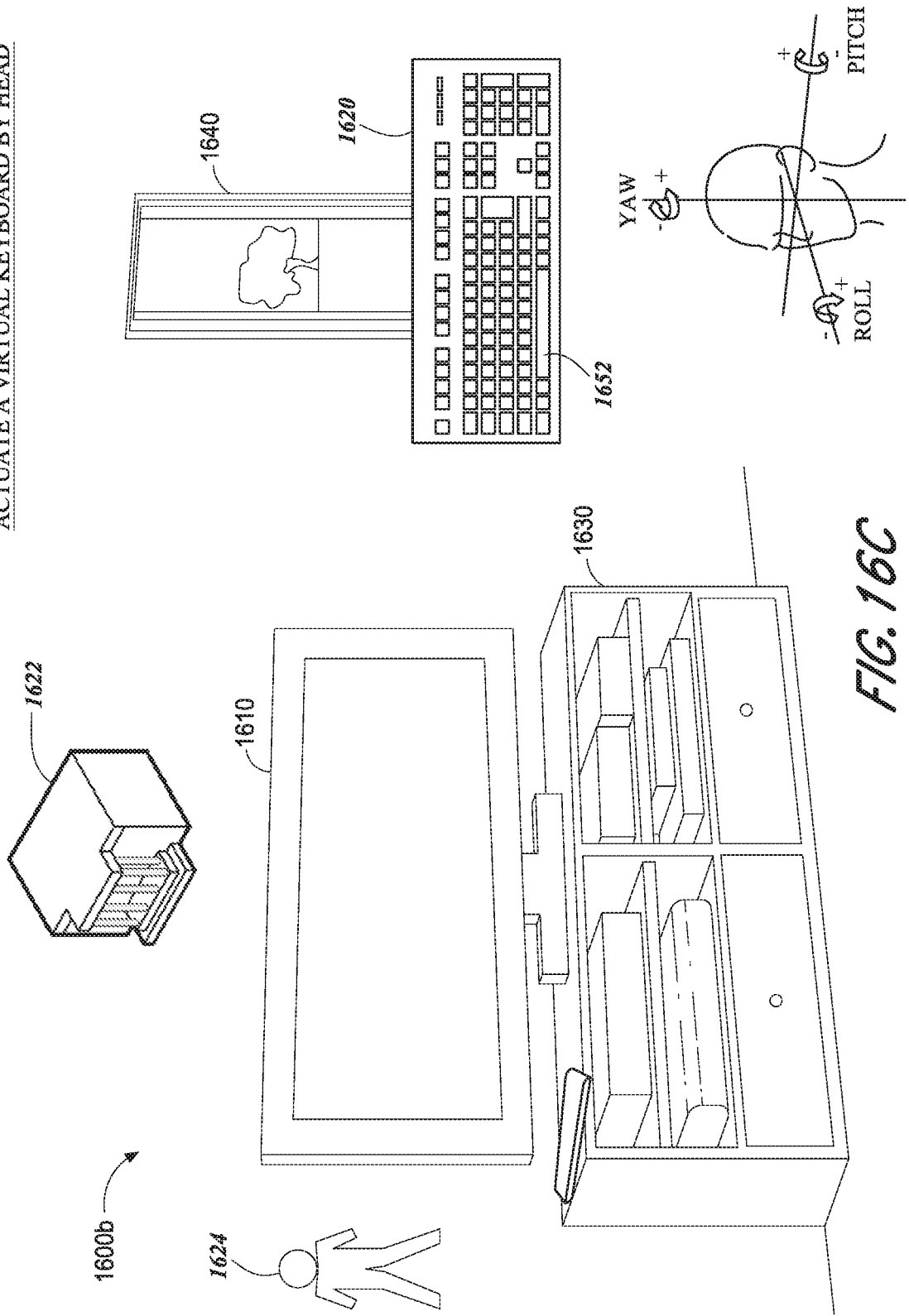

In addition to, or in alternative to, interacting with the virtual keyboard using hand gestures as shown in FIG. 16B, a user can also interact with the virtual keyboard using head pose as shown in FIG. 16C. For example, the wearable system can use the inward-facing imaging system 464 to determine a user's direction of gaze and use the IMU to determine a user's head pose. Based on the eye gaze and head pose, the wearable system can perform a ray cast on keys on a virtual keyboard. The wearable system can detect an actuation of a key if the key intersects with the ray in the ray casting.

Example Process of UI Interactions with a Physical Keyboard

Figure 17A:
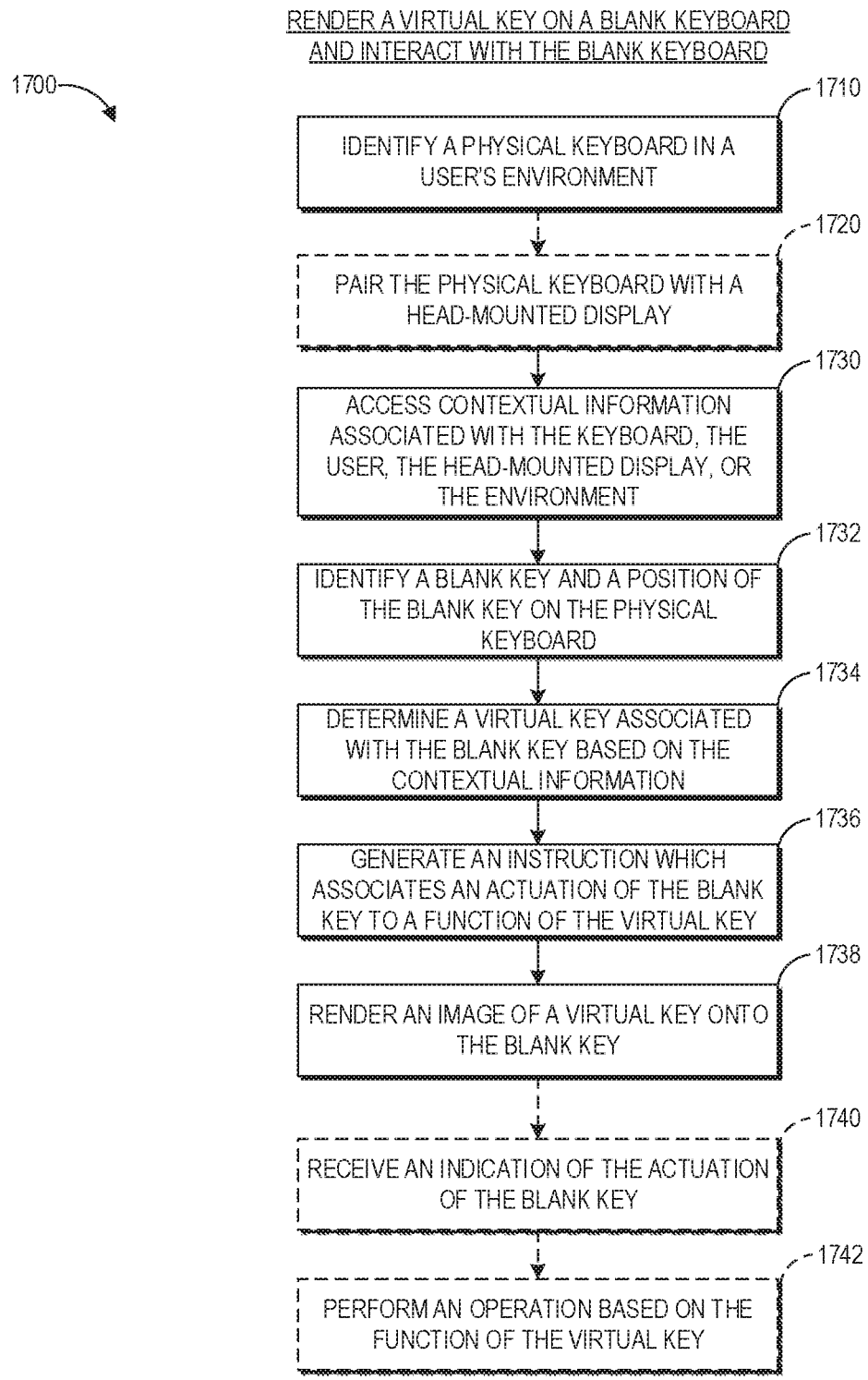
FIG. 17A illustrates an example process of dynamically configuring and interacting with a physical keyboard in an AR/MR environment.

FIG. 17A illustrates an example process of dynamically configuring and interacting with a physical keyboard. The example process 1700 can be performed by the wearable system described herein.

At block 1710, the wearable system can identify a physical keyboard in a user's environment. The physical keyboard one or more blank keys which are not associated with a predefined label or function. The wearable system can identify the physical keyboard by communicating electronically with the physical keyboard (e.g., via Bluetooth, WiFi, or RF protocols, etc.). The wearable system can also identify the physical keyboard by accessing and analyzing images of the user's environment. The images may be acquired by an outward-facing imaging system of wearable system, by a camera in the user's environment (e.g. a room camera), or by a camera of another computing device (e.g., a laptop or a totem). As described with reference to FIG. 12, the wearable system can analyze the image using the object recognizer 708 to identify the physical keyboard.

At optional block 1720, the wearable system can pair the physical keyboard with a head-mounted display. The head-mounted display can be part of the wearable system and can be an embodiment of the display 220 in FIG. 2. The physical keyboard can be paired with the head-mounted display using various wired and wireless pairing techniques described with reference to FIG. 12. In some embodiments, the keys on the physical keyboard may be illuminated. For example, one or more keys may include a light emitting diode (LED) or have LEDs surrounding the keys. The wearable system can capture an image of the light patterns illuminated by the physical keyboard and extract information based on the light patterns using an object recognizer 708. For example, assume that the device identifier of the physical keyboard is 1234. The key having labels "1," "2," "3," and "4" may be illuminated. The outward-facing imaging system can capture this illumination pattern in an image of the keyboard. The object recognizer 708 can recognize the labels (e.g., "1," "2," "3," "4") on the keys and recognize the illuminations of these keys. The object recognizer 708 can accordingly extract the number 1234 based on the illumination pattern. This number "1234" may be used by the wearable system to acquire device information of the physical keyboard. In some situations, the illumination of the keys may be in a sequence. For example, the key labeled "1" may be illuminated before the key labeled "2" to represent the number "12." However, if the key labeled "2" is illuminated before the key labeled "1," then number extracted from this illumination sequence is "21." In addition to or in alternative to the numbers, other keys, such as the keys labelled with letters can also be illuminated during a device pairing. Further, the keyboard can also convey information other than device identifier using the illumination patterns. For example, the keyboard can convey a pairing password, the keyboard's manufacture's information, the keyboard's model, the communication or pairing protocols supported by the keyboard, etc., using the illumination patterns described herein.

At block 1730, the wearable system can access contextual information. As described with reference to FIGS. 12-13C. The contextual information may be associated with the keyboard, the user, the head-mounted display, the environment, alone or in combination.

At block 1732, the wearable system can identify a blank key and a position of the blank key on the physical keyboard. The wearable system can make such identification using an object recognizer 708. For example, the wearable system can identify a key as a blank key if the key does not have a physical label. The wearable system can also consider the shape or position of the key in addition or in alternative. For example, the wearable system can recognize a key located near the edge of the keyboard and the key has a long rectangle shape. Although this key may not have a label on it, the wearable system may nevertheless determine that this key is not a blank key because it has been designated as a space bar key.

At block 1734, the wearable system can determine a virtual key that will be assigned to the blank key based on the contextual information. For example, as described with reference to FIGS. 13A-13C, the wearable system can determine a specification such as layout or functions associated with the keyboard or a portion of the keyboard based on the locations of the blank keys.

At block 1736, the wearable system can generate an instruction which associates a function to an actuation of the blank key. For example, the blank key may be assigned to the symbol "+." As a result, when the blank key is pressed, a symbol "+" may be displayed by the head-mounted display. In some embodiments, multiple functions can be assigned to one blank key. Each function may be associated with a hand gesture that actuates the blank key. For example, one key may be assigned to both a trademark symbol (e.g., "®") and a copyright symbol (e.g. "©"). When the key is touched, the trademark symbol can be inputted into the wearable system but when the key is pressed, the copyright symbol can be inputted.

At block 1738, the wearable system can also render an image of a virtual key onto the blank key. In this sample example, the wearable system can superimpose a virtual key label "+" on the blank key. Where the key is assigned to multiple symbols, the wearable system can render both key labels (e.g., both the trademark symbol and the copyright symbol) on the key. Additionally, or alternatively, the wearable system can render the virtual key labels based on how the key is actuated. For example, when the key is touched, the trademark symbol can be shown but when the key is pressed, the copyright symbol can be shown. When the user actuates the key in a certain way, the wearable system can provide a focus indicator which shows how the key is actuated. For example, when the key is touched, the wearable system can show an increase in the size of the trademark symbol. In addition to or in alternative to the example visual focus indicator described with reference to FIG. 15B, the focus indicator can also include other types of feedbacks, such as for example, haptic or audio feedback. For example, the keyboard or the wearable system can play a sound based on how the key is actuated (e.g., play one sound when the key is touched and play another sound when the key is pressed). The keyboard can also provide haptic feedback depending on how the key is actuated. For example, the keyboard may provide a vibration when the key is pressed and not provide a vibration when the key is touched. In some embodiments, the focus indicator (visual, haptic, or audio) may be different from each key. For example, an actuation of the spacebar may be associated with one sound while the actuation of a number key may be associated with another sound.

At the optional block 1740, the wearable system can receive an indication of the actuation of the blank key. The indication may be received from the keyboard (e.g. via wired or wireless communication channels). The indication may also be detected based on analysis of images. For example, the wearable system can identify the user's hand position using an object recognizer 708 and compare the hand position with the positions of the keys to determine whether the user's hand position coincide with a key. The images used to detect the actuation may come from multiple sources. For example, the wearable system can use images acquired by a camera of the keyboard together with images acquired from a camera in the outward-facing imaging system to detect an actuation of the key.

At the optional block 1742, the wearable system can perform an operation (e.g., a user interface operation) based on the function assigned to the blank key. For example, if the function assigned to the blank key is associated with a mathematical operation (e.g., an addition), the wearable system can accordingly perform the mathematical operation when the blank key is actuated.

Although the examples in this figure are described with reference to configuring a blank key, the wearable system can also assign functions or virtual labels to a key that already have the pre-defined functions or physical labels. For example, the wearable system can assign a sliding bar function to the spacebar key despite that the spacebar key has already been configured to input an empty space when the space bar key is pressed. As a result of the sliding bar function, when a user swipes the spacebar key, the wearable system can open or close an application accordingly. As another example, the wearable system can assign a set of functions and icons associated with emojis to some of the letter keys on the keyboard.

Further in some situations, rather than assigning the function and image for one key, a section of the keyboard or a virtual keyboard may be assigned to a physical keyboard. For example, the wearable system can automatically move a virtual keyboard to be overlaid on top of a physical keyboard when user looks at the physical keyboard.

Example Process of UI Interactions with a Virtual Keyboard

Figure 17B:
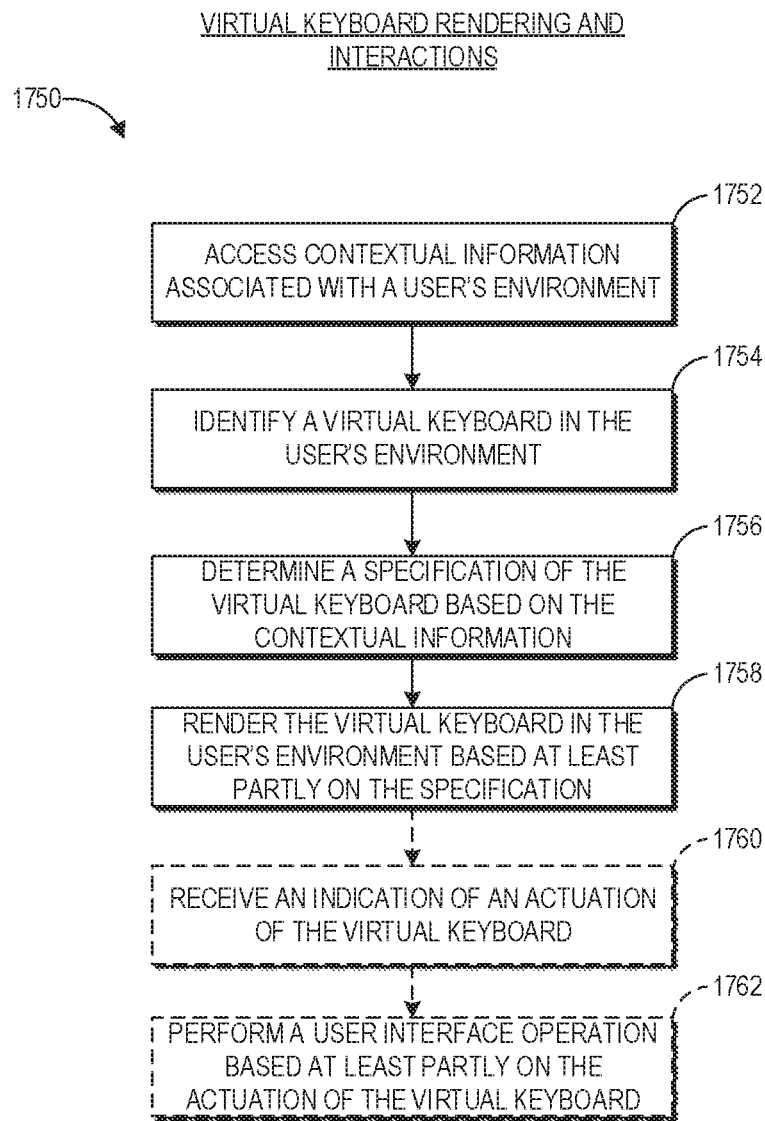
FIG. 17B illustrates an example process of rendering and interacting with a virtual keyboard in an AR/VR/MR environment.

FIG. 17B illustrates an example process of rendering and interacting with a virtual keyboard. The process 1750 can be performed by the wearable system described herein.

At block 1752, the wearable system can access contextual information associated with a user's environment. For example, the wearable system can access information associated with physical or virtual objects in the user's environment, such as for example, the type and functions of the physical or virtual objects in the user's environment. In some embodiments, the wearable system can identify a target object that a user is currently interacting with or intends to interact with based on the user's head pose or eye gaze.

At block 1754, the wearable system can identify a virtual keyboard in the user's environment. The virtual keyboard may be identified based on a user's input. For example, a user can speak the nickname of a virtual keyboard and the wearable system can accordingly identify the virtual keyboard based on the nickname. As another example, the wearable system can identify a virtual keyboard based on the user's eye gaze direction or a hand gesture (e.g., pointing at the virtual keyboard). The virtual keyboard can also be identified based on a physical keyboard. For example, the virtual keyboard may be an emulation of a physical keyboard in the user's environment. Further, the virtual keyboard may be identified based on the objects in the user's environment. For example, the wearable system can access a virtual keyboard that is suitable to interact all (or a majority of the objects) in the user's environment. Where the wearable system has identified a target object, the wearable system can identify a virtual keyboard that is associated with the target object or suitable for interaction with the target object.

At block 1756, the wearable system can determine a specification of the virtual keyboard based on the contextual information. The specification may include the layout and functions of the keys on the virtual keyboard. For example, the virtual keyboard identified in block 1754 may include a blank virtual keyboard template. The specification determined at the block 1756 can specify which functions or virtual key labels will be assigned to some (or all) of the keys in the blank virtual keyboard template. In addition, as described herein, the layout of the virtual keyboard may also change. For example, a key in the blank virtual keyboard template may be assigned to a number when the user is interacting with one object. But when the user interacts with another object, the wearable system can dynamically reassign the key to a letter.

At block 1758, the wearable system can render the virtual keyboard in the user's environment based at least partly on the specification 1758. For example, the wearable system can render the virtual key labels on the virtual keyboard. The wearable system can also render a subset of the virtual key. For example, where the blank virtual keyboard template is used to interact with more than one virtual objects, the wearable system can render a first set of virtual keys that are commonly used with one virtual object while render a second set of virtual keys that are commonly used with another virtual object.

At optional block 1760, the wearable system can receive an indication of an actuation of the virtual keyboard. The virtual keyboard can also support various ways of actuations. For example, a virtual keyboard can support a touch or a swipe gesture. The wearable system can track the user's hand positions based on images acquired by the outward-facing imaging system and determine whether the user's hand positions intersect with one or more virtual keys. The virtual keyboard can also support a pressing gesture. For example, the wearable system can specify a volume in the user's space that is associated with a virtual key. When a user's finger penetrates into the volume, the wearable system can determine that the user has actuated the virtual key.

At the optional block 1762, the wearable system can perform a user interface operation based at least partly on the actuation of the virtual keyboard. Some example user interface operations may include: providing a focus indicator for the key (or the virtual keyboard) that was actuated, moving or selecting a virtual object, opening a virtual menu associated with a virtual or physical object, and so on. The actuation of the virtual keyboard can also cause commands other than the user interface operations to be performed. For example, the actuation of the virtual keyboard may cause the wearable system to generate and send an instruction to a television to change the channel of the television. As another example, the actuation of the virtual keyboard may cause the wearable system to switch from a MR scene to a VR scene.

EXAMPLES

In some examples, a system comprises: a display system configured to present virtual content in a physical environment of a user; an outward-facing imaging system configured to image the physical environment of the user; a hardware processor in communication with the display system and the outward-facing imaging system, the hardware processor programmed to: analyze an image of the physical environment acquired by the outward-facing imaging system; recognize a physical keyboard having a plurality of keys based on an analysis of the image; determine contextual information associated with the physical keyboard; determine a specification for the physical keyboard based at least in part on the contextual information; dynamically configure functions of at least a portion of the physical keyboard based at least in part on the specification; determine a rendering location of a virtual key label based at least in part on the specification; and instruct the display system to render the virtual key label at the determined rendering location.

In any of the preceding examples, the virtual content may comprise at least one of: augmented or mixed reality content.

In any of the preceding examples, to analyze the image, the hardware processor may be programmed to execute an object recognizer to identify a physical keyboard based on visual characteristics of the physical keyboard.

In any of the preceding examples, the visual characteristics may comprise at least one of: a shape of a surface of the physical keyboard or a label of the physical keyboard.

In any of the preceding examples, the outward-facing imaging system may comprise a world camera having a FOV, wherein the FOV may comprise a portion of the physical environment that is observed by the world camera at a given time, and wherein to recognize a physical keyboard, the hardware processor may be programmed to detect at least a portion of the physical keyboard is in the FOV.

In any of the preceding examples, the specification may comprise at least one of a layout of the plurality of keys or functions of the plurality of keys.

In any of the preceding examples, to determine the specification for the physical keyboard, the hardware processor may be programmed to: determine a model of the physical keyboard based on the analysis of the image; and access a database storing the specification of the model to retrieve the specification.

In any of the preceding examples at least one key of the plurality of keys may have a capacitive touch sensor.

In any of the preceding examples, the contextual information may comprise at least one of a position of the physical keyboard or an orientation of the physical keyboard.

In any of the preceding examples, the portion of the physical keyboard may comprise blank keys and to dynamically configure the functions of at least the portion of the physical keyboard, the hardware processor may be programmed to: assign command functions to the blank keys wherein the command functions cause the system to perform a user interface operation.

In any of the preceding examples, the rendering location of a virtual key label may coincide with a location of a blank key in the portion of the physical keyboard, and the hardware processor may be configured to instruct the display system to superimpose the virtual key label on the blank key using a pixel stick.

In some examples, a method comprises: identifying a portion of a keyboard having a plurality of keys in a three-dimensional (3D) physical environment of a user; determining a specification for the portion of keyboard based at least in part on contextual information; dynamically configuring functions of the portion of the keyboard based at least in part on the specification; determining a rendering location of a virtual key label in the portion of the keyboard based at least in part on the specification; and instructing the display system to render the virtual key label at the determined rendering location.

In any of the preceding examples, the keyboard may comprise a physical keyboard.

In any of the preceding examples, the physical keyboard may be assembled from a plurality of detachable sections.

In any of the preceding examples, the physical keyboard may be associated with a virtual screen in the 3D physical environment of the user and the virtual screen may be configured to perform a user interface function in response to an actuation of the physical keyboard.

In any of the preceding examples, the keyboard may comprise a virtual keyboard, wherein the virtual keyboard is rendered on a surface of a user's environment.

In any of the preceding examples, the surface may comprise a surface of a physical keyboard.

In any of the preceding examples, identifying a keyboard may comprise at least one of communicating with the keyboard to obtain identifying information of the keyboard, selecting the keyboard among a plurality of keyboards based on the contextual information, recognizing the keyboard based on an image of the keyboard.

In any of the preceding examples, the image may be acquired by at least one of: an outward-facing imaging system of a head-mounted device, a room camera, or a camera coupled to a physical keyboard.

In any of the preceding examples, the portion of the keyboard may comprise blank keys.

In any of the preceding examples, the contextual information may be associated with at least one of: the keyboard, the user, or the 3D physical environment.

In some examples, a computer-readable medium may comprise instructions which, when read by a hardware processor, cause the hardware processor to perform a method comprising: identifying a portion of a keyboard having a plurality of keys in a three-dimensional (3D) physical environment of a user; determining a specification for the portion of keyboard based at least in part on contextual information; dynamically configuring functions of the portion of the keyboard based at least in part on the specification; determining a rendering location of a virtual key label in the portion of the keyboard based at least in part on the specification; and instructing the display system to render the virtual key label at the determined rendering location.

In any of the preceding examples, the keyboard may comprise a physical keyboard.

In any of the preceding examples, the physical keyboard may be assembled from a plurality of detachable sections.

In any of the preceding examples, the physical keyboard may be associated with a virtual screen in the 3D physical environment of the user and the virtual screen is configured to perform a user interface function in response to an actuation of the physical keyboard.

In any of the preceding examples, the keyboard may comprise a virtual keyboard, wherein the virtual keyboard is rendered on a surface of a user's environment.

In any of the preceding examples, the surface may comprise a surface of a physical keyboard.

In any of the preceding examples, identifying a keyboard may comprise at least one of communicating with the keyboard to obtain identifying information of the keyboard, selecting the keyboard among a plurality of keyboards based on the contextual information, recognizing the keyboard based on an image of the keyboard.

In any of the preceding examples, the image may be acquired by at least one of: an outward-facing imaging system of a head-mounted device, a room camera, or a camera coupled to a physical keyboard.

In any of the preceding examples, the portion of the keyboard may comprise blank keys.

In any of the preceding examples, the contextual information may be associated with at least one of: the keyboard, the user, or the 3D physical environment.

In some examples, a system comprises: a display system of the wearable device configured to present virtual content in a physical environment of a user; a pose sensor configured to acquire data associated with the user's pose; a hardware processor in communication with the display system and the pose sensor, the hardware processor programmed to: receive an indication to interact with an object in the user's environment based on the pose; identify a keyboard for interaction with the object; determine virtual content associated with the keyboard; determine a rendering location of the virtual content in the user's environment; detect an actuation of the keyboard; and instruct an execution of a command based on the execution of the keyboard.

In any of the preceding examples, the pose sensor may comprise at least one of a world camera of the wearable device, a camera external to the wearable device, or an eye camera.

In any of the preceding examples, the pose may comprise at least one of: a head pose, an eye gaze, or a hand gesture.

In any of the preceding examples, the indication to interact with the object in the user's environment may comprise at least one of a head pose or an eye gaze, and the object may be identified using a ray casting.

In any of the preceding examples, the keyboard may be identified based at least on one of the following: the pose of the user or characteristics associated with the object.

In any of the preceding examples, the keyboard may comprise a physical keyboard and the virtual content may comprise virtual key labels for a plurality of keys of the physical keyboard.

In any of the preceding examples, the keyboard may comprise a virtual keyboard and the virtual content may comprise virtual keys of the keyboard.

In any of the preceding examples, the object may comprise a physical object, the keyboard may comprise a virtual keyboard, and the keyboard may be rendered on the physical object.

In any of the preceding examples, the hardware processor may be further programmed to: detect a change in the pose; and update the rendering location of the virtual content based on the change in the pose.

In any of the preceding examples, the keyboard may be a physical keyboard, and to update the rendering location of the virtual content, the hardware processor may be programmed to move the key labels rendered on a first set of keys to a second set of keys.

In any of the preceding examples, to detect the actuation of the keyboard, the hardware processor may be programmed to: analyze data associated with at least one of: a sound associated with a key press, an image associated with the user's hand gesture, or a wireless signal received from the keyboard.

In any of the preceding examples, each key may be assigned to a sound and an actuation of the key causes the sound to be generated.

In any of the preceding examples, the hardware processor may be further programmed to: receive another indication of another user interaction with another object; and dynamically reconfigure the keyboard based on contextual information associated with the other object.

In some examples, a method comprises: presenting virtual content in a physical environment of a user using a display system of the wearable device; acquiring data associated with the user's pose using a pose sensor; receiving, using a hardware processor, an indication to interact with an object in the user's environment based on the pose; identifying, using the hardware processor, a keyboard for interaction with the object; determining, using the hardware processor, virtual content associated with the keyboard; determining, using the hardware processor, a rendering location of the virtual content in the user's environment; detecting, using the hardware processor, an actuation of the keyboard; and instructing, using the hardware processor, an execution of a command based on the execution of the keyboard.

In any of the preceding examples, the pose sensor may comprise at least one of a world camera of the wearable device, a camera external to the wearable device, or an eye camera.

In any of the preceding examples, the pose may comprise at least one of: a head pose, an eye gaze, or a hand gesture.

In any of the preceding examples, the indication to interact with the object in the user's environment may comprise at least one of a head pose or an eye gaze, and the object may be identified using a ray casting.

In any of the preceding examples, the keyboard may be identified based at least on one of the following: the pose of the user or characteristics associated with the object.

In any of the preceding examples, the keyboard may comprise a physical keyboard and the virtual content comprises virtual key labels for a plurality of keys of the physical keyboard.

In any of the preceding examples, the keyboard may be a virtual keyboard and the virtual content may comprise virtual keys of the keyboard.

In any of the preceding examples, the object may comprise a physical object, the keyboard may comprise a virtual keyboard, and the keyboard may be rendered on the physical object.

In any of the preceding examples, the method may further comprise: detecting, using the hardware processor, a change in the pose; and updating, using the hardware processor, the rendering location of the virtual content based on the change in the pose.

In any of the preceding examples, the keyboard may be a physical keyboard, and updating the rendering location of the virtual content may comprise moving, using the hardware processor, the key labels rendered on a first set of keys to a second set of keys.

In any of the preceding examples, detecting the actuation of the keyboard may comprise analyzing data associated with at least one of: a sound associated with a key press, an image associated with the user's hand gesture, or a wireless signal received from the keyboard.

In any of the preceding examples, each key may be assigned to a sound and an actuation of the key may cause the sound to be generated.

In any of the preceding examples, the method may further comprise: receiving, using the hardware processor, another indication of another user interaction with another object; and dynamically reconfiguring, using the hardware processor, the keyboard based on contextual information associated with the other object.

In some examples, a non-transitory computer-readable medium may comprise instructions which, when read by a hardware processor, cause the hardware processor to perform a method comprising: presenting virtual content in a physical environment of a user using a display system of the wearable device; acquiring data associated with a user's pose using a pose sensor; receiving an indication to interact with an object in the user's environment based on the pose; identifying a keyboard for interaction with the object; determining virtual content associated with the keyboard; determining a rendering location of the virtual content in the user's environment; detecting an actuation of the keyboard; and instructing an execution of a command based on the execution of the keyboard.

In any of the preceding examples, the pose sensor may comprise at least one of a world camera of the wearable device, a camera external to the wearable device, or an eye camera.

In any of the preceding examples, the pose may comprise at least one of: a head pose, an eye gaze, or a hand gesture.

In any of the preceding examples, the indication to interact with the object in the user's environment may comprise at least one of a head pose or an eye gaze, and the object may be identified using a ray casting.

In any of the preceding examples, the keyboard may be identified based at least on one of the following: the pose of the user or characteristics associated with the object.

In any of the preceding examples, the keyboard may comprise a physical keyboard and the virtual content may comprise virtual key labels for a plurality of keys of the physical keyboard.

In any of the preceding examples, the keyboard may be a virtual keyboard and the virtual content may comprise virtual keys of the keyboard.

In any of the preceding examples, the object may comprise a physical object, the keyboard may comprise a virtual keyboard, and the keyboard may be rendered on the physical object.

In any of the preceding examples, the method caused by the computer readable medium may further comprise: detecting a change in the pose; and updating the rendering location of the virtual content based on the change in the pose.

In any of the preceding examples, the keyboard may be a physical keyboard, and updating the rendering location of the virtual content may comprise moving the key labels rendered on a first set of keys to a second set of keys.

In any of the preceding examples, detecting the actuation of the keyboard may comprise analyzing data associated with at least one of: a sound associated with a key press, an image associated with the user's hand gesture, or a wireless signal received from the keyboard.

In any of the preceding examples, each key may be assigned to a sound and an actuation of the key causes the sound to be generated.

In any of the preceding examples, the method caused by the computer readable medium may further comprise: receiving another indication of another user interaction with another object; and dynamically reconfiguring the keyboard based on contextual information associated with the other object.

Figure 18:
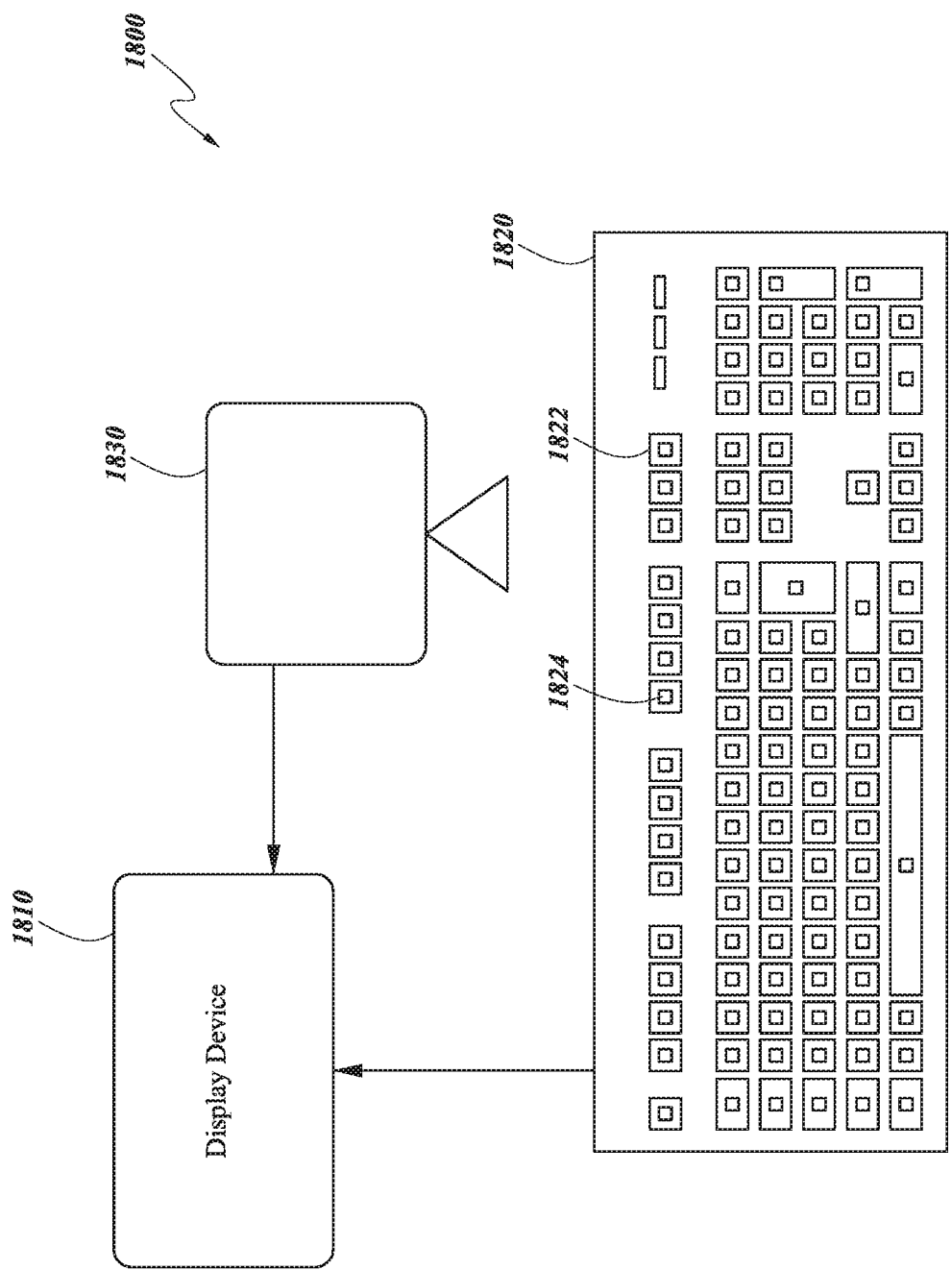
FIG. 18 schematically illustrates an example VR/AR/MR system and physical keyboard which can be used to implement virtual keyboard functionality on the display of the VR/AR/MR system.
Figure 19:
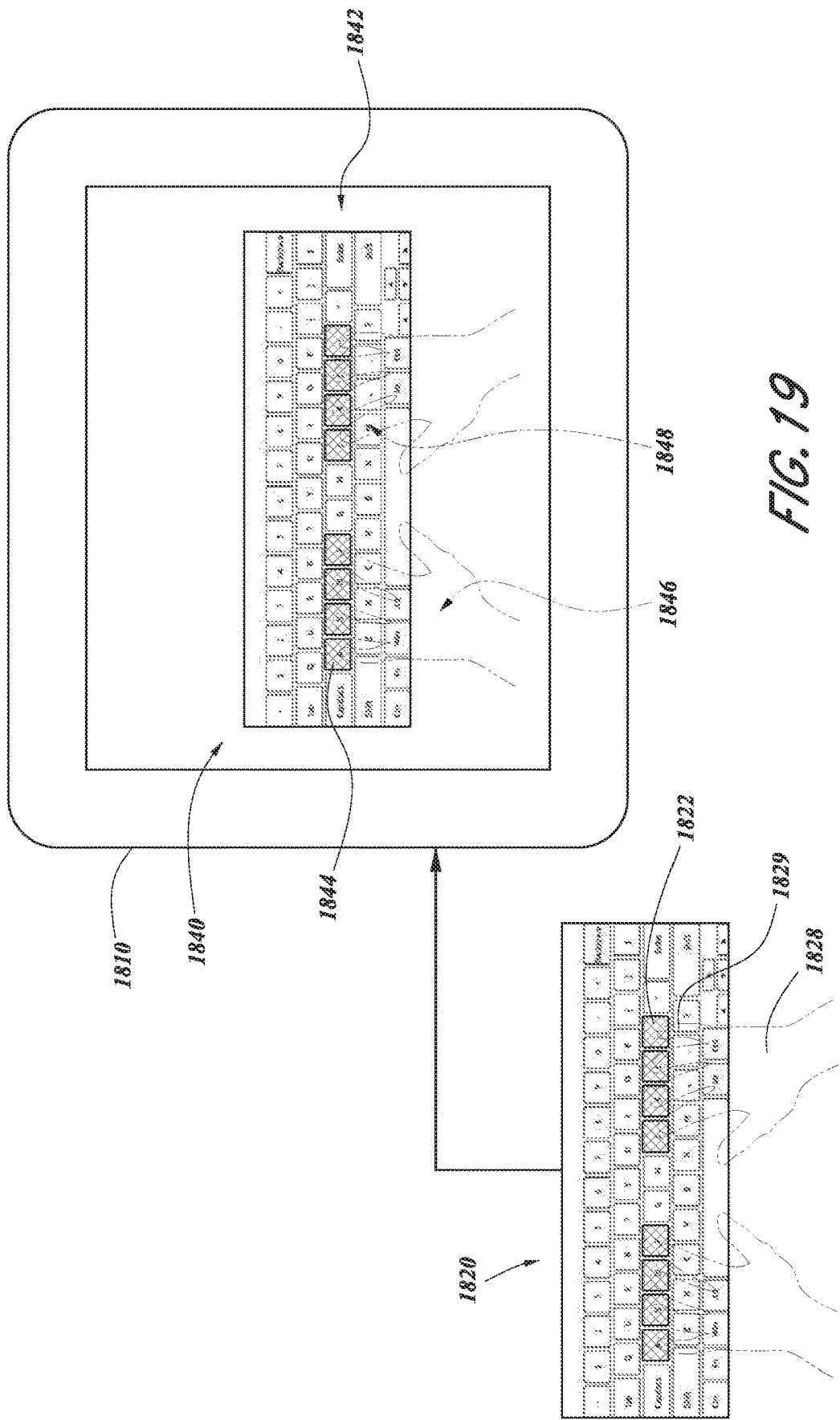
FIG. 19 schematically illustrates an example display of a VR/AR/MR system showing virtual keyboard functionality.
Figure 20:
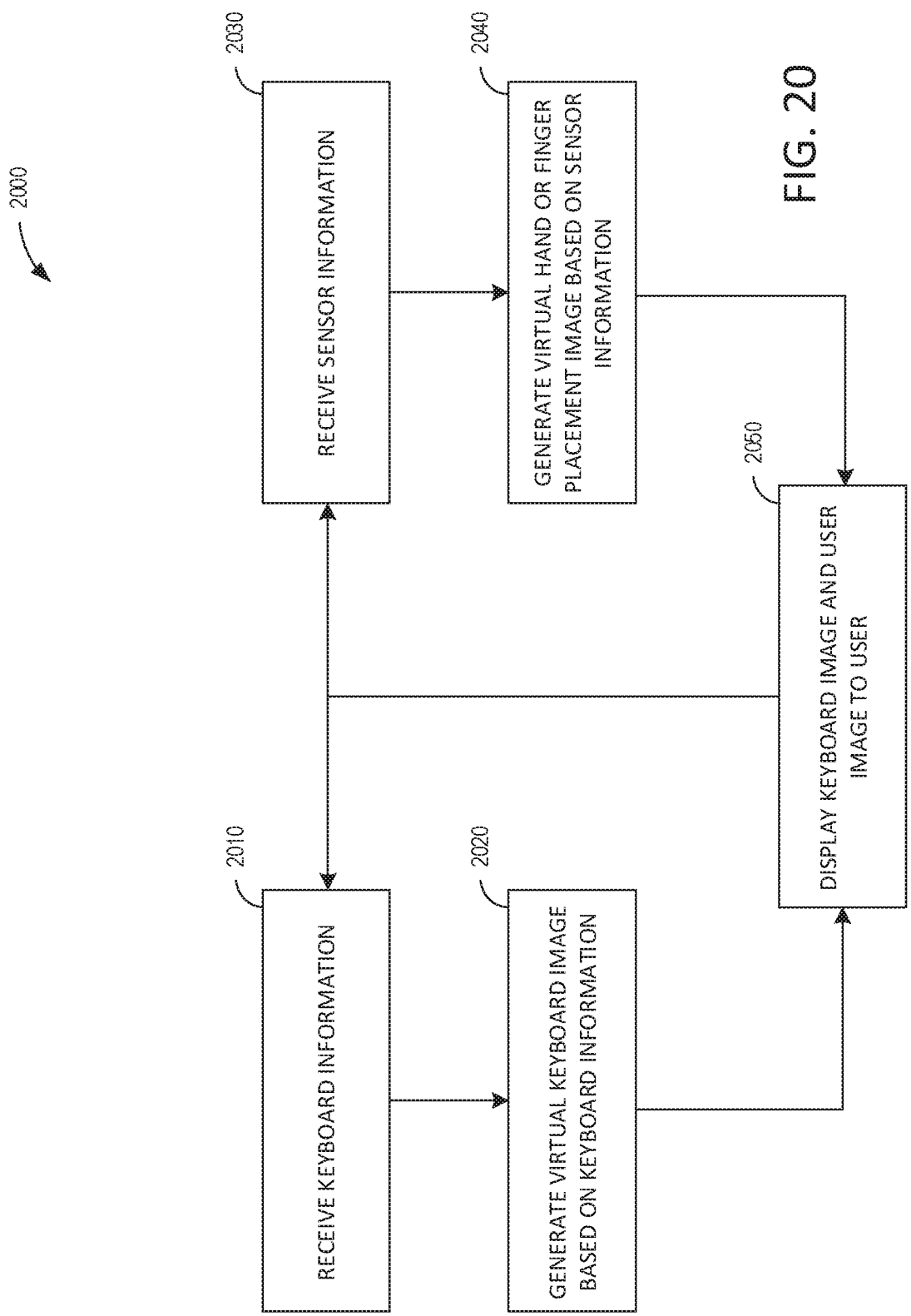
FIG. 20 is a flowchart depicting an example method of implementing virtual keyboard functionality on the display of a VR/AR/MR system based on a user's interactions with a physical keyboard.

Examples of Virtual Keyboard Functionality Corresponding to User's Interaction with Physical Keyboard FIGS. 18-20 illustrate how some embodiments of the VR/AR/MR systems described herein can implement virtual keyboard functionality corresponding to a user's interaction with a physical keyboard. As described elsewhere herein, one or more physical keyboards, or other input devices, may be provided to receive user input for interacting with a VR/AR/MR system. During use, the physical keyboard may be located outside the user's field of view, resulting in inefficient keyboard usage, incorrect keystrokes, and/or requiring the user to repeatedly turn away from an area of interest to look at the keyboard and/or the location of the user's hands and fingers relative to the keyboard. In some cases, virtual content being displayed by the VR/AR/MR system may partially or fully block the user's view of the keyboard, preventing the user from accurately determining the location of his or her hands and fingers on the physical keyboard. Thus, a virtual keyboard or other virtual imagery representative of the physical keyboard may be displayed to the user by the display of the VR/AR/MR system. In addition, the display of the VR/AR/MR system may show a representation of the user's hand positioning with respect to the physical keyboard and/or the keystrokes made by the user on the physical keyboard. This may be done in real-time such that the user can perceive, within the field of view of the VR/AR/MR system, his or her interactions with the physical keyboard without having to look at the physical keyboard.

FIG. 18 illustrates a system 1800 for implementing virtual keyboard functionality on the display of a VR/AR/MR system based on a user's interactions with a physical keyboard 1820. In some embodiments, the physical keyboard includes one or more built-in sensors which can detect information regarding the placement of the user's hand(s) and/or fingers with respect to the physical keyboard. These built-in hand placement sensors can include, for example, capacitive touch sensors, photodetectors, electrical or mechanical switches, cameras, microphones, etc. In other embodiments, the hand placement detection sensors can be external to the physical keyboard 1820 and may be integrated with the VR/AR/MR system or separate devices. For example, external hand placement detection sensors 1830 can include one or more microphones and/or cameras.

In the example of a microphone as an external hand placement detection sensor, the microphone may be configured to detect key presses based on the sound of the key being depressed. In some embodiments, each key may be configured to have a unique sound profile when depressed to differentiate the key from the other keys of the keyboard 1820. Thus, the microphone may detect a sound corresponding to a key press, and the system 1800 may determine which key was pressed based on analyzing the output received from the microphone.

A hand and/or finger location may further be calculated based on the determined locations of keypresses. In the example of a camera as an external hand placement detection sensor, one or more cameras may be aligned and configured to capture images of the keyboard, for example, from above the keyboard. In some embodiments, one or more fiducial markers may be provided on the keyboard to facilitate the determination of hand location based on captured images. For example, a plurality of fiducials may be printed on or otherwise applied to the surface of the keys of the keyboard. When an image of the keyboard is analyzed, fiducials that are visible within the image can indicate a location on the keyboard that is not covered by a user's hand, and fiducials that are known but are not visible within the image can indicate a location on the keyboard that is covered by a user's hand. The hand placement detection sensors can, in some embodiments, be distinct from the keys of the physical keyboard which are used by the user to provide input signals for interacting with the VR/AR/MR system. The physical keyboard 1820 and the hand placement sensor (s) 1830 can be communicatively coupled with the VR/AR/MR system.

The display 1810 can be, for example, any of the display devices described herein. In some embodiments, the display 1800 shown in FIG. 18 can be the display 220 shown in FIG. 2, and the physical keyboard 1820 and hand placement sensor(s) 1830 can be in communication with the display 220, the local processing and data module 260, and/or the remote processing module 270. Generally, the display 1810 is configured to project light into an eye of a user to display image content to the user. As discussed herein, in some embodiments, the display 1810 is a wearable device, such as, for example, a head-mounted display. In addition to displaying image content to the user, the display 1810 can further be configured to allow light from the surrounding physical environment to pass to the eye of the user such that projected image content is presented to the user as augmented reality or mixed reality image content superimposed on the user's view of his or her surrounding physical environment. In other embodiments, the display 1810 can be a virtual reality display which does not provide the user with a view of the surrounding physical environment. The display 1810 can include, or be communicatively coupled to, one or more processors and/or memory units configured to receive data from the physical keyboard 1820, the external sensor 1830, and/or any other data source, for example, the Internet, one or more remote processing and/or memory modules, or the like.

The physical keyboard 1820 includes a plurality of keys 1822 configured to detect input from a user and generate signals which are indicative of the user input. The keys 1822 can be used to input, for example, text, symbols, commands, etc. to the VR/AR/MR system. The physical keyboard 1820 can detect keystrokes made by the user when one or more of the keys 1822 are depressed. The physical keyboard 1820 may detect keystrokes using internal keystroke detection mechanisms. These may include, for example, mechanical or electrical switches, capacitive sensors, etc. In addition, some or all of the keys 1822 may include touch sensors 1824 configured to detect a finger of the user in contact with the key 1822 independent of whether the key 1822 is being depressed. For example, touch sensors 1824 can be capacitive touch sensors or any other sensor capable of detecting touch. When the physical keyboard receives signals from the keystroke detection mechanisms, touch sensors 1824, and/or hand placement sensors, it can provide signals, data, and/or parameters to the VR/AR/MR system which are indicative of, for example, the user's hand or finger positioning with respect to the physical keyboard, the user's keystrokes, etc.

The built-in or external hand placement sensor(s) 1830 detect information indicative of the location(s) of the user's hands or fingers with respect to the physical keyboard, or the appearance, sound, or other aspect of the hands and/or fingers of the user on or in the vicinity of the physical keyboard 1820. The hand placement sensor(s) 1830 can be communicatively coupled with the display 1810. For example, the hand placement sensor(s) 1830 can be configured to send data detected at the sensor(s) (e.g., images, sounds, position signals, etc.), and/or parameters determined based on the data (e.g., a hand and/or finger location, etc.) to the display device 1810.

FIG. 19 is an example of how the display 1810 can show virtual image content 1840 corresponding the physical keyboard 1820, the user's hand and/or finger placement(s) with respect to the physical keyboard, and/or the keystrokes made by the user. In the example embodiment shown in FIG. 19, the image content 1840 includes a virtual keyboard 1842 corresponding to the physical keyboard 1820 and virtual hands 1846 corresponding to the hands 1828 of a user. Fingers 1848 of the virtual hands 1846 are shown to be touching virtual keys 1844 corresponding to the keys 1822 of the physical keyboard 1820 being touched by the fingers 1829 of the user's hands 1828. This imagery can be updated in real-time to show the keystrokes that are made by the user on the physical keyboard.

The image content 1840 shown in the example embodiment of FIG. 19 may be displayed as, for example, a three-dimensional representation of the true appearance of the physical keyboard 1820 and the user's hands 1828 and fingers 1829. However, in various embodiments other visual content indicative of the physical keyboard 1820 and the user's hands 1828 and/or fingers 1829 can be used. For example, in some embodiments the virtual keyboard 1842 and/or the virtual hands 1846 can be depicted as generic images of a keyboard and/or hands, rather than a representation of the actual appearance of the physical keyboard 1820, hands 1828, and/or fingers 1829. In another example, the virtual keyboard 1842 and/or the virtual hands 1846 can be simplified two-dimensional representations of the physical keyboard 1820, hands 1828, and/or fingers 1829. In one example, the locations of the user's fingers 1829 can be represented simply as dots or other symbols superimposed on the virtual keys 1844 of the virtual keyboard 1842 which correspond to the physical keys 1822 being touched by the user's fingers 1829.

In some embodiments, symbols (e.g., letters, numbers, punctuation, and/or other characters) are displayed on the virtual keys 1844 of the virtual keyboard 1840. For example, as shown in FIG. 19, the virtual keys 1844 display symbols consistent with a standard QWERTY keyboard. The symbols displayed on the virtual keys 1844 can be consistent with, or different from, the symbols displayed on the keys of the physical keyboard 1820. For example, the physical keyboard may have keys 1822 marked with characters and symbols according to a QWERTY keyboard layout, while the virtual keys 1844 may display characters and symbols in an arrangement consistent with the Dvorak Simplified Keyboard, an alphabetical ordering, an emoji keyboard, a standard foreign language keyboard layout, or any other desired keyboard layout. In further embodiments, the physical keyboard 1820 may have blank keys 1822 without printed symbols, such that only the virtual keys 1844 are labeled.

With reference to FIG. 20, an example method 2000 of generating and displaying virtual keyboard content will be described. The method 2000 begins at block 2010, in which keyboard information is received by a processing component of the VR/AR/MR system. The keyboard information can include data corresponding to a type of physical keyboard and/or a type of virtual keyboard to be displayed, such as, for example, the number, size, shape, or layout of keys on the virtual keyboard, and/or symbols to be displayed on the keys of the virtual keyboard. In some embodiments, receiving keyboard information can include selecting, downloading, or otherwise obtaining a virtual keyboard information file based on information associated with the physical keyboard, such as, for example, a number, shape, size, or layout of keys on the physical keyboard. In other embodiments, the keyboard information can be pre-programmed into the VR/AR/MR system for performing the method 2000.

At block 2020, a virtual keyboard image is generated based on the keyboard information received at block 2010. As described above, the virtual keyboard image can include a two-dimensional or three-dimensional image corresponding to the physical keyboard. In some embodiments, the keyboard image is a substantially accurate recreation of the physical keyboard, for example, matching the physical keyboard in shape, color, key size and layout, or the like. In other embodiments, the virtual keyboard image can differ from the physical keyboard in apparent size, shape, key size, key shape, key layout, color, or other qualities, such that the virtual keyboard image can be a schematic representation of the physical keyboard rather than a literal depiction of the physical keyboard. In some embodiments, the virtual keyboard image may be obtained from an external source such as the internet, and/or may be a pre-programmed keyboard image within the display system.

At block 2030, information is received from the hand or finger placement sensor(s). Block 2030 can be performed before, after, or simultaneously with blocks 2010 and/or 2020. Hand or finger placement sensor information can include any information obtained by the built-in keyboard sensors (e.g., touch sensors or keystroke detection mechanisms) and/or external sensors (e.g., cameras, microphones, or the like). Accordingly, the received sensor information can be indicative of a location of the user's hand(s) relative to the physical keyboard, a location of one or more of the user's fingers relative to the physical keyboard, a set of keys being depressed, a set of keys being touched by a finger of the user's hand, or other information derived from the sensors of the display system.

At block 2040, a virtual hand or finger placement image is generated based on the sensor information received at block 2030. The hand or finger placement image may include one or more depictions of hands and/or fingers of the user, such as the depictions described with reference to FIG. 19. In one example, the received sensor information includes an indication of a subset of the keys of the physical keyboard being touched, and the generated hand or finger placement image includes a graphic such as a circle or other symbol at each location within the virtual keyboard image corresponding to the keys of the physical keyboard that are being touched by fingers of the user. In another example, the generated hand or finger placement image includes three-dimensional renderings of hands having fingers with fingertips resting on the keys indicated in the received sensor information. For embodiments in which the sensor information further includes information indicative of one or more hand locations, the locations of the virtual hands attached to the fingers can be determined based on the sensor information. It will be appreciated that capacitive touch sensors located on the upper surfaces of the keys of the physical keyboard may be able to detect the presence of a finger on the key, but may not be able to determine which finger of a user's hand is touching the key. In some embodiments, the display system can be configured to determine an estimated hand position based on a combination of touch sensor data. For example, if the touch sensors indicate that fingers are resting on the A, S, D, F, J, K, L, and semicolon keys of the physical keyboard, the display system may determine that the A, S, D, and F keys represent the locations of the fingers of the left hand, while the J, K, L, and semicolon keys of the physical keyboard represent the locations of the fingers of the right hand.

At block 2050, the virtual keyboard image and the hand or finger placement image are displayed to the user. The display system can combine the keyboard image and the hand or finger placement image such that the composite image displayed to the user appears to show virtual hands typing on a virtual keyboard in a position consistent with the position and motion of the user's hands on the physical keyboard. Accordingly, the composite image displayed to the user can allow the user to determine the location of his or her fingertips on the physical keyboard without needing to look down at the physical keyboard. In some embodiments, the method 2000 can return to either or both of blocks 2010 and 2030 to receive further keyboard and/or sensor information and regenerate the virtual keyboard and/or hand/finger placement images. For example, in some embodiments the keyboard image remains constant, while the method 2000 continuously or repeatedly regenerates the hand/finger placement image based on real time or near-real time updated information received from the keyboard sensors and/or external sensors of the display system. Accordingly, as the user image is regenerated and redisplayed, the user image can appear to the user as animated hands moving and typing on the virtual keyboard consistent with actual movements of the user's hands on the physical keyboard.

EXAMPLES

In some examples, a system comprises: a display configured to present virtual reality, augmented reality, or mixed reality content to a user; a physical keyboard comprising: one or more keys configured to receive input from the user; and one or more sensors configured to produce an output indicative of a location of one or more of the user's hands or fingers relative to the physical keyboard; one or more hardware processors; and one or more computer storage media storing instructions that, when executed by the system, cause the system to perform operations comprising: determining a location of the one or more hands or fingers relative to the physical keyboard based on the output of the one or more sensors; and causing the display to present a first image representation of the physical keyboard and a second image representation of the placement of one or more of the user's hands or fingers, wherein a location of the second image representation relative to the first image representation is indicative of the location of the one or more hands or fingers relative to the physical keyboard.

In any of the preceding examples, the one or more sensors may comprise touch sensors disposed on the keys.

In any of the preceding examples, the touch sensors may comprise capacitive touch sensors.

In any of the preceding examples, the system may further comprise at least one camera configured to detect a location of an object near the physical keyboard.

In any of the preceding examples, the first image representation may comprise a virtual keyboard comprising one or more virtual keys, each virtual key corresponding to a key of the physical keyboard.

In any of the preceding examples, each of a plurality of the virtual keys may comprise a symbol indicative of a function of a corresponding key of the physical keyboard.

In any of the preceding examples, the symbol of at least one of the plurality of virtual keys may be different from a symbol displayed on the corresponding key of the physical keyboard.

In any of the preceding examples, the keys of the physical keyboard may not comprise symbols.

In any of the preceding examples, the second image may comprise a visual representation of the one or more fingers.

In any of the preceding examples, the system may further be configured to determine a location of at least one hand of the user relative to the physical keyboard, and the second image representation may comprise a visual representation of the at least one hand.

In any of the preceding examples, the second image may be updated in real-time or near real-time based at least in part on the output of the one or more sensors.

In some examples, a system comprises: a display configured to present virtual reality, augmented reality, or mixed reality content to a user; one or more hardware processors; and one or more computer storage media storing instructions that, when executed by the system, cause the system to perform operations comprising: receiving, from a physical keyboard in communication with the system, information indicative of a location of one or more of the user's hands or fingers relative to the physical keyboard; determining a location of the one or more hands or fingers relative to the physical keyboard based on the received information; and causing the display to present a first image representation of the physical keyboard and a second image representation of the placement of one or more of the user's hands or fingers, wherein a location of the second image representation relative to the first image representation is indicative of the location of the one or more hands or fingers relative to the physical keyboard.

In some examples, a method comprises: receiving an input indicative of a location of one or more of a user's hands or fingers relative to a physical keyboard from one or more sensors; determining a location of the one or more hands or fingers relative to the physical keyboard based on the input of the one or more sensors; and causing a display to present a first image representation of the physical keyboard and a second image representation of the placement of one or more of the user's hands or fingers, wherein a location of the second image representation relative to the first image representation is indicative of the location of the one or more hands or fingers relative to the physical keyboard.

In any of the preceding examples, the one or more sensors may comprise touch sensors disposed on the keys of the physical keyboard.

In any of the preceding examples, the touch sensors may comprise capacitive touch sensors.

In any of the preceding examples, the method may further comprise detecting a location of an object near the physical keyboard based on image data from a camera.

In any of the preceding examples, the first image representation may comprise a virtual keyboard with one or more virtual keys, each virtual key corresponding to a key of the physical keyboard.

In any of the preceding examples, each of a plurality of the virtual keys may comprise a symbol indicative of a function of a corresponding key of the physical keyboard.

In any of the preceding examples, the symbol of at least one of the plurality of virtual keys may be different from a symbol displayed on the corresponding key of the physical keyboard.

In any of the preceding examples, the keys of the physical keyboard may not comprise symbols.

In any of the preceding examples, the second image representation may comprise a visual representation of the one or more fingers.

In any of the preceding examples, the method may further comprise determining a location of at least one hand of the user relative to the physical keyboard, and the second image representation may comprise a visual representation of the at least one hand.

In any of the preceding examples, the second image representation may be updated in real-time or near real-time based at least in part on the output of the one or more sensors.

In some examples, a non-transitory computer-readable medium comprises instructions which, when read by a hardware processor, cause the hardware processor to perform a method comprising: receiving an input indicative of a location of one or more of a user's hands or fingers relative to a physical keyboard from one or more sensors; determining a location of the one or more hands or fingers relative to the physical keyboard based on the input of the one or more sensors; and causing a display to present a first image representation of the physical keyboard and a second image representation of the placement of one or more of the user's hands or fingers, wherein a location of the second image representation relative to the first image representation is indicative of the location of the one or more hands or fingers relative to the physical keyboard.

In any of the preceding examples, the one or more sensors may comprise touch sensors disposed on the keys of the physical keyboard.

In any of the preceding examples, the touch sensors may comprise capacitive touch sensors.

In any of the preceding examples, the method caused by the computer-readable medium may further comprise detecting a location of an object near the physical keyboard based on image data from a camera.

In any of the preceding examples, the first image representation may comprise a virtual keyboard with one or more virtual keys, each virtual key corresponding to a key of the physical keyboard.

In any of the preceding examples, each of a plurality of the virtual keys may comprise a symbol indicative of a function of a corresponding key of the physical keyboard.

In any of the preceding examples, the symbol of at least one of the plurality of virtual keys may be different from a symbol displayed on the corresponding key of the physical keyboard.

In any of the preceding examples, the keys of the physical keyboard may not comprise symbols.

In any of the preceding examples, the second image representation may comprise a visual representation of the one or more fingers.

In any of the preceding examples, the method caused by the computer-readable medium may further comprise determining a location of at least one hand of the user relative to the physical keyboard, and wherein the second image representation comprises a visual representation of the at least one hand.

In any of the preceding examples, the second image representation may be updated in real-time or near real-time based at least in part on the output of the one or more sensors.

Examples of a VR/AR/MR System with Haptic Feedback

Figure 21:
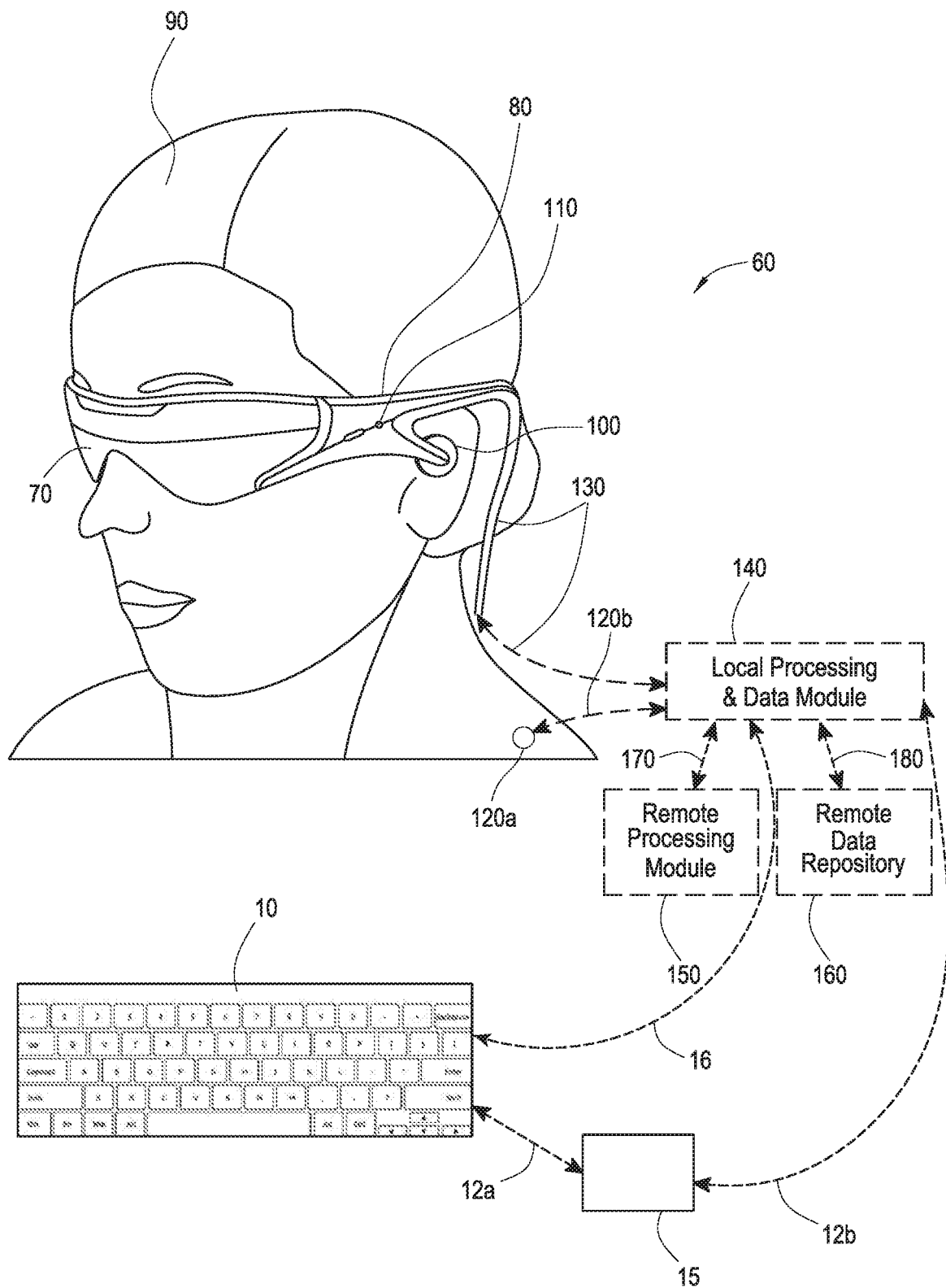
FIG. 21 illustrates an example of a wearable display system.

FIG. 21 illustrates an example embodiment of a wearable display system 60. The wearable display system 60 includes a display 70, and various mechanical and electronic modules and systems to support the functioning of that display 70. The wearable display system 60 can be a VR/AR/MR system similar to those described elsewhere herein (e.g., as shown in FIG. 2).

In some embodiments, an input device 10 can be used to interact with and/or control the wearable display system 60. For example, the input device 10 may be a keyboard that the user operates to input characters and commands for interacting with the images projected by the display 70, as well as for performing other operations. The input device 10 may be operatively coupled by a communications link 16, such as by a wired lead or wireless connectivity, to the local data processing module 140. The data processed, cached, and stored by the local processing and data module 140 may include data received from the input device, such as key strokes, control inputs for moving and otherwise interacting with images projected on the display 70, etc.

In some embodiments, the input device 10 may include one or more haptic feedback components 15. The haptic feedback component 15 may be used in the input device 10 to provide tactile feedback for the user when interacting with the wearable display system 60. The haptic feedback component 15 may, for example, provide tactile feedback to the user indicating that an input was received by the wearable display system 60. In some embodiments, the haptic feedback component 15 may generate a force, vibration, or motion which is imparted to the input device 10 and is perceivable by the user. For example, the input device 10 may be a keyboard and the haptic feedback component 15 may cause the keyboard or a localized region thereof to vibrate in response to a user interaction with a key or the localized region of the keyboard.

In some embodiments, a plurality of haptic feedback components 15 may be provided in the input device 10. In such embodiments, the haptic feedback components 15 may each cause a localized vibration or movement within a separate region or area of the input device 10 respectively associated with or coupled to a given haptic feedback component 15. For example, a plurality of haptic feedback components 15 may be provided that are each associated with a different key or group of keys of the keyboard input device 10. Thus, each haptic feedback component 15 may impart a haptic response (e.g., a vibration or movement) to the associated key or group of keys.

The haptic feedback components 15 may be configurable to react in response to different types of user interactions. For example, as described above, the haptic feedback component(s) 15 may produce a vibration through the entire user input device 10 or localized portion thereof in response to a user input user interaction (e.g., a keystroke). In another example, the haptic feedback component(s) 15 may produce a localized feedback response when the user's hand is detected within a given proximity to a given key or virtual input element. Thus, where the user's hand is detected in proximity to a key (e.g., searching for the proper orientation or key) the area of the surface associated with the given key may experience a feedback response to assist the user in identifying the key. In some embodiments, a feedback response associated with a proximity user interaction may have magnitude and/or frequency that are lower than an input user interaction, so as to be less noticeable. In some embodiments, the feedback response may be increased as the user moves closer to the desired input element (e.g., the magnitude is increased or the frequency is increased to make the feedback response more noticeable). Other configurations are possible.

The haptic feedback component(s) 15 may be mounted onto or enclosed within the input device 10 and configured to generate a vibration imparted to the input device 10. The haptic feedback component 15 may be operatively coupled to the input device 10 by a link 12a. In some implementations the electrical circuit link 12a includes or is connected to an electrical voltage source for producing an electrical signal in the haptic feedback component 15 in order to generate the feedback response. Alternatively or in combination, the haptic feedback component(s) 15 may be operatively coupled to the local processing and data module 140 by a communications link 12b, such as by a wired lead or wireless connectivity. The haptic feedback device(s) may receive control signals (also referred to herein as "feedback signals") from one or both of the input device 10 and/or the local data and processing module 140 via the communications links 12a and 12b, respectively. The control signals may include data indicative of an amount (e.g., a magnitude, amplitude, and/or frequency) of the haptic feedback, sometimes referred to herein as haptic feedback parameters.

In some embodiments, the haptic feedback component 15 may receive the control or feedback signal, as described below, including feedback parameters that are indicative of the desired feedback response (e.g., a strength and direction of the force or vibration). In some embodiments, the response may be based on a magnitude and/or frequency of vibration. Different types of user interactions may be associated with different haptic feedback responses. For example, a keystroke on a keyboard may correspond to a localized vibration of a given magnitude and frequency that may be perceived by the user as a successful keystroke. As another example, the user interaction may include pressing a key which may cause a haptic response to the entire input device 10. In some embodiments, the association of the desired haptic feedback response and the user interaction may be stored in a non-transitory data storage (e.g., the local processing and data module 140 or the remote data repository 160). For example, the association may be stored as a look-up-table (LUT) that is accessible by the local data processing module 140 in response to a detected user interaction.

In some implementations, the haptic feedback device 15 may vibrate in response to an event on the display. For example, a displayed object may interact with another displayed object or real-world object and this interaction may correspond to a haptic feedback imparted to the input device 10. For example, the wearable display system 60 may be used to project a virtual object as part of a video game, and actions in the game may be translated to a control signal for producing a haptic feedback in the input device.

The haptic feedback component(s) 15 may be, for example, eccentric rotating mass motors, linear resonant actuators, piezo electronics, or other transducers. The haptic feedback component(s) 15 may be operably coupled to an electrical circuit and connected to a power source. A controller may cause the source, based on a control signal, to apply a current or voltage to the haptic feedback component 15 to generate the vibration. For example, where an eccentric rotating mass motor is used, current may be applied to the motor to cause an off-axis mass to rotate causing a vibration. The amount of current and the duty cycle may control the magnitude and frequency of the vibration. Thus, the control signal may be indicative of a current or voltage to be applied to the haptic feedback device 15 for a desired feedback response. While a specific example haptic feedback component 15 has been described, other configurations are possible. For example, a voice coil of a linear resonant actuator may be similarly controlled based on the electrical signal provided thereto. Thus, the haptic feedback response stored in the non-transitory data storage may be indicative of an electrical signal to be applied to the haptic feedback component.

Figure 22:
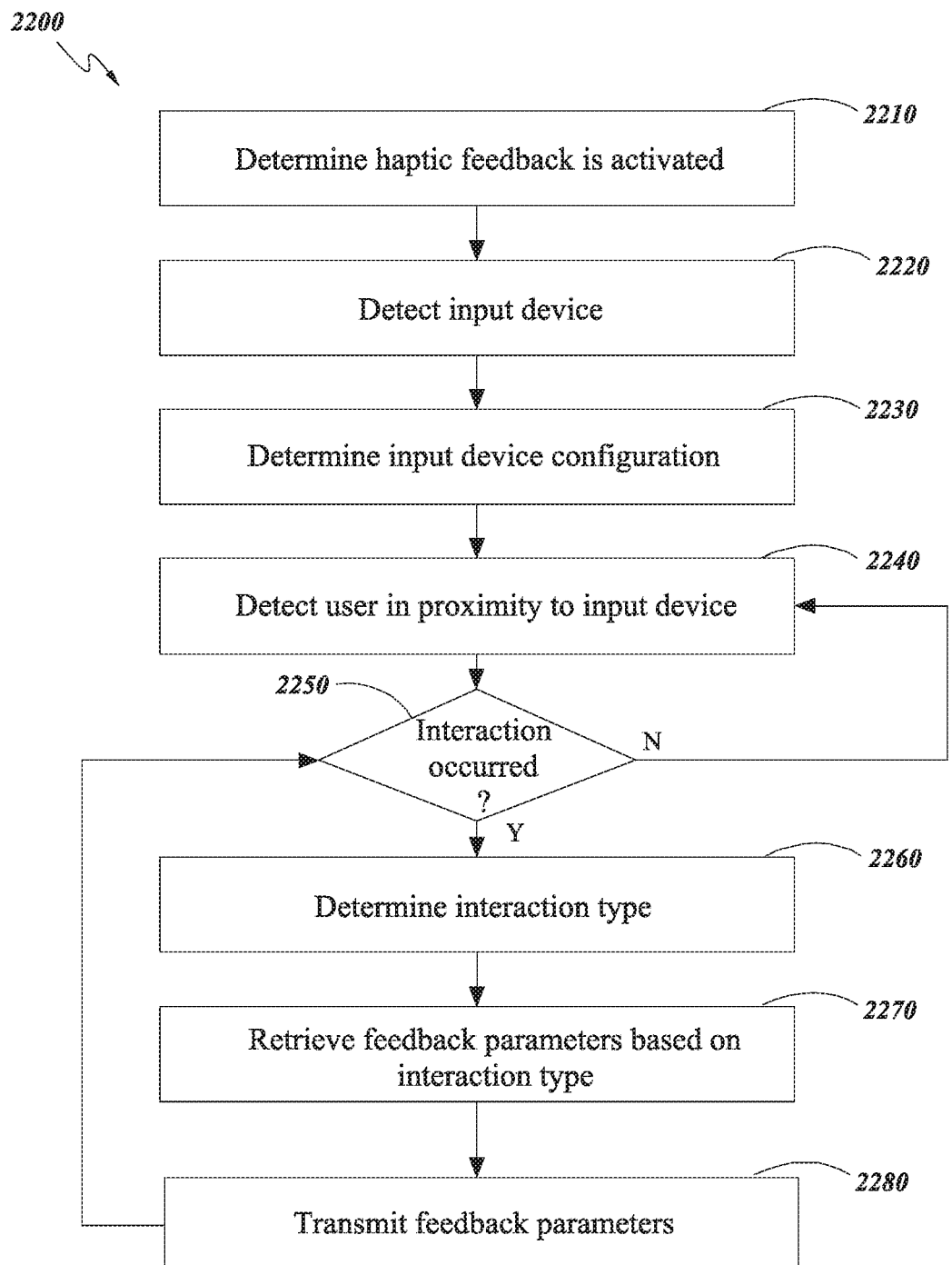
FIGS. 22 and 23 are flowcharts that illustrate example methods for haptic communication.

FIG. 22 is an illustrative process flow 2200 for providing haptic communication to a user of a of wearable display system (e.g., wearable display system 60 of FIG. 21). The process flow 2200 is directed to an example of providing haptic communication to the user in response to user interactions with an input device, as described above. The process flow 2200 may be performed by hardware (e.g., the wearable display system of FIG. 21). The process flow 2200 can be implemented by the local data and processing module 140 programmed by instructions stored in a non-transitory data storage operably coupled to logic devices of the local data and processing module 140. In another embodiment, local data and processing module 140 may implement process flow 2200 via the remote processing module 150 executed by logic devices in the local processing module 140 operably connected to the remote data repository 160.

At block 2210, the process flow 2200 may determine that the haptic feedback system is activated. In one or more embodiments, the user may simply turn on the haptic feedback system. Or, in other embodiments, the haptic feedback system may be active by default, and the user may decide to turn the haptic feedback system off. The local data and processing module 140 may receive a signal indicating that the haptic feedback system is active.

At block 2220, the process flow 2200 may detect an input device. As described above, the input device may be an input device 10, such as a keyboard. In one or more embodiments, detecting the input device may include monitoring the operational configuration or environment of the wearable display system for the input device. This can be done using, for example, the outward facing camera to capture images of the environment in front of the user and identify the input device therein. Or, in another example, wearable display system may recognize that a connection has been established with the input device, for example, through wired or wireless communication links 16. In another embodiment, the user may execute a function of the wearable display system indicating the presence of the input device (e.g., selecting an input stating that a keyboard has been connected).

At block 2230, the process flow 2200 may determine the input device type or configuration (e.g., a real or virtual keyboard, a video game controller, etc.). The input device type may be identified through similar means as used to detect the device in block 2220 (e.g., outward facing camera, communication links, and user identification). The input device may pair with the wearable display system through, for example, a wireless communication protocol (e.g., Bluetooth, ZigBee, etc.) where the keyboard executes a handshake protocol to establish a connection and exchange identifying data with the wearable display system. Based on the determined input device type, the wearable display system may be able to determine which types of user interactions to expect and the configuration of the haptic feedback components within the input device. The input device type may also identify the specific type(s) of haptic feedback components in the input device, which may require different operating parameters and configurations.

In some embodiments, the input device type may be associated with a data structure of user interactions and feedback signals. For example, a first input device (e.g., a keyboard) may be associated with a first list of user interactions and feedback signals, whereas a second input device (e.g., a game controller) may be associated with a second. The data structure may be stored in the wearable display device or in the input device. Furthermore, different input devices of similar types, such as various types of key boards (e.g., letter keyboards, emoji keyboards, number keyboard, etc.) may be associated with different user interactions and feedback signals. Thus, the wearable display system may be able to retrieve the correct data structure of user interaction and feedback signal pairings so as to transmit the desired haptic feedback signal that the input device is capable of executing. This may permit the wearable display system, for example, to know which localized regions of the input device contain haptic feedback components and what voltages and currents these components are capable of executing.

At block 2240 of the process flow 2200, the wearable display system may optionally detect the user in proximity to the input device. For example, the wearable display system, through sensors in the input device (e.g., proximity or inertial sensors) or the outward facing camera, may detect that the user is in proximity, and therefore intends to use the input device. This may limit the results of detecting an interaction with the input device that is not the result of a desired user interaction.

At block 2250 of the process flow 2200, the wearable display system or input device can determine whether an interaction has occurred, for example, by receiving a signal indicative of an interaction. For example, interactions may include proximity user interactions, input user interactions, or interactions of one or more displayed virtual objects interacting with other virtual or real objects. If no interaction has occurred, the process flow returns to block 2240 and continues to monitor for detectable interactions. If, however, an interaction is detected, the input device or the wearable display system may transmit an interaction signal characterizing the interaction. For example, where the interaction is a user interaction, the data in the signal may include where the touch occurred (e.g., which key) and how the wearable display system is to react in response to the touch (e.g., how the displayed virtual objects are modified). In the case of a virtual interaction (e.g., a virtual object interacting with other objects in the display (real or virtual)), the wearable display system may determine this is an interaction to be haptically communicated to the user via the input device to enhance an immersive entertainment experience.

At block 2260, the process flow 2200 determines the interaction type, based on the received signal in block 2250. For example, the data storage may include a classification of user interaction types identifiable based on the data received from the input device and/or the wearable display system. Or, the data received may in itself identify the user interaction. The user interaction, as described above, may identify a keystroke, a number selected, a letter, a function, an image, an intended effect of the images displayed by the display device, etc. The user interaction may be based on the type of input device (e.g., block 2230) and where or what element the user selected on the input device.

At block 2270, the process flow 2200 retrieves the haptic feedback parameters based on the determined interaction type of block 2260. The local data and processing module 140 may be programmed to access a database storing a plurality of feedback parameters representative of desired feedback response. The feedback parameters, as described above, may define a magnitude and frequency of the haptic feedback response desired for a given user interaction. Thus, a proximity user interaction may correspond to a desired magnitude and frequency, while an input user interaction is associated with a different magnitude and/or frequency. Similarly, different input user interactions may be associated with different magnitudes and frequencies. In another embodiment, the feedback parameter may also be based on the input device type and/or types of haptic feedback components.

At block 2280, the process flow 2200 transmits a haptic feedback signal to the input device. The haptic feedback signal may comprise the haptic feedback parameters. The input device may utilize the haptic feedback signal to generate the desired haptic feedback response, as described below in connection to process flow 2300. After transmitting the feedback signal, process flow returns to block 2250 to monitor for future interactions.

Figure 23:
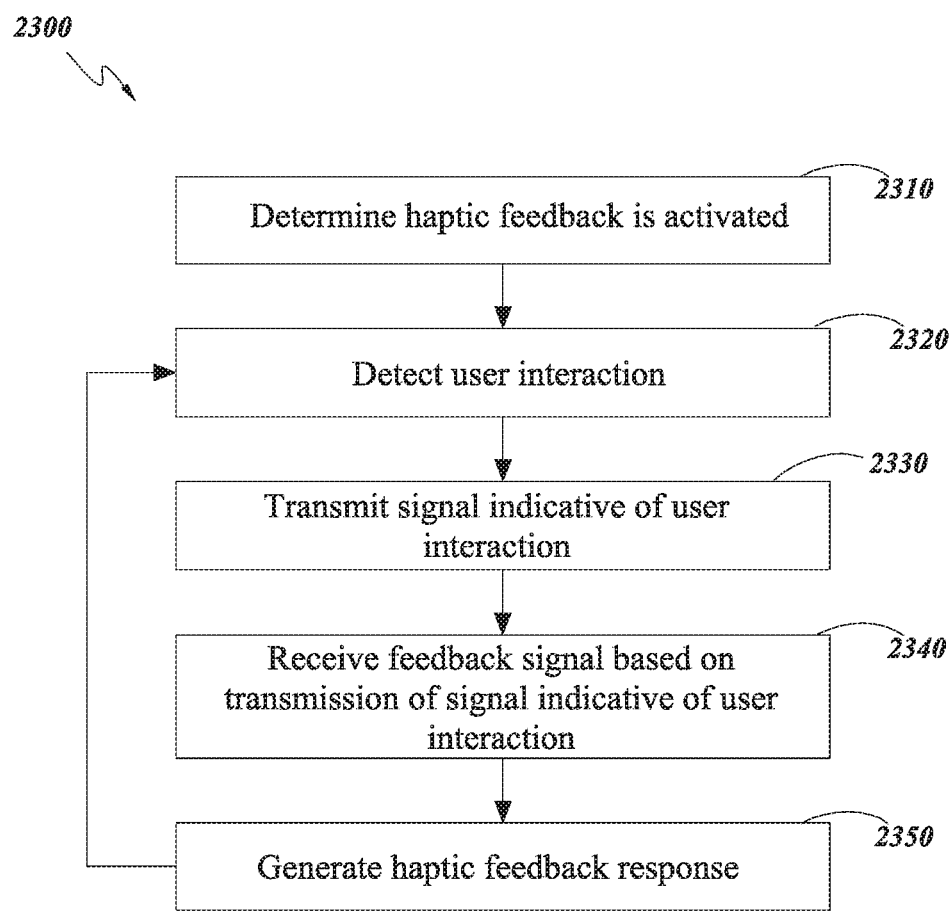

FIG. 23 is a process flow 2300 of an illustrative flowchart for providing haptic communication to a user of a of wearable display system (e.g., wearable display system 60 of FIG. 21). The process flow 2300 is directed to an example of an input device providing haptic communication to the user in response to user interactions, as described above. The process flow 2300 may be performed by hardware (e.g., an input device 10 and/or haptic feedback device 15 of FIG. 21). The process flow can be implemented by one or more hardware processors of the input device 10 programmed by instructions stored in a non-transitory data storage operably coupled to logic devices of the one or more processors. In another embodiment, the input device may implement process flow 2300 via the local data and processing module 140 executed by logic devices in the local processing module 140 operably connected to a data storage.

At block 2310, the process flow 2300 may determine that the haptic feedback system is activated. For example, the input device may be activated by default upon start up. In another example, the haptic feedback system may be activated when a connection has been established with the input device, for example, through wired or wireless communication link 16. The connection may include an exchange of data through, for example, a handshake protocol, where the input device may transmit identifying information, as described above in connection to 2230 of FIG. 22. The identifying information may also include an identification of the haptic feedback components therein and the operational parameters for the components. In some embodiments, the identifying information may include an association of expected user interactions and feedback response capabilities of the haptic feedback components.

At block 2320, the process flow 2300 detects a touch or user interaction. For example, the input device may detect an input user interaction via a pressing or force applied to an input element of the device. In another example, the input device may also detect a proximity user interaction as described above.

At block 2330, the process flow 2300 transmits a user interaction signal indicative of the user interaction. The user interaction signal may be transmitted to the wearable display system over communication link 16 for use as described in connection to FIG. 22.

As described above, in connection to block 2280 a feedback signal is transmitted to the input device, and at block 2340 the feedback signal is received by the input device. The signal may be transmitted over communication link 16. As described above the feedback signal may include data indicative of the magnitude and/or frequency of the desired feedback response associated with the user interaction detected in block 2320. In some embodiments, a feedback signal may be received independent of detecting a user interaction in block 2320, for example, when a virtual interaction is detected at the wearable display device, as described above.

At block 2350, process flow 2300 generates a haptic feedback response based on the haptic feedback signal received in block 2340. In various embodiments, a controller of the input device may receive and process the feedback signal to retrieve the feedback parameters included therein. The feedback parameters may be applied to the haptic feedback components. For example, the feedback parameters may define a current and/or voltage to apply to one or more haptic feedback components to produce the desired feedback response. The input device may include an electrical circuit with a voltage source configured to apply a current to the haptic feedback components attached thereto. Based on the haptic feedback parameters, the source may be configured to apply a current of a given magnitude with a desired duty cycle to produce the desired vibration through the input device. The processor may also be configured to identify a localized region (e.g., an identified group of haptic feedback components) to apply a current to so as to produce a localized feedback response. A mapping of the user interaction location and the associated haptic feedback components may be stored in a data storage accessible to the processor. After generating the haptic feedback response, process flow returns to block 2320 to monitor for future user interactions.

EXAMPLES

In some examples, a head mounted display (HMD) comprises: a frame; projection optics supported by the frame and configured to project an image to an eye of a user; and a sensor to detect an interaction with an input device operably connected with the HMD; a non-transitory data storage configured to store instructions; at least one hardware processor operably coupled to the non-transitory data storage and configured by the instructions to: receive a signal from the sensor indicative of the user interaction; determine a type of the user interaction based on the signal; and transmit a haptic feedback signal to the input device, wherein the haptic feedback signal comprises one or more parameters for generating a haptic response communicable to the user through the input device.

In any of the preceding examples, the input device may include a haptic feedback component.

In any of the preceding examples, the parameters may comprise data indicative of a magnitude and frequency of the haptic response.

In any of the preceding examples, the parameters may be indicative of at least one of a current and voltage to be supplied to the haptic feedback component.

In any of the preceding examples, the haptic feedback component may include at least one of an eccentric rotating mass motor, a linear resonant actuator, and a piezoelectric actuator.

In any of the preceding examples, the input device may be a keyboard.

In any of the preceding examples, the sensor may comprise an outward facing camera disposed on the frame and may be configured to detect the user interaction with the display device.

In any of the preceding examples, the outward facing camera may be configured to capture a plurality of images from in front of the HMD and the at least one hardware processor may be further configured to determine the user interaction based on the plurality of images.

In any of the preceding examples, the type of user interaction may comprise at least one of pressing a key of the input device, moving a component of the input device, and interacting with the input device.

In any of the preceding examples, the non-transitory data storage may be configured to store a plurality of types of user interactions and haptic feedback signals, wherein each type of user interaction is associated with one of the one or more parameters.

In any of the preceding examples, the at least one hardware processor may be further configured to retrieve the one or more parameters based on the type of user interaction, wherein the feedback response corresponds to the type of user interaction.

In some examples, a method comprises: receiving, from a sensor, a signal indicative of a user interaction with a wearable display system via an input device; determining a type of the user interaction based on the signal; and transmitting a haptic feedback signal to the input device, wherein the haptic feedback signal comprises one or more parameters for generating a haptic response communicable to the user through the input device.

In any of the preceding examples, the input device may include a haptic feedback component.

In any of the preceding examples, the parameters may comprise data indicative of a magnitude and frequency of the haptic response.

In any of the preceding examples, the parameters may be indicative of at least one of a current and voltage to be supplied to the haptic feedback component.

In any of the preceding examples, the haptic feedback component may include at least one of an eccentric rotating mass motor, a linear resonant actuator, and a piezoelectric actuator.

In any of the preceding examples, the input device may be a keyboard.

In any of the preceding examples, the sensor may comprise an outward facing camera disposed on the wearable display system and configured to detect the user interaction.

In any of the preceding examples, the outward facing camera may be configured to capture a plurality of images from in front of the wearable display system, and the method may further comprise determining the user interaction based on the plurality of images.

In any of the preceding examples, the type of user interaction may comprise at least one of pressing a key of the input device, moving a component of the input device, and interacting with the input device.

In any of the preceding examples, the method may further comprise storing a plurality of types of user interactions and haptic feedback signals, wherein each type of user interaction is associated with one of the one or more parameters.

In any of the preceding examples, the method may further comprise retrieving the one or more parameters based on the type of user interaction, wherein the feedback response corresponds to the type of user interaction.

In some examples, a non-transitory computer readable medium comprises instructions which, when read by a hardware processor, cause the hardware processor to perform a method comprising: receiving, from a sensor, a signal indicative of a user interaction with a wearable display system via an input device; determining a type of the user interaction based on the signal; and transmitting a haptic feedback signal to the input device, wherein the haptic feedback signal comprises one or more parameters for generating a haptic response communicable to the user through the input device.

In any of the preceding examples, the input device may include a haptic feedback component.

In any of the preceding examples, the parameters may comprise data indicative of a magnitude and frequency of the haptic response.

In any of the preceding examples, the parameters may be indicative of at least one of a current and voltage to be supplied to the haptic feedback component.

In any of the preceding examples, the haptic feedback component may include at least one of an eccentric rotating mass motor, a linear resonant actuator, and a piezoelectric actuator.

In any of the preceding examples, the input device may be a keyboard.

In any of the preceding examples, the sensor may comprise an outward facing camera disposed on the wearable display system and configured to detect the user interaction.

In any of the preceding examples, the outward facing camera may be configured to capture a plurality of images from in front of the wearable display system, and the method may further comprise determining the user interaction based on the plurality of images.

In any of the preceding examples, the type of user interaction may comprise at least one of pressing a key of the input device, moving a component of the input device, and interacting with the input device.

In any of the preceding examples, the method caused by the computer readable medium may further comprise storing a plurality of types of user interactions and haptic feedback signals, wherein each type of user interaction is associated with one of the one or more parameters.

In any of the preceding examples, the method caused by the computer readable medium may further comprise retrieving the one or more parameters based on the type of user interaction, wherein the feedback response corresponds to the type of user interaction.

Example Coordination Between User Input Device and Virtual Monitor

A wearable display system, such as a head mounted display (HMD), may be configured to work with a companion device, such as a physical user input device (e.g., a keyboard). In order for the HMD and the physical user input device to be able to work together (e.g., to exchange information wirelessly), the companion device and the HMD may need to first be paired with each other. After pairing, the wearable display system can show a virtual monitor to a user. The virtual monitor can be, for example, a sub-portion of the field of view of the HMD where AR image data is displayed so as to simulate the appearance and function of a monitor. The location of the virtual monitor and the content shown in the virtual monitor can be based on the location of the physical user input device and/or based on input into the user input device. For example, the virtual monitor can be shown near the physical keyboard. The location of the virtual monitor can be determined based on the location of the physical user input device. The location of the virtual monitor can be updated based on a new location of the physical user input device as its relative physical location with respect to the user changes. As another example, input to the physical user-input device can result in a change in the content shown in the virtual monitor. The present disclosure provides systems and methods for such virtual monitor-user input device orchestration.

FIG. 24 schematically illustrates an example interaction between a wearable head mounted display (HMD) system, an associated physical keyboard, and a virtual monitor shown on a display of the HMD system. A HMD system 2404 can authenticate a companion device, such as a physical keyboard 2408 or some other type of physical user input device (e.g., a touchpad). For the physical keyboard 2408, a user can press a physical key to generate a signal corresponding to the pressed key. The signal corresponding to the pressed key can then be transmitted to the HMD system, which can then perform an action corresponding to the signal. For example, the action could be to display on the virtual monitor a character, number, or symbol corresponding to the pressed key.

The HMD system 2404 and the physical keyboard 2408 can communicate wirelessly over, for example, a radio frequency (RF) communication channel 2412 (e.g., WiFi, Bluetooth, etc.).

The HMD system 2404 can include an outward-facing image capture device, such as a camera, which can capture an image of the environment surrounding a user of the HMD system 2404. The user's field of view (FOV) can include the physical keyboard 2408. The image of the environment of the user can also include the physical keyboard 2408. The HMD system 2404 can determine the presence of the physical keyboard 2408 in the user's FOV by analyzing the image. The HMD system 2404 can also determine a location of the physical keyboard 2408 using computer vision techniques. Based on the location of the physical keyboard 2408, the HMD system 2404 can determine a location of a virtual monitor 2416 and display the virtual monitor 2416 at the determined location.

The virtual monitor can correspond to a portion of the field of view of the HMD system 2404. User input from the keyboard 2408 can be shown in that portion of the field of view. In some embodiments, the actuation of the physical keyboard 2408 can cause a user interface operation to be performed on the virtual monitor. For example, the wearable system can present the virtual monitor 2416 to appear near the physical keyboard 2408 within the field of view. In some embodiments, there is a fixed spatial relationship between the detected location of the physical keyboard 2408 within the field of view and the location where image data corresponding to the virtual monitor is shown within the field of view. If for example, the location of the physical keyboard 2408 within the field of view changes, then the displayed position of the virtual monitor can also be changed in a corresponding manner.

The HMD system 2404 can update the rendering location or set the virtual monitor 2416 to become visible/invisible based on what is in the user's field of view (FOV). For example, the HMD system 2404 can display the virtual monitor 2416 if the physical keyboard 2408 is in the user's FOV. If a user's head pose changes and the physical keyboard 2408 is no longer in the user's FOV, the HMD system 2404 can hide the virtual monitor 2416.

Example Determination of Virtual Monitor Location

FIG. 25 illustrates an example process 2500 of determining a location of a virtual monitor, a virtual display, or a virtual screen based at least in part of the location of a physical keyboard. At block 2504, a wearable display can receive a first image of physical environment of a user of the wearable system. The first image of the physical environment corresponds to the field of view (FOV) of a world camera. The field of view of a world camera can include at least a portion of the field of view of the user. The first image can show that the FOV of the user includes an input device, such as a physical keyboard.

At block 2508, the wearable system can determine a first location/orientation of the physical keyboard in the environment of the user using the first image. The wearable system can determine that the first location of the physical keyboard is within the user's FOV. The wearable system can implement an object recognizer utilizing one or more computer vision techniques disclosed herein to determine the presence of the physical keyboard in the user's FOV and the first location/orientation of the physical keyboard.

In some embodiments, the wearable system can implement an object recognizer utilizing one or more computer vision techniques disclosed herein to determine the first location/orientation of the physical keyboard using visual characteristics of the physical keyboard (e.g., locations of fiducials). For example, the visual characteristics can comprise at least one of: a shape of a surface of the physical keyboard or at least one label associated with the physical keyboard. The label associated with the physical keyboard can be invisible to the user (e.g., a fiducial created using a dye invisible to the human eyes).

In some embodiments, the first location/orientation of the physical keyboard can be received from the physical keyboard, determined using a location/orientation sensor of the physical keyboard. For example, the location/orientation sensor may include a global positioning system (GPS) unit, an accelerometer, an inertial measurement unit, a gyroscope, a compass, or a combination thereof. In some embodiments, the location/orientation sensor can be used to provide location/orientation information with a first number of degrees of freedom (e.g., three degrees of freedom). Then, computer visions techniques can be used to supplement the location/orientation information from the keyboard's sensor so as to increase the number of degrees of freedom (e.g., increase the location/orientation information to 6 degrees of freedom). In some embodiments, for example, the keyboard's sensor could be a 3-axis accelerometer which provides the orientation of the keyboard. Computer vision techniques could then be used to locate the position of the keyboard within three-dimensional space. Similar techniques can be used to determine the location/orientation of any physical object, including totems.

In some embodiments, the first location/orientation of the keyboard can be determined based on a hand of the user near the physical keyboard in the image. For example, a typing motion coupled with close proximity to the physical keyboard can indicate that the user is typing. The location/orientation of the physical keyboard can thus be determined based on the location of the hand.

In some embodiments, keys on the physical keyboard can be non-uniform. For example, certain keys can be bigger or taller (e.g., relative to a reference plane of the physical keyboard). The properties of these keys relative to other keys can be used to determine the location/orientation of the physical keyboard. In some embodiments, the wearable system can receive an image of the eye of the user and determine a gaze direction of the eye of the user. Based on the gaze direction, the wearable system can determine that the eye is looking at a particular key of the physical keyboard (e.g., a taller or a wider key). Looking at the particular key can be a command associated with the particular key to the wearable system. The command can be enabling or disabling a locking command for locking the virtual monitor as appearing relatively fixed with respect to the physical keyboard, for example.

At block 2512, the wearable system can determine a first rendering location/orientation of a virtual monitor based at least in part on the first location of the physical keyboard. For example, the first rendering location/orientation can be relative to the first location/orientation of the physical keyboard. As another example, the first rendering location/orientation can be based on the distance of the physical keyboard from the user.

At block 2516, the wearable system can determine a size of the virtual monitor based at least in part on the first rendering location/orientation and a size preference of the virtual monitor. For example, if the size preference of the virtual monitor is bigger, the size of the rendered virtual monitor should be bigger. As another example, if the keyboard is relatively more distant from the user, the size of the virtual monitor can be rendered relatively smaller so that they are commensurate in size, relatively speaking. At block 2520, the wearable system can instruct a display system of the wearable system to render the virtual monitor with the determined size and orientation at the first rendering location. In some embodiments, the wearable system can render a virtual input device at the first location as appearing superimposed on the physical input device.

Example Virtual Monitor Location Update

Figure 26:
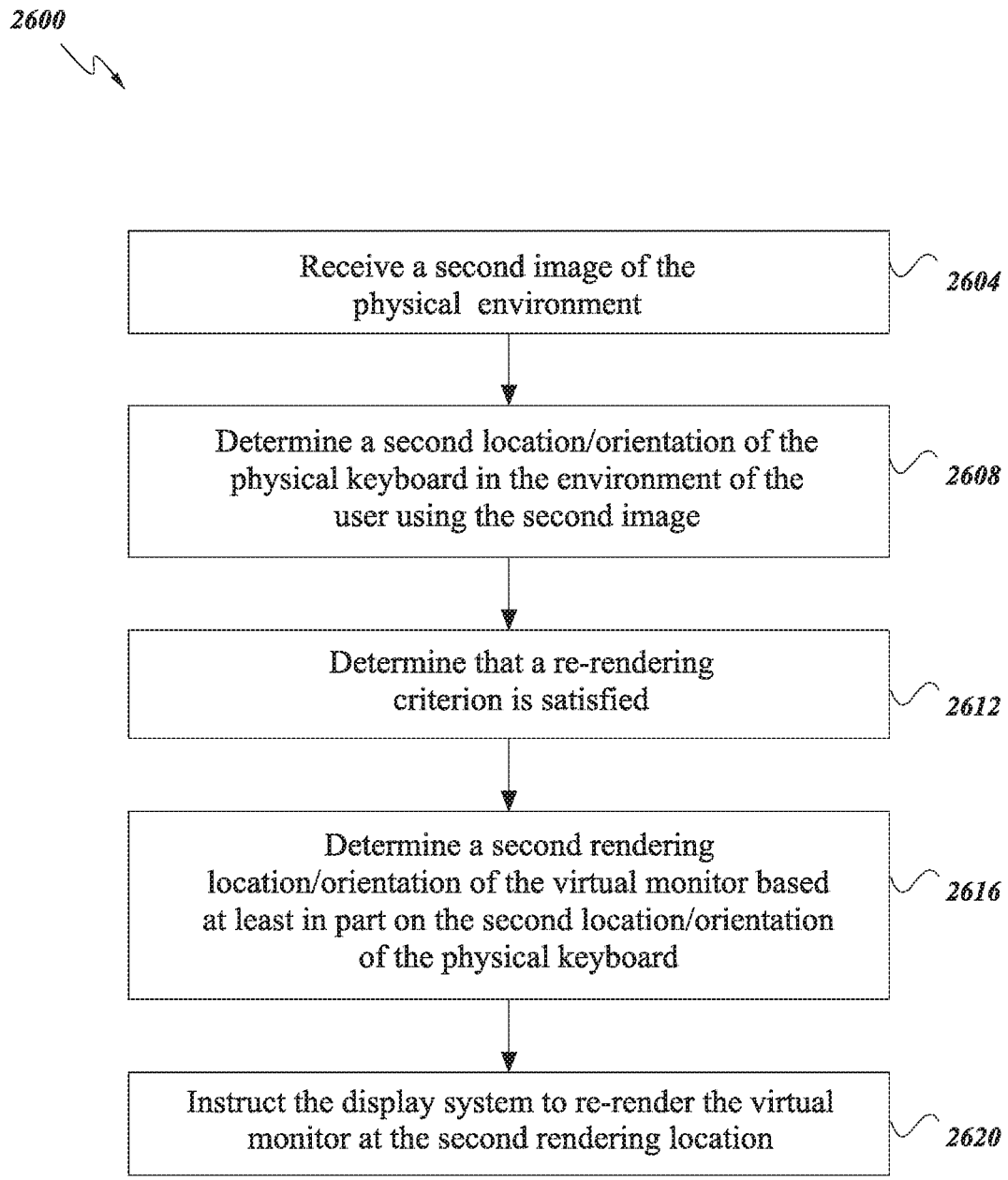
FIG. 26 illustrates an example process of modifying the rendering location of a virtual monitor based on the location of physical keyboard.

FIG. 26 illustrates an example process 2600 of modifying the rendering location/orientation of a virtual monitor based on the location of physical keyboard. The illustrative method 2600 may be implemented following implementation of process 2500, discussed above, such that block 2604 occurs subsequent to block 2520 described above.

At block 2604, the wearable system can receive a second image of the physical environment. The second image of the physical environment corresponds to the field of view (FOV) of a world camera. The field of view of a world camera can include at least a portion of the field of view of the user. The second image can show that the FOV of the user includes an input device, such as a physical keyboard.

At block 2608, the wearable system can determine a second location/orientation of the physical keyboard in the environment of the user using the second image (and/or using information from the keyboard's location/orientation sensor). The wearable system can determine that the second location of the physical keyboard is within the user's FOV. The wearable system can implement an object recognizer utilizing one or more computer vision techniques such as those disclosed herein to determine the presence of the physical keyboard in the user's FOV and the first location/orientation of the physical keyboard.

In some embodiments, the wearable system can implement an object recognizer utilizing one or more computer vision techniques such as those disclosed herein to determine the second location/orientation of the physical keyboard using visual characteristics of the physical keyboard (e.g., locations of fiducials). For example, as mentioned above, the visual characteristics can comprise at least one label associated with the physical keyboard. But the label described at this block and the label described with reference to block 2508 can be different because the first block may no longer be visible to the wearable system or the second label may be located in a position where it can be seen more clearly.

At block 2612, the wearable system can determine whether a re-rendering criterion is satisfied. The re-rendering criterion can be based on one or more of the following factors. For example, the re-rendering criterion can be based at least in part on a distance/change between the first location/orientation of the physical keyboard and the second location/orientation of the physical keyboard. If the distance/change is below a threshold, the re-rendering criterion may not be satisfied and the location/orientation of the virtual monitor may not need to be changed, thus making re-rendering unnecessary.

The re-rendering criterion can be based at least in part on an orientation of the physical keyboard determined using an orientation senor of the physical keyboard. A user can indicate his or her intent to "close" the virtual monitor by rotating the physical keyboard to simulate closing the lid of a physical laptop. The wearable display can receive an orientation of the input device or a change in orientation of the input device and cause the display system to cease rendering the virtual display based at least in part on the orientation of the input device. The orientation of the physical keyboard can be determined using an orientation sensor of the physical keyboard, such as an accelerometer, an inertial measurement unit, a gyroscope, a compass, or a combination thereof. In some embodiments, the wearable system can cease rendering the virtual display based at least in part on a type of the input device. For example, the wearable display system can cease displaying the virtual monitor after receiving an indication of the physical keyboard being rotated if the physical keyboard represents a keyboard of a physical laptop. However, the wearable display system may not cease displaying the virtual monitor after receiving the same indication if the physical keyboard represents a keyboard of a desktop computer. More generally, the keyboard can be associated with commands based on its movements, analogous to hand gestures. Some of the commands based on keyboard movements may not satisfy the re-rendering criterion (e.g., rotating the physical keyboard if the physical keyboard corresponds to a desktop keyboard) and thus do not require re-rendering of the virtual monitor. As an example, moving the physical keyboard further away from the user may not require re-rendering or resizing of the virtual monitor.

At block 2616, the wearable system can determine a second rendering location/orientation of the virtual monitor based at least in part on the second location/orientation of the physical keyboard. For example, the second rendering location/orientation can be relative to the second location/orientation of the physical keyboard. As another example, the second rendering location/orientation can be based on the distance of the physical keyboard from the user. At block 2620, the wearable system can instruct the display system to re-render the virtual monitor at the second rendering location/orientation. The wearable system can determine a size of the virtual monitor based at least in part on the second rendering location and the size preference of the virtual monitor. For example, if the size preference of the virtual monitor is bigger, the size of the virtual monitor rendered should be bigger. As another example, if the keyboard is far from the user, the size of the virtual monitor can be smaller so that they are commensurate in size with respect to one another.

Example Rendering Using a Virtual Monitor

FIG. 27 illustrates an example process of rendering the input received by the physical keyboard using the virtual monitor in FIG. 25. The illustrative method 2700 may be implemented following implementation of process 2500 or process 2600, discussed above, such that block 2704 occurs subsequent to block 2520 or block 2620 described above.

At block 2704, the wearable system can receive an indication of an actuation of a first key of the physical keyboard. For example, the physical keyboard can transmit data to the wearable system, directly or indirectly, through a communication channel, indicating that the first key of the physical keyboard corresponding to the letter "M" has been actuated or pressed by the user. At block 2708, the wearable system can instruct the display system to render a first indicium corresponding to the first key as appearing in a virtual monitor at a first location of the first character. For example, after receiving data that the key corresponding to the letter "M" has been actuated, the wearable system can display a first indicium corresponding to the letter "M." The first indicium can contain a representation of the letter "M" (e.g., with a particular font and size). The first indicium can be displayed on the virtual monitor at a particular location of the virtual monitor. In some embodiments, the user's field of view (FOV) includes only a portion of the virtual monitor. Thus, if the location of the first indicium is not in the user's FOV, the indicium may not be displayed on the virtual monitor. In some embodiments, the actuation of the key corresponds to a user interface operation described herein, such as moving virtual objects or physical objects. In some embodiments, the actuation of the first key corresponds to enabling or disabling a locking command for locking the virtual monitor as appearing relatively fixed with respect to the physical keyboard At block 2712, the wearable system can receive an indication that a second key of the physical keyboard has been pressed. For example, the physical keyboard can transmit data to the wearable system, directly or indirectly, through a communication channel, indicating that the second key of the physical keyboard corresponding to the letter "A" has been actuated or pressed by the user. In some embodiments, the actuation of the second key corresponds to enabling or disabling a locking command for locking the virtual monitor as appearing relatively fixed with respect to the physical keyboard.

At block 2716, the wearable system can determine a second location of a second indicium corresponding to the second key based at least in part on the first location of the first character. For example, the second location of the second indicium corresponding to the letter "A" can be adjacent to the first indicium when the user is typing in a virtual document shown on the virtual monitor. At block 2720, the wearable system can instruct the display system to render the second indicium corresponding to the second key as appearing in the virtual monitor at the second location of the second character. For example, after receiving data that the key corresponding to the letter "A" has been actuated, the wearable system can display a second indicium corresponding to the letter "A." The second indicium can contain a representation of the letter "M" (e.g., particular font and size). The second indicium can be displayed on the virtual monitor at a particular location of the virtual monitor. Blocks 2712-2716 can be repeated so the wearable system can continuously receive input from the user through the physical keyboard.

EXAMPLES

In some examples, a system comprises: a display system configured to present a virtual monitor to a user; an outward-facing imaging system configured to image a physical environment of the user; a hardware processor in communication with the display system and the outward-facing imaging system, the hardware processor programmed to:

receive a first image of the physical environment acquired by the outward-facing imaging system; determine a first location of a physical keyboard in the environment of the user using the first image; determine a first rendering location of the virtual monitor based at least in part on the first location of the physical keyboard; determine a size of the virtual monitor based at least in part on the first rendering location and a size preference of the virtual monitor, wherein the virtual monitor is configured for a user interface function; and instruct the display system to render the virtual monitor with the determined size at the first rendering location.

In any of the preceding examples, to determine the first location of the physical keyboard in the environment of the user, the hardware processor may be programmed to execute an object recognizer to determine the first location of the physical keyboard using visual characteristics of the physical keyboard.

In any of the preceding examples, the visual characteristics may comprise at least one of: a shape of a surface of the physical keyboard or a label associated with the physical keyboard.

In any of the preceding examples, the label associated with the physical keyboard may be invisible to the user.

In any of the preceding examples, the label associated with the physical keyboard may be on the physical keyboard.

In any of the preceding examples, the label associated with the physical keyboard may be at a label location fixed relative to the physical keyboard and offset from the physical keyboard.

In any of the preceding examples, the outward-facing imaging system may comprise a world camera having a field of view (FOV), wherein the FOV comprises a portion of the physical environment that is observed by the world camera at a given time, and wherein to determine the first location of the physical keyboard, the hardware processor may be programmed to detect at least a portion of the physical keyboard is in the FOV.

In any of the preceding examples, the hardware processor may be further programmed to: receive an indication of an actuation of a first key of the physical keyboard; and instruct the display system to render a first indicium corresponding to the first key as appearing in the virtual monitor at a first location of the first character.

In any of the preceding examples, the hardware processor may be further programmed to: receive an indication that a second key of the physical keyboard has been pressed; determine a second location of a second indicium corresponding to the second key based at least in part on the first location of the first character; and instruct the display system to render the second indicium corresponding to the second key as appearing in the virtual monitor at the second location of the second character.

In any of the preceding examples, the hardware processor may be further programmed to: receive an indication of an actuation of a first key of the physical keyboard; and instruct an execution of a command based on the actuation of the first key of the physical keyboard.

In any of the preceding examples, the command may cause the system to perform a user interface operation.

In any of the preceding examples, the command may comprise enabling or disabling a locking command for locking the virtual monitor as appearing relatively fixed with respect to the physical keyboard.

In any of the preceding examples, the hardware processor may be further programmed to: receive a second image of the physical environment acquired by the outward-facing imaging system; determine a second location of the physical keyboard in the environment of the user using the second image; determining if a re-rendering criterion is satisfied; determine a second rendering location of the virtual monitor based at least in part on the second location of the physical keyboard; and instruct the display system to re-render the virtual monitor at the second rendering location.

In any of the preceding examples, the hardware processor may be further programmed to determine a distance between the first location of the physical keyboard and the second location of the physical keyboard, and the re-rendering criterion may be based at least in part on the distance.

In any of the preceding examples, the re-rendering criterion may be based at least in part on a locking command for locking the virtual monitor as appearing relatively fixed with respect to the physical keyboard.

In any of the preceding examples, the re-rendering criterion may be based at least in part on an orientation of the physical keyboard determined using an orientation senor of the physical keyboard.

In any of the preceding examples, a property of a third key of the physical keyboard and a corresponding property of a fourth key of the physical keyboard may be different.

In any of the preceding examples, the property of the third key may comprise a height of the third key relative to a reference plane of the physical keyboard.

In any of the preceding examples, the system may further comprise: an inward-facing imaging system configured to image an eye of the user, wherein the hardware processor is further programmed to: receive an image of the eye of the user; determine a gaze direction of the eye of the user in the image of the eye of the user; determine the eye in the image of the eye is looking at the third key of the physical keyboard using the gaze direction of the eye; and instruct an execution of a command based at least in part on the eye in the image of the eye looking at the third key of the physical keyboard.

In any of the preceding examples, the command may comprise enabling or disabling a locking command for locking the virtual monitor as appearing relatively fixed with respect to the physical keyboard.

In some examples, a method comprises: receiving a first location of an input device in an environment of a user of a virtual display object; determining a first rendering location of the virtual display object based at least in part on the first location of the input device; determining a size of the virtual display object based at least in part on the first rendering location; and causing the display system to render the virtual display at the first rendering location.

In any of the preceding examples, the input device may comprise a physical keyboard.

In any of the preceding examples, receiving the first location of the input device may comprise receiving the first location of the input device determined by the input device using a location sensor.

In any of the preceding examples, the location sensor may comprise a global positioning system (GPS) unit, an accelerometer, an inertial measurement unit, a gyroscope, a compass, or a combination thereof.

In any of the preceding examples, receiving the first location of the input device may comprise determining the first location of the input device using an image of the input device in the environment of the user.

In any of the preceding examples, receiving the first location of the input device may further comprise determining the first location of the input device using a location of a hand of a user near the input device in the image.

In any of the preceding examples, the method may further comprise causing the display system to render a virtual input device at the first location as appearing superimposed on the physical input device.

In any of the preceding examples, the method may further comprise: receiving an orientation of the input device; and causing the display system to cease render the virtual display based at least in part on the orientation of the input device.

In any of the preceding examples, receiving the orientation of the input device may comprise receiving the orientation of the input device determined using an orientation sensor, wherein the orientation sensor comprises an accelerometer, an inertial measurement unit, a gyroscope, a compass, or a combination thereof.

In any of the preceding examples, causing the display system to cease render the virtual display may comprise causing the display system to cease render the virtual display based at least in part on a type of the input device.

In some examples, a non-transitory computer-readable medium comprises instructions which, when ready by a computer, cause the computer to perform a method comprising: receiving a first location of an input device in an environment of a user of a virtual display object; determining a first rendering location of the virtual display object based at least in part on the first location of the input device; determining a size of the virtual display object based at least in part on the first rendering location; and causing the display system to render the virtual display at the first rendering location.

In any of the preceding examples, the input device may comprise a physical keyboard.

In any of the preceding examples, receiving the first location of the input device may comprise receiving the first location of the input device determined by the input device using a location sensor.

In any of the preceding examples, the location sensor may comprise a global positioning system (GPS) unit, an accelerometer, an inertial measurement unit, a gyroscope, a compass, or a combination thereof.

In any of the preceding examples, receiving the first location of the input device may comprise determining the first location of the input device using an image of the input device in the environment of the user.

In any of the preceding examples, receiving the first location of the input device may further comprise determining the first location of the input device using a location of a hand of a user near the input device in the image.

In any of the preceding examples, the method caused by the computer readable medium may further comprise causing the display system to render a virtual input device at the first location as appearing superimposed on the physical input device.

In any of the preceding examples, the method caused by the computer readable medium may further comprise: receiving an orientation of the input device; and causing the display system to cease render the virtual display based at least in part on the orientation of the input device.

In any of the preceding examples, receiving the orientation of the input device may comprise receiving the orientation of the input device determined using an orientation sensor, wherein the orientation sensor comprises an accelerometer, an inertial measurement unit, a gyroscope, a compass, or a combination thereof.

In any of the preceding examples, causing the display system to cease render the virtual display may comprise causing the display system to cease render the virtual display based at least in part on a type of the input device.

Examples of Relative Positioning Between Application Image Data and Associated User Interface Image Data The wearable VR/AR/MR systems disclosed herein are capable of displaying virtual image data such that the image data appears to originate from any of multiple apparent depths or depth planes located different distances from the user. In these wearable VR/AR/MR systems, virtual image data can therefore be displayed not just within a two-dimensional (2-D) area but also within a three-dimensional (3-D) volume of space. The volume of space where the virtual image data is displayed can be, for example, a box, though other shapes are also possible. The box can have a depth dimension in the direction along the user's line of sight (e.g., the z-direction illustrated in FIGS. 28 and 29A-29E), as well as lateral width and height dimensions (e.g., the x- and y-directions, respectively, illustrated in FIGS. 28 and 29A-29E).

Since the VR/AR/MR systems described herein are capable of simultaneously executing multiple software applications (e.g., a game application, a map application, a calendar application, a messaging application, a clock application, a word processing application, etc.), and since each of these applications can have its own associated virtual image data, it can be advantageous to define separate, non-overlapping volumes of space in which each application can display its associated image data. Each application may be disallowed from displaying image data outside its assigned volume of space. In this way, conflicts between the image data for different applications can be avoided.

In some embodiments, two applications may be related, or otherwise associated, such that it may be desirable to provide a particular relative spatial relationship between the first volume of space in which the first application displays its image data and the second volume of space in which the related second application displays its image data. The two related applications may be separate applications or one of the applications may be a sub-application which is controlled by the other. One example pair of related applications is a parent application (e.g., a game application, a map application, a calendar application, a messaging application, a clock application, a word processing application, etc.) and a user interface application, such as a virtual keyboard application, which allows the user to interact with the parent application (e.g., by inputting text, commands, etc.). Various example systems and methods are disclosed herein using the example of a parent application and a related user interface application, such as a virtual keyboard application, but it should be understood that the same systems and methods can be used with any related, or otherwise associated, applications.

When determining the relative spatial locations of the respective non-overlapping volumes of space assigned for displaying image data associated with a parent application and image data associated with a user interface for the parent application, it may be desirable to satisfy one or more of the following aims: 1) providing an indication to the user of which user interface (e.g., virtual keyboard) instance is paired with which parent application, as the VR/AR/MR system may display multiple parent applications and multiple corresponding user interfaces simultaneously; 2) ensuring that positioning logic for determining the location of the user interface with respect to the parent application allows the user to view any part of the parent application they choose; and 3) providing a depth distance between the user interface and the parent application which can enhance readability.

Figure 28:
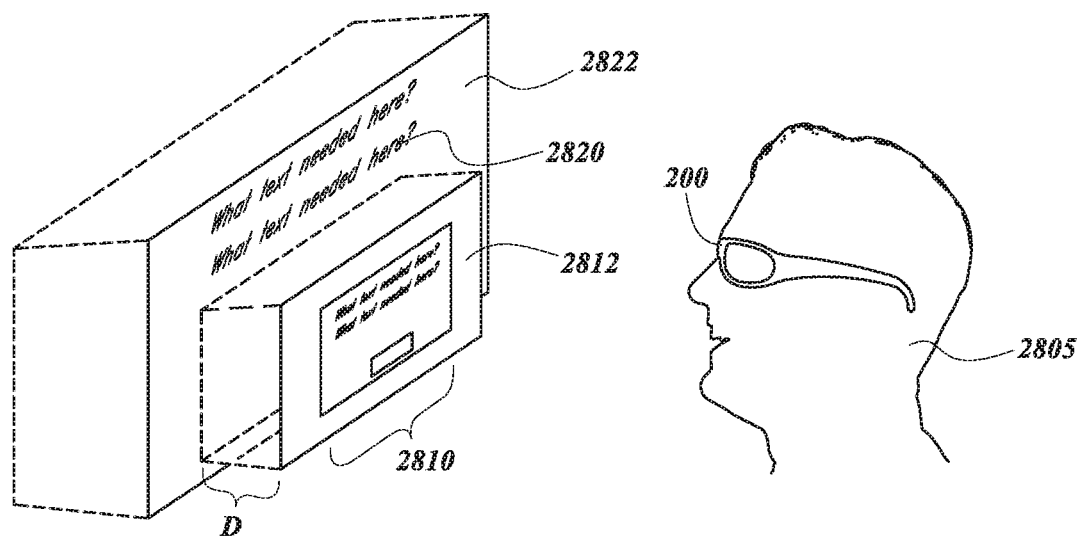
FIG. 28 illustrates an example of the relative spatial relationship between user interface image data (e.g., virtual keyboard image data) and parent application image data, as displayed by a wearable VR/AR/MR system.

FIG. 28 illustrates an example of the relative spatial relationship between user interface image data 2810 and parent application image data 2820, as displayed by a wearable VR/AR/MR system 200. Both applications are executed and displayed by the VR/AR/MR system 200, which is worn by a user 205.

A volume of space 2812 is set aside for displaying the user interface image data 2810. In some embodiments, volume of space 2812 is a box with a depth dimension in the illustrated z-direction and lateral dimensions in the illustrated x- and y-directions. In the illustrated embodiment, the user interface is a virtual keyboard and the user interface image data 2810 is displayed on the front surface of the user interface box 2812. In other embodiments, the user interface image data 2810 could occupy additional portions of the user interface box 2812, whether simultaneously or at different instants in time.

A different volume of space 2822 is set aside for displaying the parent application image data 2820. In some embodiments, volume of space 2822 is also a box with a depth dimension in the illustrated z-direction and lateral dimensions in the illustrated x- and y-directions. In the illustrated embodiment, the parent application image data 2820 is displayed on the front surface of the parent application box 2822, though other portions of this assigned volume of space could also be used for displaying the parent application image data 2820, whether simultaneously or at different instants in time.

As illustrated, the user interface box 2812 and the parent application box 2822 do not overlap so as to avoid image data conflicts between the two applications. Though, in the illustrated embodiment, the two boxes 2822, 2812 do "touch," with the rear surface of the user interface box 2812 being adjacent to the front surface of the parent application box 2822.

FIG. 28 shows a depth distance, D, in the z-direction between the user interface image data 2810 and the parent application image data 2820. The depth distance, D, can be a fixed distance. In some embodiments, the depth distance, D, corresponds to the depth dimension of the user interface box 2812.

The depth distance, D, can be measured in a variety of ways. In some embodiments, the depth distance, D, is measured from a surface of the parent application box 2822 to the counterpart surface of the user interface box 2812. For example, the depth distance, D, can be measured from the front surface of the parent application box 2822 to the front surface of the user interface box 2812, as shown in FIG. 28. In other embodiments, the fixed depth distance, D, can be measured from the depth plane of the parent application image data 2820 within the parent application box 2822 to the depth plane of the user interface image data 2810 within the user interface box 2812.

The depth distance, D, between the user interface image data 2810 and the parent application image data 2820 can be maintained at a fixed value by the VR/AR/MR system 200 even when either the parent application box 2822 or the user interface box 2812 is moved. For example, if a command is issued (e.g., by the user 2805 or by the parent application itself) to move the depth location of the parent application box 2822, and/or to move the depth location of the parent application image data 2820 within box 2822, then the wearable VR/AR/MR system 200 can automatically move the user interface box 2812, and/or the user interface image data 2810 within box 2812, by a corresponding amount in the depth direction so as to maintain the fixed depth distance, D.

By maintaining a fixed depth distance between all or a portion of the parent application image data 2820 and all or a portion of the associated user interface image data 2810 (e.g., a virtual keyboard), and/or between the parent application box 2822 and the user interface box 2812, the user interface experience (e.g., the typing experience) can be enhanced. The distinct depths or depth planes improve the ability of the user 2805 to easily distinguish between the user interface layer and the parent application layer, while the fixed distance, D, helps the user to contextually understand that the two applications are related to one another. This arrangement also allows parent application content behind the user interface to be visible and more readable than if the user interface were on the same plane with the parent application layer.

In addition, the fixed distance, D, can limit the number of permutations of vergence-accommodation push-ups to which a user must acclimate while using various applications on the VR/AR/MR system 200. A vergence-accommodation push-up is a term which describes the strain experienced by the user's eyes when focusing at different distances while looking back and forth between the parent application image data 2820 and the user interface image data 2810. Although this strain may not be immediately perceived by all users, it can cause discomfort for some users over time.

The focal distance shift associated with a vergence-accommodation push-up can occur relatively often with a user interface like a virtual keyboard, since the keyboard keys and the typed text are located at different depths. The greater the distance between these depths, the greater the strain experienced by the user's eyes. But the lesser the distance between the depths, the more difficult it becomes for the user to distinguish between the application image data 2820 and the user interface image data 2810. There are a range of values for the depth distance, D, which can strike a good balance between these two factors. In some embodiments, the depth distance, D, is 10-30 inches. In some embodiments, the depth distance, D, is 15-20 inches. In some embodiments, a value of 16.85 inches for the depth distance, D, has been found to work well.

In some embodiments, the user interface application can be invoked by a command from the parent application or the user. When the user interface application is invoked, the user interface box 2812 can be located at a spawn point that is specified by the parent application or by the user. For example, the parent application can provide a set of local coordinates (e.g., coordinates which are specified relative to the parent application box 2822) which indicate where a particular point on or in the user interface box 2812 should be located.

In some embodiments, the local coordinates need only specify the lateral (x, y) coordinates and the z coordinate can be determined based on the fixed depth distance, D. But if the user interface image data 2810 were simply displayed at the specified lateral (x, y) coordinates and at the fixed depth distance from the parent application image data 2820, it may not actually appear to the user 2805 to be positioned at the intended location. This is because, depending on where the parent application box 2822 and the user interface box 2812 are located with respect to the user's view point, the depth distance, D, between, for example, the parent application image data 2820 and the user interface image data 2810 may introduce some apparent lateral shift from the user's point of view.

For example, the local coordinates given by the parent application may be intended to position the user interface box 2812 flush with the bottom of the parent application box 2822. But if the two boxes are located above or below the user's view point, the user interface box 2812 may instead appear to the user 2805 to overlap the parent application box 2822, or it may appear to the user 2805 that there is a gap between the two boxes, depending on the depth distance, D.

Thus, in some embodiments, the VR/AR/MR system 200 can project a ray from the point specified by the local coordinates toward the user's view point. The VR/AR/MR system 200 can then calculate the point where the projected ray intersects the plane located the desired depth distance, D, from the parent application image data 2820 and/or box 2822. The user interface image data 2810 and/or box 2812 can then be positioned at a spawn point that is based on that point of intersection. For example, the middle of the top edge of the front surface of the user interface box 2812 (or any other specified point on or in the user interface box) can be positioned at the point of intersection. In this way, the user interface image data 2810 and/or box 2822 will appear to the user 2805 to be located at the desired position regardless of where the parent application box 2822 and the user interface box 2812 are with respect to the user's view point.

In other embodiments, if the local coordinates provided for locating the user interface lie inside the parent application box 2822, then the VR/AR/MR system 200 can calculate a spawn point that lies outside the parent application box 2822 along the line of sight from the user 205 to the point specified by the local coordinates. (This can be done to prevent the parent application box 2822 and the user interface box 2812 from overlapping). For example, the VR/AR/MR system 200 can project a ray from the point specified by the local coordinates toward the view point of the user 205. The VR/AR/MR system 200 can then calculate where the projected ray intersects with the plane of the front surface of the parent application box 2822. The user interface box 2812 can then be spawned based on the point of intersection. For example, the center of the top edge of the back surface of the user interface box 2812 (or any other specified point on or in the user interface box) can be positioned at the point of intersection. If the depth dimension of the user interface box 2812 is equal to the fixed depth distance, D, and if the user interface image data 2810 is displayed at the front surface of the user interface box, then the user interface image data will be located at the correct distance from the parent application box 2822.

Figure 29A:
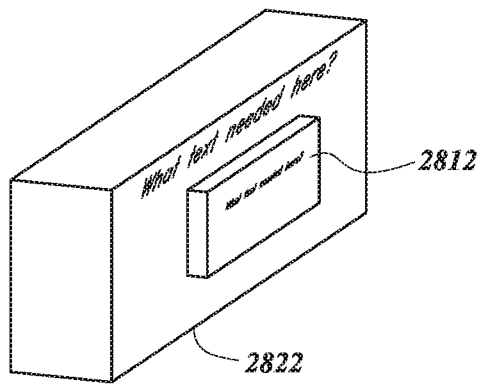
FIGS. 29A-29E illustrate examples of allowed and disallowed spatial relationships between parent application image data and user interface image data (e.g., virtual keyboard image data).
Figure 29B:
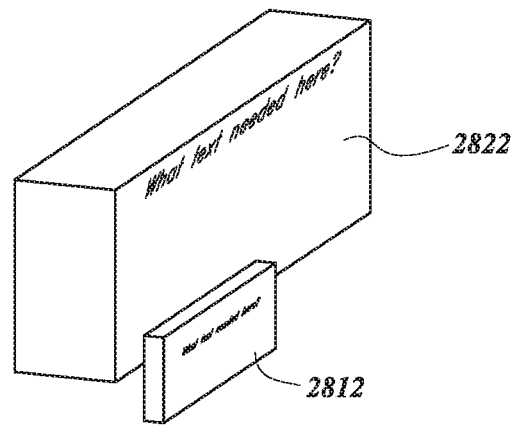
Figure 29C:
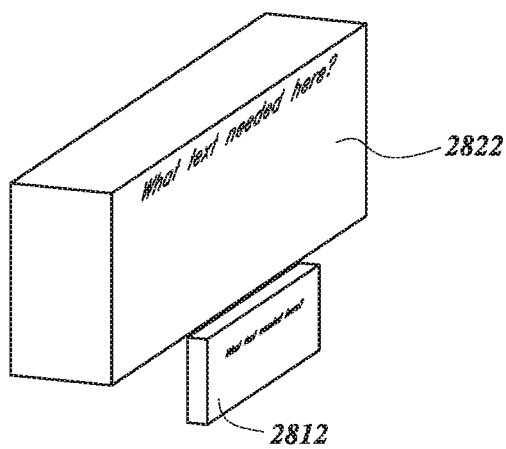
Figure 29D:
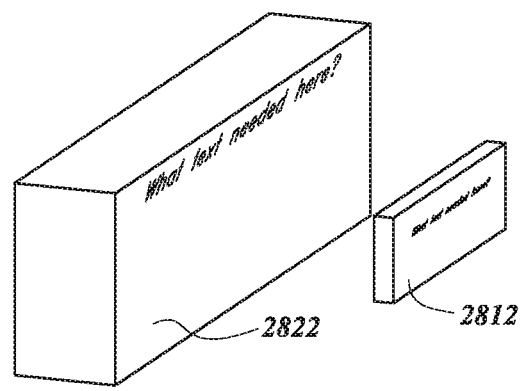
Figure 29E:
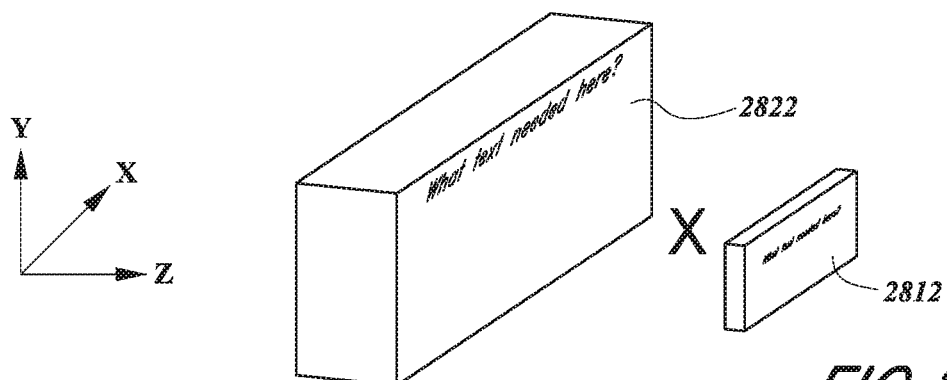

In some embodiments, the user interface image data 2810 and/or box 2812 are required to laterally touch the parent application image data 2820 and/or box 2822. FIGS. 29A-29E illustrate examples of allowed and disallowed spatial relationships. FIG. 29A illustrates an example where the user interface box 2812 completely laterally overlaps the parent application box 2822. FIG. 29B illustrates an example where the user interface box 2812 partially laterally overlaps the parent application box 2822. FIG. 29C illustrates an example where an edge of the user interface box 2812 laterally touches an edge of the parent application box 2822. FIG. 29D illustrates an example where a corner of the user interface box 2812 laterally touches a corner of the parent application box 2822. Meanwhile, FIG. 29E illustrates an example where no portion of the user interface box 2812 laterally touches any portion of the parent application box 2822. In embodiments where the user interface box 2812 is required to laterally touch the parent application box 2822, the arrangements shown in FIGS. 29A-29D are permitted whereas the arrangement shown in FIG. 29E is not permitted. In other embodiments, the user interface image data 2810 and/or box 2812 can be arranged in other relative spatial relationships with respect to the parent application image data 2820 and/or box 2822 which may be specified by a user.

In some embodiments, the parent application box 2822 and the user interface box 2812 can move together with one another in formation. If a command to move the parent application box 2822 is received from the user 2805 or from the parent application itself, then the user interface box 2812 can be moved by a corresponding amount. For example, the user interface box 2812 can be moved in the same direction and by the same amount as the parent application box 2822. Or the user interface box 2812 can be moved in a direction, and by an amount, that maintains the same apparent relative position between the two boxes 2812, 2822. As discussed above, the apparent relative position between the two boxes 2812, 2822 may be dependent upon where they are located with respect to the user's point of view and the depth distance, D, between the boxes. Thus, when a command is issued to move the parent application box 2822, the ray projection technique described above can be used to determine the new position for the user interface box 2812. In other embodiments, the position between the two boxes 2812, 2822 is fixed and the apparent relative position is not considered.

In some embodiments, the parent application controls movement of the user interface box 2812 since the user interface application may not be notified that the parent application box 2822 is being manipulated and thus may not be able to provide its own corresponding movement behavior. This can be accomplished by, at the beginning of manipulation of the parent application box 2822, making the user interface box 2812 a scene graph child of the parent application box 2822. As a scene graph child, the movement applied to the parent application box 2822 can be automatically applied to user interface box 2812. At the end of manipulation of the parent application box 2822, the scene graph parent-child relationship can be broken and the user interface box 2812 can be made a root scene graph object once again as it was prior to the manipulation.

Figure 30:
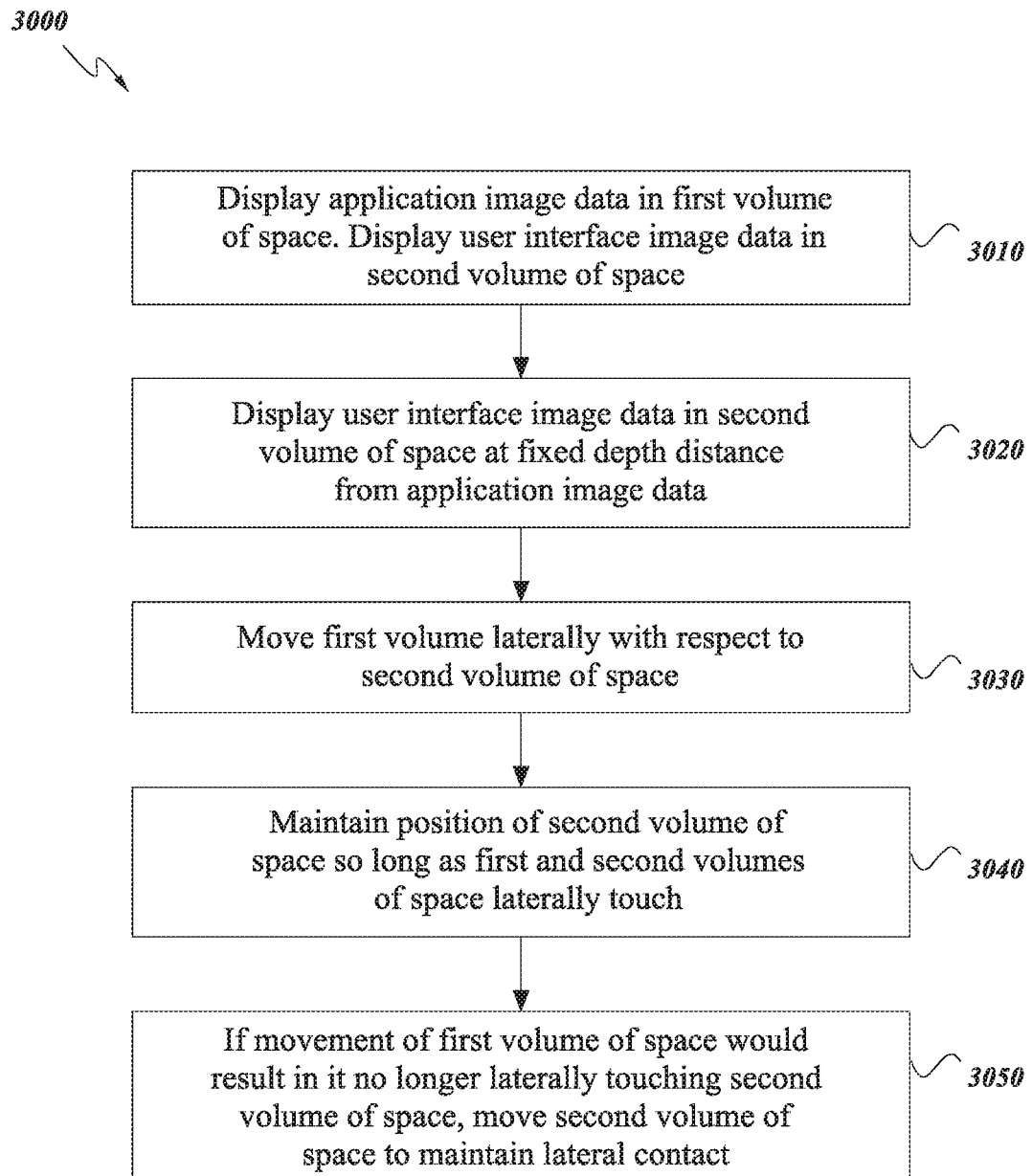
FIG. 30 is a flowchart of an example method for moving parent application image data with respect to user interface image data (e.g., virtual keyboard image data) so as to maintain lateral contact.

In some embodiments, the parent application box 2822 and the user interface box 2812 move together but not in exact formation. Instead, the relative positioning between the parent application box 2822 and the user interface box 2812 can change so long as lateral touching between the boxes is maintained (e.g., as illustrated in FIGS. 29A-29D). FIG. 30 is a flowchart 3000 which illustrates this type of movement.

At block 3010, the parent application image data 2820 is displayed in a first volume of space, such as the parent application box 2822. Meanwhile, the user interface image data 2810 is displayed in a second volume of space, such as the user interface box 2812. As noted in block 3020, the user interface image data 2810 can be displayed at a fixed depth distance, D, from the parent application image data 2820.

At block 3030, one of the volumes of space (e.g., the parent application box 2822) is moved laterally with respect to the other. At block 3040, the location of the other volume of space (e.g., the user interface box 2812) is maintained without movement so long as there is still lateral touching between the two volumes of space. This can refer to actual lateral touching where at least one point in the parent application box 2822 and at least one point in the user interface box 2812 have lateral coordinates that are adjacent. It can also refer to apparent lateral touching from the user's point of view (as discussed further with respect to FIG. 31). At block 3050, if the movement of the first volume of space (e.g., the parent application box 2822) would result in it no longer laterally touching the second volume of space (e.g., the user interface box 2812), then the second volume of space can also be moved in a manner so as to maintain lateral touching.

Figure 31:
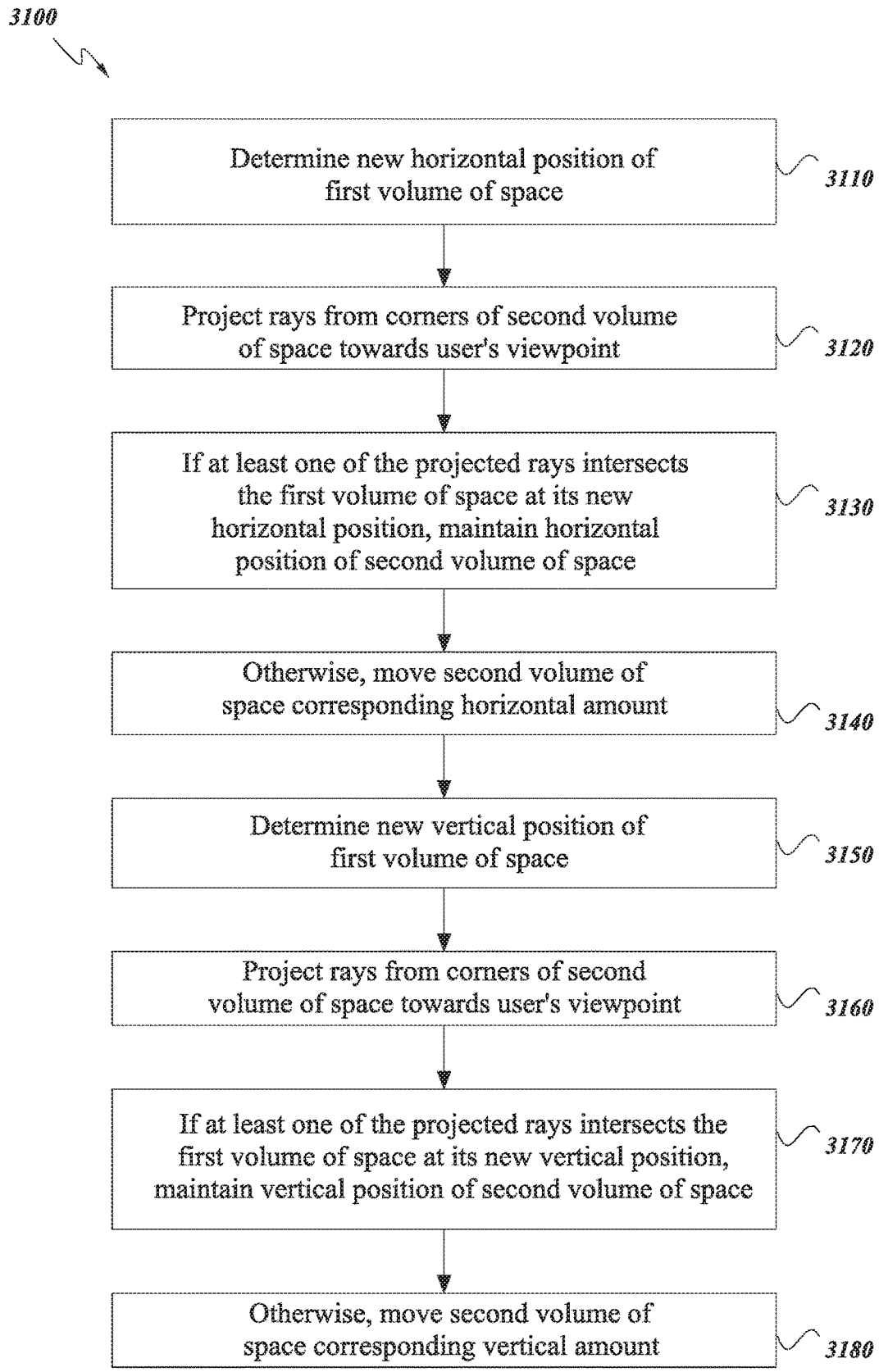
FIG. 31 is a flowchart of another example method for moving parent application image data with respect to user interface image data (e.g., virtual keyboard image data) so as to maintain lateral contact.

FIG. 31 is a flowchart 3100 which illustrates more detail of the method 3000 shown in FIG. 30. At block 3110, the new horizontal position (in the illustrated x-direction) of the first volume of space (e.g., the parent application box 2822) is determined. Then, at block 3120, the VR/AR/MR system 200 projects rays from the corners of the second volume of space (e.g., the corners of the back surface of the user interface box 2812) toward the user's viewpoint. At block 3130, if at least one of the projected rays intersects the first volume of space (e.g., the parent application box 2822) at its new horizontal position, then the horizontal position of the second volume of space (e.g., the user interface box 2812) is maintained. Otherwise, at block 3140, the second volume of space (e.g., the user interface box 2812) can be moved horizontally by an amount which corresponds to the horizontal movement of the first volume of space (e.g., the parent application box 2822). Or the second volume of space (e.g., the user interface box 2812) can be moved horizontally by the least amount necessary to maintain horizontal contact with the first volume of space (e.g., the parent application box 2822).

Then, at blocks 3150-3180, similar steps are performed for the new vertical position (in the illustrated y-direction) of the first volume of space (e.g., the parent application box 2822). Namely, at block 3150, the new vertical position of the first volume of space (e.g., the parent application box 2822) is determined. Then, at block 3160, the VR/AR/MR system 200 projects rays from the corners of the second volume of space (e.g., the corners of the back surface of the user interface box 2812) toward the user's viewpoint. At block 3170, if at least one of the projected rays intersects the first volume of space (e.g., the parent application box 2822) at its new vertical position, then the vertical position of the second volume of space (e.g., the user interface box 2812) is maintained. Otherwise, at block 3180, the second volume of space (e.g., the user interface box 2812) can be moved vertically by an amount which corresponds to the vertical movement of the first volume of space (e.g., the parent application box 2822). Or the second volume of space (e.g., the user interface box 2812) can be moved vertically by the least amount necessary to maintain vertical contact with the first volume of space (e.g., the parent application box 2822).

Thus, either the parent application box 2822 or the user interface box 2812 is permitted to be moved via manipulation such that it laterally "slides" with respect to the other. But the x-y lateral range of this movement can be constrained such that one of the boxes 2812, 2822 does not slide far enough away from the other that it is no longer in lateral contact. Although FIG. 31 illustrates a process where the movements are separated into horizontal and vertical components, with the horizontal movements being done first and then the vertical movements, in other embodiments the vertical movements can be done before the horizontal movements, or the movements can be done without separating them into horizontal and vertical components.

EXAMPLES

In some examples, a method comprises: displaying, using a virtual reality, augmented reality, or mixed reality system capable of displaying data at multiple depths, at least a portion of image data associated with a first application at a first depth; and displaying at least a portion of image data associated with a second application at a second depth, wherein the first and second applications are related to one another, and wherein the second depth is selected to be a fixed distance from the first depth.

In any of the preceding examples, the second application may comprise a user interface which allows a user to interact with the first application.

In any of the preceding examples, the second application may comprise a keyboard.

In any of the preceding examples, the fixed distance may be 10-30 inches.

In any of the preceding examples, the fixed distance may be 15-20 inches.

In any of the preceding examples, the method may further comprise: moving the image data associated with the first application in response to a command; and automatically moving the image data associated with the second application so as to maintain the fixed distance.

In any of the preceding examples, the image data associated with the first application may be displayed in a first volume of space and the image data associated with the second application may be displayed in a second volume of space.

In any of the preceding examples, the fixed distance may be measured from a front surface of the first volume of space to a front surface of the second volume of space.

In any of the preceding examples, the front surface of the first volume of space and the rear surface of the second volume of space may be adjacent.

In any of the preceding examples, the image data associated with the first application may be displayed in at least a first area and the image data associated with the second application may be displayed in at least a second area.

In any of the preceding examples, the first area and the second area may laterally touch one another.

In any of the preceding examples, at least a corner of the first area may laterally touch at least a corner of the second area.

In any of the preceding examples, at least an edge of the first area may laterally touch at least an edge of the second area.

In any of the preceding examples, the first area and the second area may laterally overlap one another.

In any of the preceding examples, the method may further comprise: moving the first area laterally in response to a command; and maintaining the lateral position of the second area so long as the first area and the second area laterally touch one another.

In any of the preceding examples, the method may further comprise, when the first area and the second area no longer laterally touch one another, laterally moving the second area so as to maintain lateral contact between the first area and the second area.

In any of the preceding examples, the method may further comprise determining whether the first area and the second area laterally touch one another by: projecting one or more rays from one or more peripheral points of the second area toward a viewpoint of a user; and testing whether at least one of the rays intersects with the first area.

In any of the preceding examples, the one or more peripheral points may include all corners of the second area.

In some examples, a system comprises: a virtual reality, augmented reality, or mixed reality display capable of displaying data at multiple depths, a hardware processor configured to: display at least a portion of image data associated with a first application at a first depth; and display at least a portion of image data associated with a second application at a second depth, wherein the first and second applications are related to one another, and wherein the second depth is selected to be a fixed distance from the first depth.

In any of the preceding examples, the second application may comprise a user interface which allows a user to interact with the first application.

In any of the preceding examples, the second application may comprise a keyboard.

In any of the preceding examples, the fixed distance may be 10-30 inches.

In any of the preceding examples, the fixed distance may be 15-20 inches.

In any of the preceding examples, the hardware processor may be further configured to: move the image data associated with the first application in response to a command; and automatically move the image data associated with the second application so as to maintain the fixed distance.

In any of the preceding examples, the image data associated with the first application may be displayed in a first volume of space and the image data associated with the second application may be displayed in a second volume of space.

In any of the preceding examples, the fixed distance may be measured from a front surface of the first volume of space to a front surface of the second volume of space.

In any of the preceding examples, the front surface of the first volume of space and the rear surface of the second volume of space may be adjacent.

In any of the preceding examples, the image data associated with the first application may be displayed in at least a first area and the image data associated with the second application may be displayed in at least a second area.

In any of the preceding examples, the first area and the second area may laterally touch one another.

In any of the preceding examples, at least a corner of the first area may laterally touch at least a corner of the second area.

In any of the preceding examples, at least an edge of the first area may laterally touch at least an edge of the second area.

In any of the preceding examples, the first area and the second area may laterally overlap one another.

In any of the preceding examples, the hardware processor may be further configured to: move the first area laterally in response to a command; and maintain the lateral position of the second area so long as the first area and the second area laterally touch one another.

In any of the preceding examples, the hardware processor may be further configured to, when the first area and the second area no longer laterally touch one another, laterally move the second area so as to maintain lateral contact between the first area and the second area.

In any of the preceding examples, the hardware processor may be further configured to determine whether the first area and the second area laterally touch one another by: projecting one or more rays from one or more peripheral points of the second area toward a viewpoint of a user; and testing whether at least one of the rays intersects with the first area.

In any of the preceding examples, the one or more peripheral points may include all corners of the second area.

In some examples, a non-transitory computer-readable medium may comprise instructions which, when read by a hardware processor, cause the hardware processor to perform a method comprising: displaying, using a virtual reality, augmented reality, or mixed reality system capable of displaying data at multiple depths, at least a portion of image data associated with a first application at a first depth; and displaying at least a portion of image data associated with a second application at a second depth, wherein the first and second applications are related to one another, and wherein the second depth is selected to be a fixed distance from the first depth.

In any of the preceding examples, the second application may comprise a user interface which allows a user to interact with the first application.

In any of the preceding examples, the second application may comprise a keyboard.

In any of the preceding examples, the fixed distance may be 10-30 inches.

In any of the preceding examples, the fixed distance may be 15-20 inches.

In any of the preceding examples, the method caused by the computer-readable medium may further comprise: moving the image data associated with the first application in response to a command; and automatically moving the image data associated with the second application so as to maintain the fixed distance.

In any of the preceding examples, the image data associated with the first application may be displayed in a first volume of space and the image data associated with the second application may be displayed in a second volume of space.

In any of the preceding examples, the fixed distance may be measured from a front surface of the first volume of space to a front surface of the second volume of space.

In any of the preceding examples, the front surface of the first volume of space and the rear surface of the second volume of space may be adjacent.

In any of the preceding examples, the image data associated with the first application may be displayed in at least a first area and the image data associated with the second application may be displayed in at least a second area.

In any of the preceding examples, the first area and the second area may laterally touch one another.

In any of the preceding examples, at least a corner of the first area may laterally touch at least a corner of the second area.

In any of the preceding examples, at least an edge of the first area may laterally touch at least an edge of the second area.

In any of the preceding examples, the first area and the second area may laterally overlap one another.

In any of the preceding examples, the method caused by the computer-readable medium may further comprise: moving the first area laterally in response to a command; and maintaining the lateral position of the second area so long as the first area and the second area laterally touch one another.

In any of the preceding examples, the method caused by the computer-readable medium may further comprise, when the first area and the second area no longer laterally touch one another, laterally moving the second area so as to maintain lateral contact between the first area and the second area.

In any of the preceding examples, the method caused by the computer-readable medium may further comprise determining whether the first area and the second area laterally touch one another by: projecting one or more rays from one or more peripheral points of the second area toward a viewpoint of a user; and testing whether at least one of the rays intersects with the first area.

In any of the preceding examples, the one or more peripheral points may include all corners of the second area.

CONCLUSION

Each of the processes, methods, and algorithms described herein and/or depicted in the attached figures may be embodied in, and fully or partially automated by, code modules executed by one or more physical computing systems, application-specific circuitry, and/or electronic hardware configured to execute specific and particular computer instructions (collectively referred to as hardware processors). For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and sub-combinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
    an augmented reality display system configured to present virtual content to a user of the system, wherein the virtual content is presented to augment a view of a physical environment of the user;
    an outward-facing imaging system configured to image the physical environment of the user;
    a hardware processor in communication with the augmented reality display system and the outward-facing imaging system, the hardware processor programmed to:
        analyze at least one image of the physical environment acquired by the outward-facing imaging system;
        recognize a physical keyboard having a plurality of keys based on an analysis of the at least one image;
        recognize a physical object in the physical environment, based on the analysis of the at least one image, wherein the physical object is other than the physical keyboard;
        based on determining that a gaze direction of the user is toward the physical object, determine contextual information that is at least associated with the physical object, wherein the contextual information includes at least one action that the physical object is configured to perform;
        determine a specification for the physical keyboard based at least in part on the contextual information including the at least one action of the physical object;
        dynamically configure functions of at least a portion of the physical keyboard based at least in part on the specification such that at least one key of the physical keyboard is usable to cause the physical object to perform the at least one action;
        determine a rendering location of a virtual key label based at least in part on the specification and on a position of the physical keyboard within the user's field of view (FOV);
        instruct the augmented reality display system to render the virtual key label at the determined rendering location associated with the at least one key;
        instruct the augmented reality display system to change the rendering location of the virtual key on the physical keyboard when the position of the physical keyboard within the user's field of view changes; and
        instruct the augmented reality display system to perform a user interface function associated with the virtual key label in response to actuation of the physical keyboard at the rendering location, wherein the user interface function includes causing the physical object to perform the at least one action.

2. The system of claim 1, wherein the virtual content comprises at least one of: augmented or mixed reality content.

3. The system of claim 1, wherein to analyze the at least one image, the hardware processor is programmed to execute an object recognizer to identify a physical keyboard based on visual characteristics of the physical keyboard.

4. The system of claim 3, wherein the visual characteristics comprise at least one of: a shape of a surface of the physical keyboard or a label of the physical keyboard.

5. The system of claim 1, wherein the outward-facing imaging system comprises a world camera having a FOV, wherein the FOV comprises a portion of the physical environment that is observed by the world camera at a given time, and wherein to recognize a physical keyboard, the hardware processor is programmed to detect at least a portion of the physical keyboard is in the FOV.

6. The system of claim 1, wherein the specification comprises at least one of a layout of the plurality of keys or functions of the plurality of keys.

7. The system of claim 1, wherein to determine the specification for the physical keyboard, the hardware processor is programmed to: determine a model of the physical keyboard based on the analysis of the image; and access a database storing the specification of the model to retrieve the specification.

8. The system of claim 1, wherein one or more of the plurality of keys has a capacitive touch sensor.

9. The system of claim 1, wherein the contextual information further comprises at least one of a position of the physical keyboard or an orientation of the physical keyboard.

10. The system of claim 1, wherein the portion of the physical keyboard comprises blank keys and to dynamically configure the functions of at least the portion of the physical keyboard, the hardware processor is programmed to: assign command functions to the blank keys wherein the command functions cause the system to perform the user interface function.

11. The system of claim 10, wherein the rendering location of a virtual key label coincides with a location of a blank key in the portion of the physical keyboard, and wherein the hardware processor is configured to instruct the display system to superimpose the virtual key label on the blank key using a pixel stick.

12. The system of claim 1, wherein the rendering location is over a space bar of the physical keyboard, and wherein the user interface function comprises a slider input control.

13. The system of claim 1, wherein the augmented reality display system is configured to display a letter or symbol associated with the virtual key label on a physical screen attached to the physical keyboard in response to actuation of the physical keyboard at the rendering location.

14. The system of claim 1, wherein the size of the virtual key label is based at least in part on the user's head pose.

15. The system of claim 1, wherein the size of the virtual key label is based at least in part on the perceived distance of the keyboard from the user.

16. The system of claim 1, wherein the virtual key label associated with a rendering location on the physical keyboard varies based on how a user interacts with a key of the physical keyboard at the rendering location.

17. A method comprising:
under control of at least one hardware processor of an augmented reality display system:
identifying a portion of a physical keyboard having a plurality of keys in a three-dimensional (3D) physical environment of a user, based at least partly on analyzing at least one image of the physical environment acquired by the augmented reality display system, wherein the augmented reality display system is configured to present, to a user, virtual content to augment a view of a physical environment of the user;
recognizing a physical object in the physical environment, based on the analysis of the at least one image, wherein the physical object is other than the physical keyboard;
based on determining that a gaze direction of the user is toward the physical object, determine contextual information that is at least associated with the physical object, wherein the contextual information includes at least one action that the physical object is configured to perform;
determining a specification for the portion of physical keyboard based at least in part on the contextual information including the at least one action of the physical object;
dynamically configuring functions of the portion of the physical keyboard based at least in part on the specification such that at least one key of the physical keyboard is usable to cause the physical object to perform the at least one action;
determining a rendering location of a virtual key label in the portion of the physical keyboard based at least in part on the specification and on a position of the physical keyboard within the user's field of view (FOV);
instructing the augmented reality display system to render the virtual key label at the determined rendering location associated with the at least one key;
instructing the augmented reality display system to change the rendering location of the virtual key on the physical keyboard when the position of the physical keyboard within the user's field of view changes; and
instructing the augmented reality display system to perform a user interface function associated with the virtual key label in response to actuation of the physical keyboard at the rendering location, wherein the user interface function includes causing the physical object to perform the at least one action.

18. The method of claim 17, wherein the physical keyboard is assembled from a plurality of detachable sections.

19. The method of claim 17, wherein the virtual key is included a virtual keyboard that is rendered on a surface of the physical keyboard.

20. The method of claim 17, wherein identifying a physical keyboard comprises at least one of communicating with the physical keyboard to obtain identifying information of the physical keyboard, selecting the physical keyboard among a plurality of keyboards based on the contextual information, and recognizing the physical keyboard based on an image of the physical keyboard.

21. The method of claim 20, wherein the at least one image is acquired by at least one of: an outward-facing imaging system of a head-mounted device, a room camera, or a camera coupled to the physical keyboard.

22. The method of claim 17, wherein the portion of the physical keyboard comprises blank keys.

23. The method of claim 17, wherein the contextual information is also associated with the user.

24. A computer-readable storage medium with instructions which, when read by a hardware processor, cause the hardware processor to perform a method comprising:
identifying a portion of a physical keyboard having a plurality of keys in a three-dimensional (3D) physical environment of a user, based at least partly on analyzing at least one image of the physical environment acquired by an augmented reality display system, wherein the augmented reality display system is configured to present, to a user, virtual content to augment a view of a physical environment of the user;
recognizing a physical object in the physical environment, based on the analysis of the at least one image, wherein the physical object is other than the physical keyboard;
based on determining that a gaze direction of the user is toward the physical object, determine contextual information that is at least associated with the physical object, wherein the contextual information includes at least one action that the physical object is configured to perform;
determining a specification for the portion of physical keyboard based at least in part on the contextual information including the at least one action of the physical object;
dynamically configuring functions of the portion of the physical keyboard based at least in part on the specification such that at least one key of the physical keyboard is usable to cause the physical object to perform the at least one action;
determining a rendering location of a virtual key label in the portion of the physical keyboard based at least in part on the specification and on a position of the physical keyboard within the user's field of view (FOV);
instructing the augmented reality display system to render the virtual key label at the determined rendering location associated with the at least one key;
instructing the augmented reality display system to change the rendering location of the virtual key on the physical keyboard when the position of the physical keyboard within the user's field of view changes; and
instructing the augmented reality display system to perform a user interface function associated with the virtual key label in response to actuation of the physical keyboard at the rendering location, wherein the user interface function includes causing the physical object to perform the at least one action.

\* \* \* \* \*

UNITED STATES PATENT AND TRADEMARK OFFICE
CERTIFICATE OF CORRECTION

| | |
|---|---|
| PATENT NO. | : 11,610,371 B2 |
| APPLICATION NO. | : 15/984208 |
| DATED | : March 21, 2023 |
| INVENTOR(S) | : James M. Powderly et al. |

It is certified that error appears in the above-identified patent and that said Letters Patent is hereby corrected as shown below:

In the Claims

In Column 82, Line 8, delete "included a" and insert --included in a--.

Signed and Sealed this
Ninth Day of May, 2023

Katherine Kelly Vidal
*Director of the United States Patent and Trademark Office*